United States Patent
Zhang et al.

(10) Patent No.: US 11,521,554 B2
(45) Date of Patent: Dec. 6, 2022

(54) GATE DRIVER CIRCUIT, DISPLAY PANEL, DISPLAY DEVICE, AND DRIVING METHOD THEREOF

(71) Applicants: Wuhan Tianma Microelectronics Co., Ltd., Wuhan (CN); Wuhan Tianma Microelectronics Co., Ltd. Shanghai Branch, Shanghai (CN)

(72) Inventors: Mengmeng Zhang, Wuhan (CN); Xingyao Zhou, Wuhan (CN)

(73) Assignees: WUHAN TIANMA MICROELECTRONICS CO., LTD., Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 0 days.

(21) Appl. No.: 17/542,141

(22) Filed: Dec. 3, 2021

(65) Prior Publication Data

US 2022/0093047 A1    Mar. 24, 2022

(30) Foreign Application Priority Data

Apr. 27, 2021 (CN) .......................... 202110460065.4

(51) Int. Cl.
*G09G 3/3266* (2016.01)

(52) U.S. Cl.
CPC ... *G09G 3/3266* (2013.01); *G09G 2310/0286* (2013.01); *G09G 2310/08* (2013.01); *G09G 2330/028* (2013.01)

(58) Field of Classification Search
CPC ...... G09G 3/20; G09G 3/3233; G09G 3/3266; G09G 2300/0861; G09G 2310/0281; G09G 2310/0286; G09G 2310/08; G09G 2330/028

See application file for complete search history.

(56) References Cited

U.S. PATENT DOCUMENTS

| | | | | |
|---|---|---|---|---|
| 2016/0125829 | A1* | 5/2016 | Jeon ...................... | G09G 3/3692 345/100 |
| 2019/0130848 | A1* | 5/2019 | Kim ...................... | G09G 3/3266 |
| 2021/0327321 | A1* | 10/2021 | Chen .................... | G09G 3/3266 |
| 2021/0358366 | A1* | 11/2021 | Feng .................... | G09G 3/3266 |

* cited by examiner

*Primary Examiner* — Michael J Eurice
(74) *Attorney, Agent, or Firm* — Alston & Bird LLP

(57) ABSTRACT

Provided are gate driver circuit, display panel, display device, and driving method thereof. The gate driver circuit includes cascaded shift registers. Each shift register includes input unit, node control unit, first output unit, and second output unit. first terminal, control terminal, and second terminal of the input unit respectively electrically connected to signal input terminal, first signal terminal, and first node. first terminal, second terminal, third terminal, fourth terminal, first control terminal, second control terminal and fifth terminal of the node control unit respectively electrically connected to the first node, the first signal terminal, first power supply voltage terminal, second power supply voltage terminal, the first node, second signal terminal, and second node. As such, one shift register outputs two control signals, the number of shift registers in the gate driver circuit can be reduced, and the bezel of the display panel and the display device can be reduced.

20 Claims, 25 Drawing Sheets

GATE DRIVER CIRCUIT, DISPLAY PANEL, DISPLAY DEVICE, AND DRIVING METHOD THEREOF

CROSS-REFERENCE TO RELATED APPLICATION(S)

This application claims priority to Chinese Patent Application No. 202110460065.4 filed Apr. 27, 2021, the disclosure of which is incorporated herein by reference in its entirety.

TECHNICAL FIELD

The present disclosure relates to the field of display techniques and, in particular, to a gate driver circuit, a display panel, a display device, and a driving method thereof.

BACKGROUND

A display panel generally includes a display region and a non-display region. The display region is provided with pixel driver circuits and light-emitting elements. The pixel driver circuits are configured to drive the light-emitting elements to emit light for displaying images. The non-display region is provided with a gate driver circuit, and the gate driver circuit is configured to provide control signals for the pixel driver circuits so that the light-emitting elements are lit up row by row under the driving of the pixel driver circuits.

Therefore, the gate driver circuit has always been a major research hotspot in the display field.

SUMMARY

The present disclosure provides a gate driver circuit, a display panel, a display device, and a driving method thereof. In this manner, one shift register outputs two control signals so that the number of shift registers in the gate driver circuit can be reduced, and thus the bezel of the display panel and the display device can be reduced.

In a first aspect, embodiments of the present disclosure provide a gate driver circuit. The gate driver circuit includes multiple cascaded shift registers. Each of the multiple cascaded shift registers includes an input unit, a node control unit, a first output unit, and a second output unit.

A first terminal of the input unit is electrically connected to a signal input terminal, a control terminal of the input unit is electrically connected to a first signal terminal, a second terminal of the input unit is electrically connected to a first node, and the input unit is configured to control a voltage of the first node according to a voltage of the first signal terminal and a voltage of the signal input terminal.

A first terminal of the node control unit is electrically connected to the first node, a second terminal of the node control unit is electrically connected to the first signal terminal, a third terminal of the node control unit is electrically connected to a first power supply voltage terminal, a fourth terminal of the node control unit is electrically connected to a second power supply voltage terminal, a first control terminal of the node control unit is electrically connected to the first node, a second control terminal of the node control unit is electrically connected to a second signal terminal, a fifth terminal of the node control unit is electrically connected to a second node, and the node control unit is configured to control a voltage of the second node according to the voltage of the first node, the voltage of the first signal terminal, a voltage of the first power supply voltage terminal, a voltage of the second power supply voltage terminal, and a voltage of the second signal terminal.

A first terminal of the first output unit is electrically connected to the second power supply voltage terminal, a second terminal of the first output unit is electrically connected to a third signal terminal, a third terminal of the first output unit is electrically connected to a first output terminal, a first control terminal of the first output unit is electrically connected to the second node, a second control terminal of the first output unit is electrically connected to the first node, and the first output unit is configured to control a voltage of the first output terminal according to the voltage of the second power supply voltage terminal, a voltage of the third signal terminal, the voltage of the first node, and the voltage of the second node.

A first terminal of the second output unit is electrically connected to the second power supply voltage terminal, a second terminal of the second output unit is electrically connected to a fourth signal terminal, a third terminal of the second output unit is electrically connected to a second output terminal, a first control terminal of the second output unit is electrically connected to the second node, a second control terminal of the second output unit is electrically connected to the first node, and the second output unit is configured to control a voltage of the second output terminal according to the voltage of the second power supply voltage terminal, a voltage of the fourth signal terminal, the voltage of the first node, and the voltage of the second node.

In a second aspect, embodiments of the present disclosure provide a display panel. The display panel includes the gate driver circuit described in the first aspect.

In a third aspect, embodiments of the present disclosure provide a display device. The display device includes the display panel described in the second aspect.

In a third aspect, embodiments of the present disclosure provide a driving method of the gate driver circuit described in the first aspect.

In an input stage, a turn-on voltage is applied to the signal input terminal, a turn-on voltage is applied to the first signal terminal, and a cut-off voltage is applied to the second signal terminal; the input unit, in response to the turn-on voltage of the first signal terminal, transmits the turn-on voltage of the signal input terminal to the first node.

In a first output stage, a cut-off voltage is applied to the first signal terminal, a cut-off voltage is applied to the second signal terminal, a turn-on voltage is applied to the third signal terminal, and a cut-off voltage is applied to the fourth signal terminal; the first control terminal of the node control unit, in response to the turn-on voltage of the first node, transmits the cut-off voltage of the first signal terminal to the second node, and the second control terminal of the first output unit, in response to the turn-on voltage maintained of the first node, transmits the turn-on voltage of the third signal terminal to the first output terminal.

In a second output stage, a cut-off voltage is applied to the first signal terminal, a cut-off voltage is applied to the second signal terminal, a cut-off voltage is applied to the third signal terminal, and a turn-on voltage is applied to the fourth signal terminal; the first control terminal of the node control unit, in response to the turn-on voltage of the first node, transmits the cut-off voltage of the first signal terminal to the second node, and the second control terminal of the second output unit, in response to the turn-on voltage maintained of the first node, transmits the turn-on voltage of the fourth signal terminal to the second output terminal.

In a maintenance stage, a cut-off voltage is applied to the first signal terminal, and a turn-on voltage is applied to the second signal terminal; the second control terminal of the node control unit, in response to the turn-on voltage of the second signal terminal, transmits a voltage input by the first power supply voltage terminal to the second node and transmit a voltage input by the second power supply voltage terminal to the first node; and the first output terminal and the second output terminal output ineffective levels.

DETAILED DESCRIPTION

Figure 1:
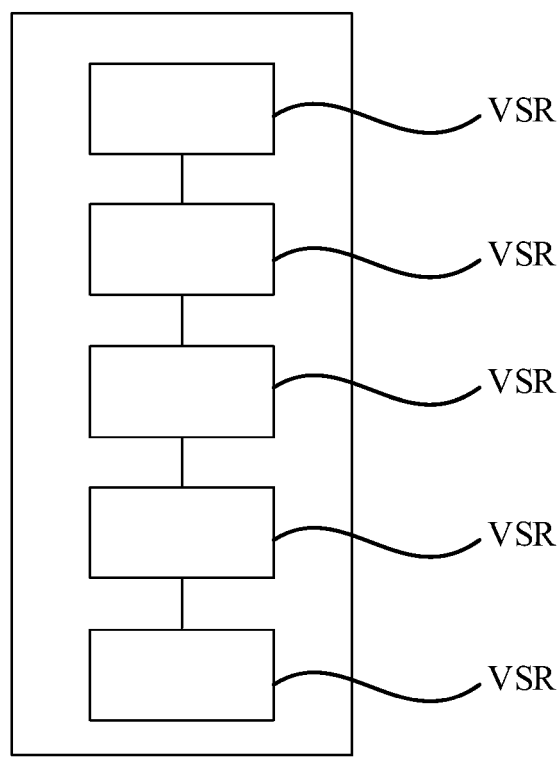
FIG. 1 is a structure diagram of a gate driver circuit according to an embodiment of the present disclosure.

The present disclosure is further described hereinafter in detail in conjunction with drawings and embodiments. It is to be understood that embodiments described hereinafter are intended to explain the present disclosure and not to limit the present disclosure. Additionally, it is to be noted that for ease of description, only part, not all, of structures related to the present disclosure are illustrated in the drawings.

Figure 2:
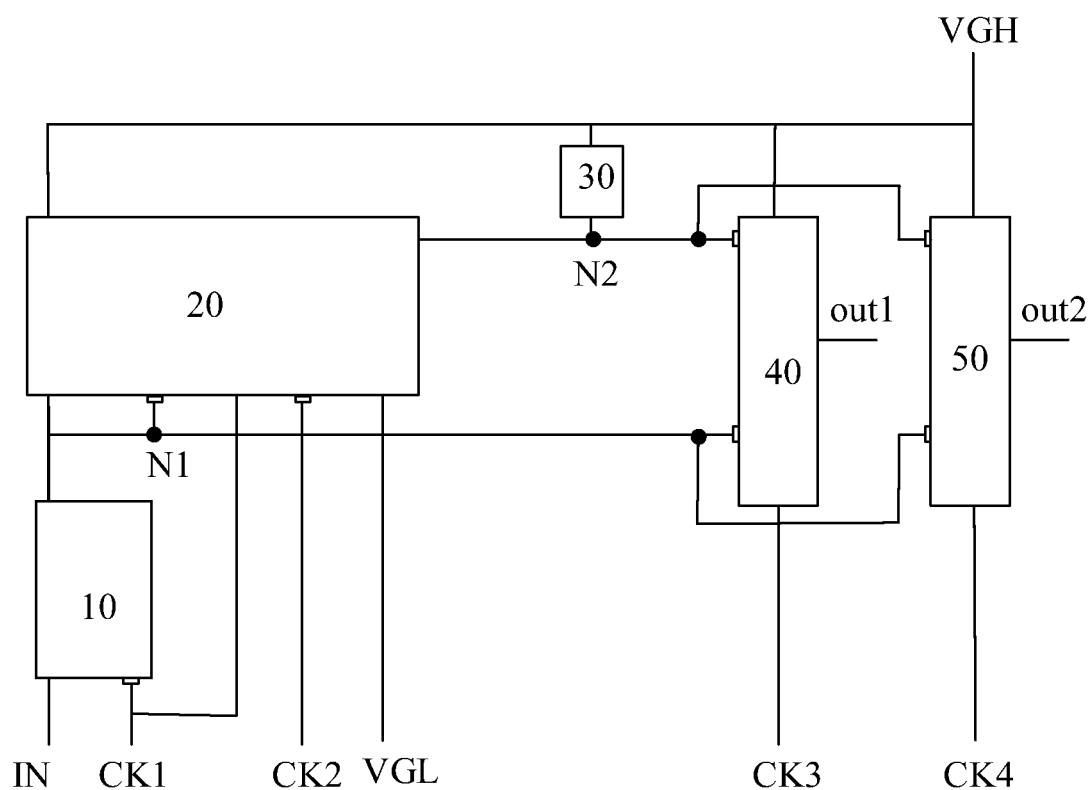
FIG. 2 is a circuit diagram of a shift register according to an embodiment of the present disclosure.

FIG. 1 is a structure diagram of a gate driver circuit according to an embodiment of the present disclosure, and FIG. 2 is a circuit diagram of a shift register according to an embodiment of the present disclosure. Referring to FIGS. 1 and 2, the gate driver circuit includes multiple cascaded shift registers VSR, and each shift register VSR includes an input unit 10, a node control unit 20, a first output unit 40, and a second output unit 50. A first terminal of the input unit 10 is electrically connected to a signal input terminal IN, a control terminal of the input unit 10 is electrically connected to a first signal terminal CK1, a second terminal of the input unit 10 is electrically connected to a first node N1, and the input unit 10 is configured to control a voltage of the first node N1 according to a voltage of the first signal terminal CK1 and a voltage of the signal input terminal IN. A first terminal of the node control unit 20 is electrically connected to the first node N1, a second terminal of the node control unit 20 is electrically connected to the first signal terminal CK1, a third terminal of the node control unit 20 is electrically connected to a first power supply voltage terminal VGL, a fourth terminal of the node control unit 20 is electrically connected to a second power supply voltage terminal VGH, a first control terminal of the node control unit 20 is electrically connected to the first node N1, a second control terminal of the node control unit 20 is electrically connected to a second signal terminal CK2, a fifth terminal of the node control unit 20 is electrically connected to a second node N2, and the node control unit 20 is configured to control a voltage of the second node N2 according to the voltage of the first node N1, the voltage of the first signal terminal CK1, a voltage of the first power supply voltage terminal VGL, a voltage of the second power supply voltage terminal VGH, and a voltage of the second signal terminal CK2. A first terminal of the first output unit 40 is electrically connected to the second power supply voltage terminal VGH, a second terminal of the first output unit 40 is electrically connected to a third signal terminal CK3, a third terminal of the first output unit 40 is electrically connected to a first output terminal out1, a first control terminal of the first output unit 40 is electrically connected to the second node N2, a second control terminal of the first output unit 40 is electrically connected to the first node N1, and the first output unit 40 is configured to control a voltage of the first output terminal out1 according to the voltage of the second power supply voltage terminal VGH, a voltage of the third signal terminal CK3, the voltage of the first node N1, and the voltage of the second node N2. A first terminal of the second output unit 50 is electrically connected to the second power supply voltage terminal VGH, a second terminal of the second output unit 50 is electrically connected to a fourth signal terminal CK4, a third terminal of the second output unit 50 is electrically connected to a second output terminal out2, a first control terminal of the second output unit 50 is electrically connected to the second node N2, a second control terminal of the second output unit 50 is electrically connected to the first node N1, and the second output unit 50 is configured to control a voltage of the second output terminal out2 according to the voltage of the second power supply voltage terminal VGH, a voltage of the fourth signal terminal CK4, the voltage of the first node N1, and the voltage of the second node N2.

Embodiments of the present disclosure provide a gate driver circuit. In an input stage, a turn-on voltage is transmitted to the first node N1 through the input unit 10. In a first output stage, the voltage of the second node N2 is controlled by the node control unit 20, and the first output unit 40, in response to the voltage of the first node N1 and the voltage of the second node N2, transmits the turn-on voltage of the third signal terminal CK3 to the first output terminal out1. In a second output stage, the voltage of the second node N2 is controlled by the node control unit 20, and the second output unit 50, in response to the voltage of the first node N1 and the voltage of the second node N2, transmits the turn-on voltage of the fourth signal terminal CK4 to the second output terminal out2. Since the first output terminal out1 and the second output terminal out2 of the gate driver circuit may respectively output control signals, one shift register VSR may output two control signals so that the number of shift registers VSR in the gate driver circuit can be reduced, and thus the bezel of the display panel and the display device can be reduced.

It is to be noted that, in an embodiment, the first node N1 and the second node N2 may be actual connection points. In another embodiment, the first node N1 and the second node N2 may also be virtual connection points. In short, the first node N1, the second terminal of the input unit 10, the first terminal of the node control unit 20, and the first control terminal of the node control unit 20 have the same potential, and the second node N2, the fifth terminal of the node control unit 20, the first control terminal of the first output unit 40, and the first control terminal of the second output unit 50 have the same potential.

In an embodiment, referring to FIG. 2, the gate driver circuit may further include a storage unit 30, a first terminal of the storage unit 30 is electrically connected to the second power supply voltage terminal VGH, and a second terminal of the storage unit 30 is electrically connected to the second node N2. The storage unit 30 is configured to store a potential of the second node N2.

Figure 3:
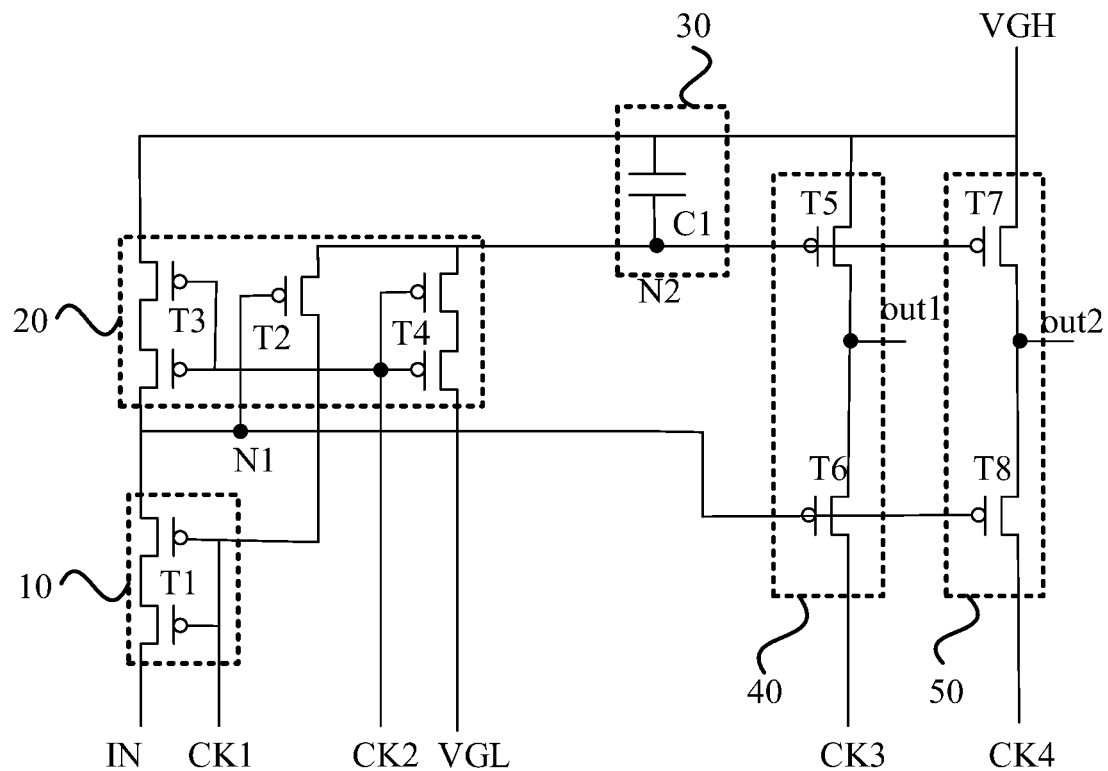
FIG. 3 is a circuit diagram of a shift register according to another embodiment of the present disclosure.

FIG. 3 is a circuit diagram of a shift register according to another embodiment of the present disclosure. Referring to FIG. 3, the input unit 10 includes a first transistor T1. A gate of the first transistor T1 is electrically connected to the first signal terminal CK1, a first pole of the first transistor T1 is electrically connected to the signal input terminal IN, and a second pole of the first transistor T1 is electrically connected to the first node N1. That is, the second pole of the first transistor T1 is electrically connected to the first terminal of the node control unit 20.

In an embodiment, referring to FIG. 3, the node control unit 20 includes a second transistor T2, a third transistor T3, and a fourth transistor T4. A gate of the second transistor T2 is electrically connected to the first node N1, a first pole of the second transistor T2 is electrically connected to the first signal terminal CK1, and a second pole of the second transistor T2 is electrically connected to the second node N2. That is, the second pole of the second transistor T2 is electrically connected to the first control terminal of the first output unit 40. A gate of the third transistor T3 is electrically connected to the second signal terminal CK2, a first pole of the third transistor T3 is electrically connected to the first node N1, and a second pole of the third transistor T3 is electrically connected to the second power supply voltage terminal VGH. A gate of the fourth transistor T4 is electrically connected to the second signal terminal CK2, a first pole of the fourth transistor T4 is electrically connected to the first power supply voltage terminal VGL, and a second pole of the fourth transistor T4 is electrically connected to the second node N2.

In an embodiment, referring to FIG. 3, the storage unit 30 includes a first capacitor C1. A first electrode plate of the first capacitor C1 is electrically connected to the second power supply voltage terminal VGH, and a second electrode plate of the first capacitor C1 is electrically connected to the second node N2. That is, the second electrode plate of the first transistor C1 is electrically connected to the first control terminal of the first output unit 40.

In an embodiment, referring to FIG. 3, the first output unit 40 includes a fifth transistor T5 and a sixth transistor T6. A gate of the fifth transistor T5 is electrically connected to the second node N2, that is, the gate of the fifth transistor T5 is electrically connected to the fifth terminal of the node control unit 20. A first pole of the fifth transistor T5 is electrically connected to the second power supply voltage terminal VGH, and a second pole of the fifth transistor T5 is electrically connected to the first output terminal out1. A gate of the sixth transistor T6 is electrically connected to the first node N1, that is, the gate of the sixth transistor T6 is electrically connected to the second terminal of the input unit 10. A first pole of the sixth transistor T6 is electrically connected to the first output terminal out1, and a second pole of the sixth transistor T6 is electrically connected to the third signal terminal CK3. The second output unit 50 includes a seventh transistor T7 and an eighth transistor T8. A gate of the seventh transistor T7 is electrically connected to the second node N2, that is, the gate of the seventh transistor T7 is electrically connected to the fifth terminal of the node control unit 20. A first pole of the seventh transistor T7 is electrically connected to the second power supply voltage terminal VGH, and a second pole of the seventh transistor T7 is electrically connected to the second output terminal out2. A gate of the eighth transistor T8 is electrically connected to the first node N1, that is, the gate of the eighth transistor T8 is electrically connected to the second terminal of the input unit 10. A first pole of the eighth transistor T8 is electrically connected to the second output terminal out2, and a second pole of the eighth transistor T8 is electrically connected to the fourth signal terminal CK4.

Figure 4:
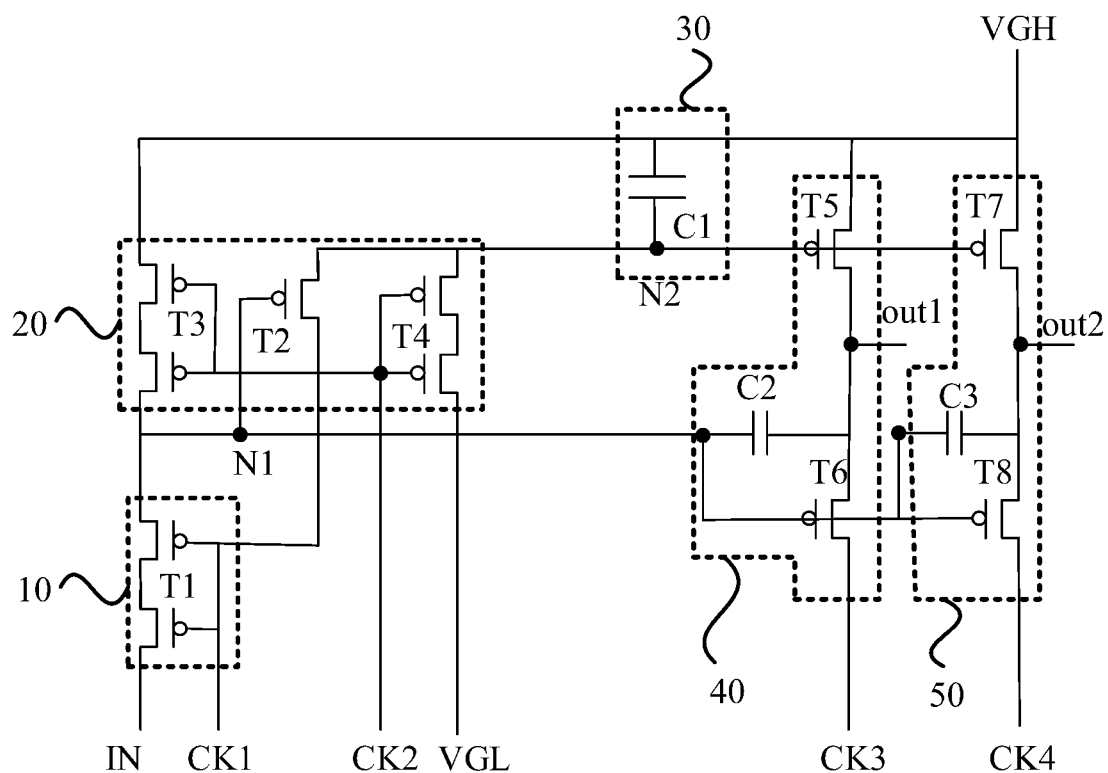
FIG. 4 is a circuit diagram of a shift register according to another embodiment of the present disclosure.

FIG. 4 is a circuit diagram of a shift register according to another embodiment of the present disclosure. Referring to FIG. 4, the first output unit 40 further includes a second capacitor C2, and a first electrode plate of the second capacitor C2 is electrically connected to the first node N1, that is, the first electrode plate of the second capacitor C2 is electrically connected to the gate of the sixth transistor T6. A second electrode plate of the second capacitor C2 is electrically connected to the first output terminal out1, that is, the second electrode plate of the second capacitor C2 is electrically connected to the first pole of the sixth transistor T6 so that the second capacitor C2 is connected in series between the gate of the sixth transistor T6 and the first pole of the sixth transistor T6, and a bootstrap function is achieved. The second output unit 50 further includes a third capacitor C3, and a first electrode plate of the third capacitor C3 is electrically connected to the first node N1, that is, the first electrode plate of the third capacitor C3 is electrically connected to the gate of the eighth transistor T8. A second electrode plate of the third capacitor C3 is electrically connected to the second output terminal out2, that is, the second electrode plate of the third capacitor C3 is electrically connected to the first pole of the eighth transistor T8 so that the third capacitor C3 is connected in series between the gate of the eighth transistor T8 and the first pole of the eighth transistor T8, and a bootstrap function is achieved.

Figure 5:
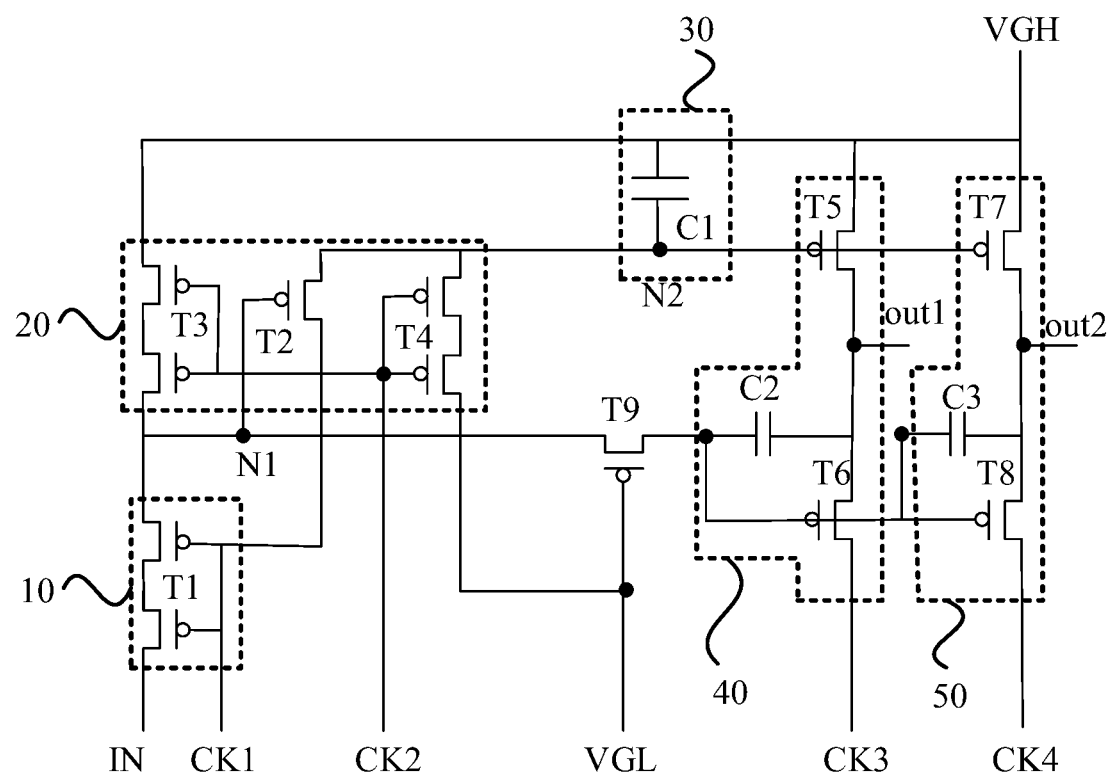
FIG. 5 is a circuit diagram of a shift register according to another embodiment of the present disclosure.

FIG. 5 is a circuit diagram of a shift register according to another embodiment of the present disclosure. Referring to FIG. 5, the gate driver circuit further includes a ninth transistor T9. A gate of the ninth transistor T9 is electrically connected to the first power supply voltage terminal VGL, a first pole of the ninth transistor T9 is electrically connected to the first node N1, and a second pole of the ninth transistor T9 is electrically connected to the second control terminal of the first output unit 40 and the second control terminal of the second output unit 50. In embodiments of the present disclosure, the gate of the ninth transistor T9 is electrically connected to the first power supply voltage terminal VGL, the ninth transistor T9 is always in a turned-on state, and the first node N1 controls the second control terminal of the first output unit 40 and the second control terminal of the second output unit 50. The advantage of arranging the ninth transistor T9 is that in the case where the voltage of the first node N1 is too low, the ninth transistor T9 is in a cut-off state so that the too low voltage is prevented from being applied to the second control terminal of the first output unit 40 and the second control terminal of the second output unit 50.

By way of example, referring to FIGS. 3 to 5, the first transistor T1, the third transistor T3, and the fourth transistor T4 each may be a double-gate transistor, and the double-gate transistor can reduce a leakage current.

Figure 6:
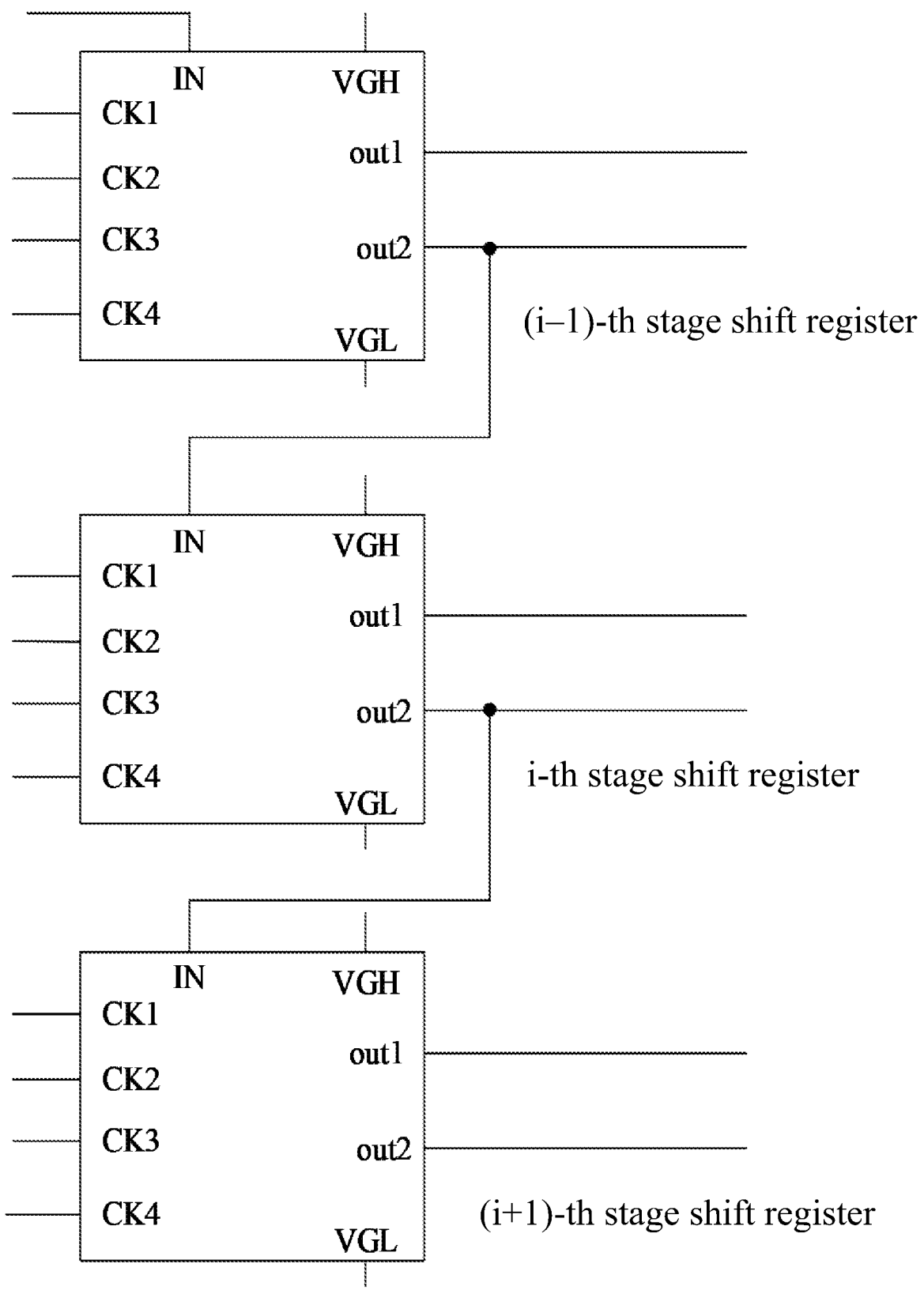
FIG. 6 is a structure diagram of a gate driver circuit according to another embodiment of the present disclosure.
Figure 7:
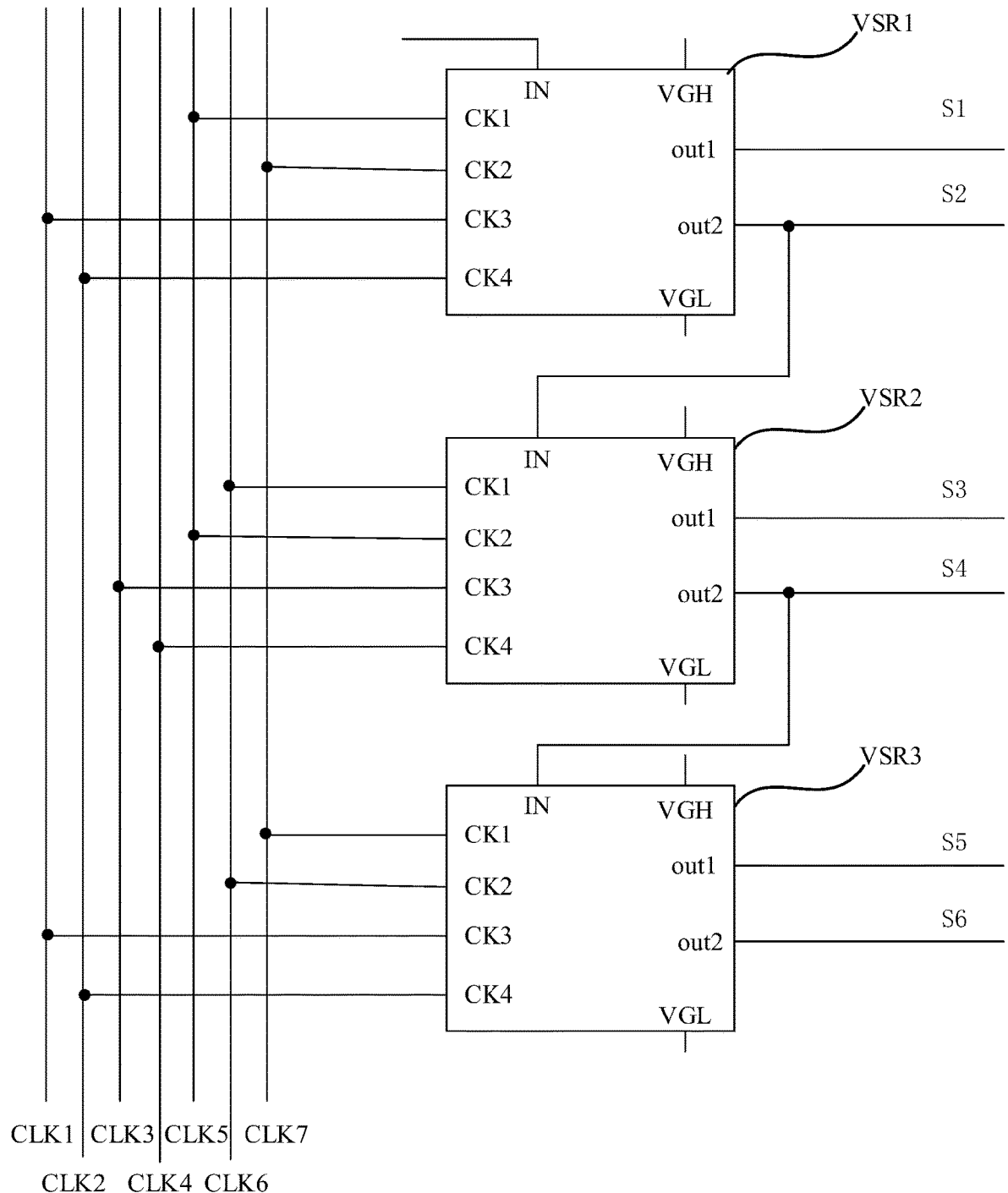
FIG. 7 is a structure diagram of a gate driver circuit according to another embodiment of the present disclosure.

FIG. 6 is a structure diagram of a gate driver circuit according to another embodiment of the present disclosure, and FIG. 7 is a structure diagram of a gate driver circuit according to another embodiment of the present disclosure. Referring to FIGS. 6 and 7, the gate driver circuit further includes multiple clock control lines. The first signal terminal CK1, the second signal terminal CK2, the third signal terminal CK3, and the fourth signal terminal CK4 of the shift register VSR are electrically connected to four of the multiple clock control lines, respectively. In embodiments of the present disclosure, the first signal terminal CK1, the second signal terminal CK2, the third signal terminal CK3, and the fourth signal terminal CK4 of a same shift register VSR are electrically connected to four different clock control lines, respectively so that the electrical signals may apply to the first signal terminal CK1, the second signal terminal CK2, the third signal terminal CK3, and the fourth signal terminal CK4 of the same shift register VSR, respectively through four different clock control lines.

In an embodiment, referring to FIG. 6, the signal input terminal IN of the i-th stage shift register is electrically connected to the second output terminal out2 of the (i−1)-th stage shift register, and the signal input terminal IN of the (i+1)-th stage shift register is electrically connected to the second output terminal out2 of the i-th stage shift register. i is a positive integer greater than 1.

By way of example, the signal input terminal IN of the second stage shift register is electrically connected to the second output terminal out2 of the first stage shift register, the signal input terminal IN of the third stage shift register is electrically connected to the second output terminal out2 of the second stage shift register, and others likewise.

In an embodiment, referring to FIG. 7, the gate driver circuit includes a first shift register VSR1, a second shift register VSR2, and a third shift register VSR3 that are sequentially cascaded. Since the first shift register VSR1, the second shift register VSR2, and the third shift register VSR3 are sequentially cascaded, the signal input terminal IN of the second shift register VSR2 is electrically connected to the second output terminal out2 of the first shift register VSR1, and the signal input terminal IN of the third shift register VSR3 is electrically connected to the second output terminal out2 of the second shift register VSR2. The multiple clock control lines include a first clock control line CLK1, a second clock control line CLK2, a third clock control line CLK3, a fourth clock control line CLK4, a fifth clock control line CLK5, a sixth clock control line CLK6, and a seventh clock control line CLK7. The first signal terminal CK1 of the first shift register VSR1 is electrically connected to the fifth clock control line CLK5, the second signal terminal CK2 of the first shift register VSR1 is electrically connected to the seventh clock control line CLK7, the third signal terminal CK3 of the first shift register VSR1 is electrically connected to the first clock control line CLK1, and the fourth signal terminal CK4 of the first shift register VSR1 is electrically connected to the second clock control line CLK2. The first signal terminal CK1 of the second shift register VSR2 is electrically connected to the sixth clock control line CLK6, the second signal terminal CK2 of the second shift register VSR2 is electrically connected to the fifth clock control line CLK5, the third signal terminal CK3 of the second shift register VSR2 is electrically connected to the third clock control line CLK3, and the fourth signal terminal CK4 of the second shift register VSR2 is electrically connected to the fourth clock control line CLK4. The first signal terminal CK1 of the third shift register VSR3 is electrically connected to the seventh clock control line CLK7, the second signal terminal CK2 of the third shift register VSR3 is electrically connected to the sixth clock control line CLK6, the third signal terminal CK3 of the third shift register VSR3 is electrically connected to the first clock control line CLK1, and the fourth signal terminal CK4 of the third shift register VSR3 is electrically connected to the second clock control line CLK2.

By way of example, referring to FIG. 7, the first stage shift register may be the first shift register VSR1, the second stage shift register may be the second shift register VSR2, and the third stage shift register may be the third shift register VSR3. Further, the fourth stage shift register may be the first shift register VSR1, the fifth stage shift register may be the second shift register VSR2, the sixth stage shift register may be the third shift register VSR3, and others likewise. In this manner, the signal input terminal IN of the first shift register VSR1 may be electrically connected to the second output terminal out2 of the third shift register VSR3.

Figure 8:
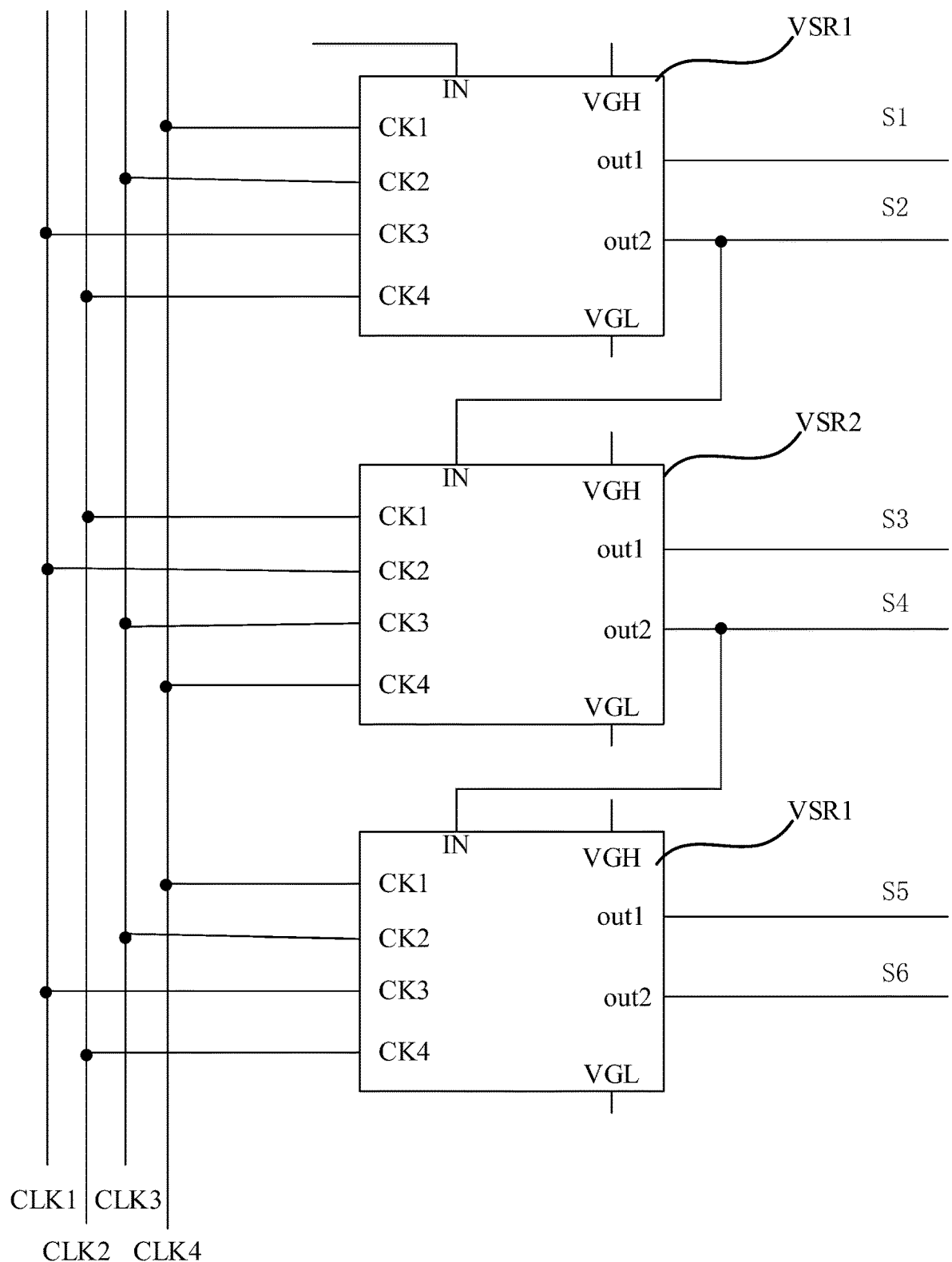
FIG. 8 is a structure diagram of a gate driver circuit according to another embodiment of the present disclosure.

FIG. 8 is a structure diagram of a gate driver circuit according to another embodiment of the present disclosure. Referring to FIG. 8, the gate driver circuit includes the first shift register VSR1 and the second shift register VSR2 that are sequentially cascaded. Since the first shift register VSR1 and the second shift register VSR2 are sequentially cascaded, the signal input terminal IN of the second shift register VSR2 is electrically connected to the second output terminal out2 of the first shift register VSR1. The multiple clock control lines include a first clock control line CLK1, a second clock control line CLK2, a third clock control line CLK3, and a fourth clock control line CLK4. The first signal terminal CK1 of the first shift register VSR1 is electrically connected to the fourth clock control line CLK4, the second signal terminal CK2 of the first shift register VSR1 is electrically connected to the third clock control line CLK3, the third signal terminal CK3 of the first shift register VSR1 is electrically connected to the first clock control line CLK1, and the fourth signal terminal CK4 of the first shift register VSR1 is electrically connected to the second clock control line CLK2. The first signal terminal CK1 of the second shift register VSR2 is electrically connected to the second clock control line CLK2, the second signal terminal CK2 of the second shift register VSR2 is electrically connected to the first clock control line CLK1, the third signal terminal CK3 of the second shift register VSR2 is electrically connected to the third clock control line CLK3, and the fourth signal terminal CK4 of the second shift register VSR2 is electrically connected to the fourth clock control line CLK4.

By way of example, referring to FIG. 8, the first stage shift register may be the first shift register VSR1, the second stage shift register may be the second shift register VSR2, and the third stage shift register may be the first shift register VSR1. Further, the fourth stage shift register may be the second shift register VSR2, the fifth stage shift register may be the first shift register VSR1, the sixth stage shift register may be the second shift register VSR2, and others likewise. In this manner, the signal input terminal IN of the first shift register VSR1 may be electrically connected to the second output terminal out2 of the second shift register VSR2.

Figure 9:
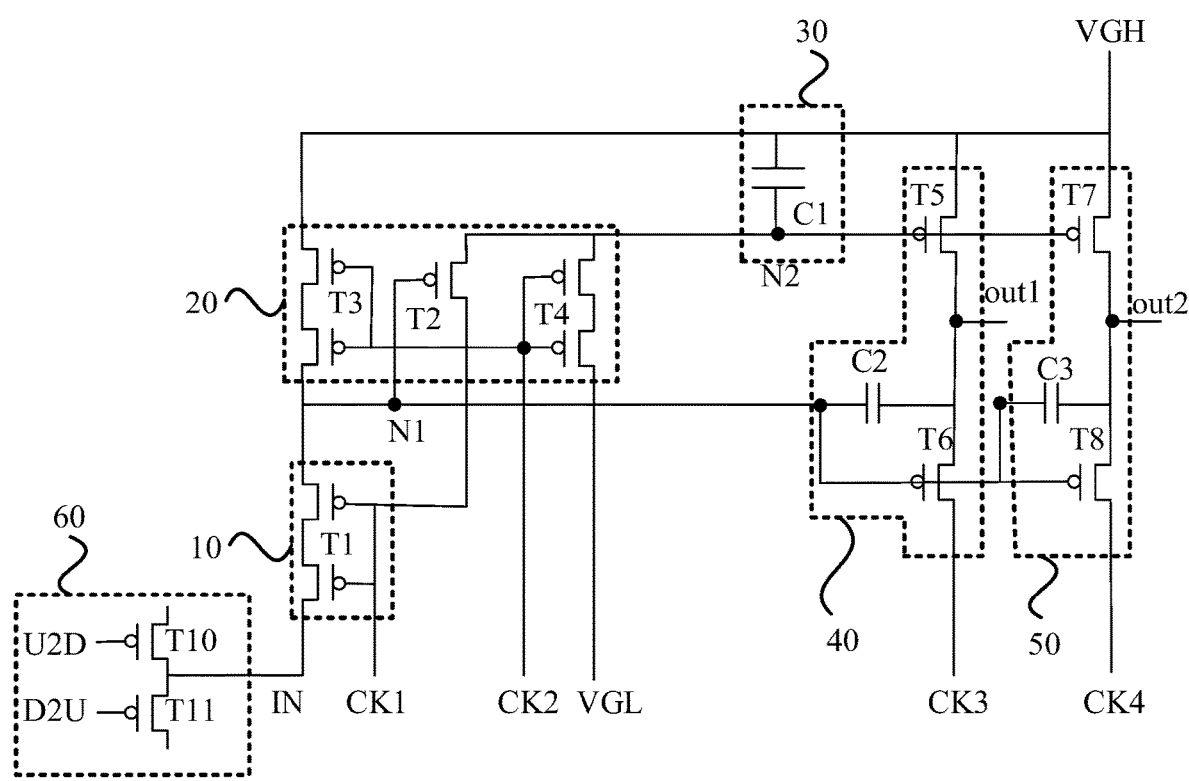
FIG. 9 is a circuit diagram of a shift register according to another embodiment of the present disclosure.

FIG. 9 is a circuit diagram of a shift register according to another embodiment of the present disclosure. Referring to FIG. 9, the shift register VSR further includes a forward and reverse control unit 60, and the forward and reverse control unit 60 includes a tenth transistor T10 and an eleventh transistor T11. A gate of the tenth transistor T10 is electrically connected to a first forward and reverse signal terminal U2D, a gate of the eleventh transistor T11 is electrically connected to a second forward and reverse signal terminal D2U, and a first pole of the tenth transistor T10 and a first pole of the eleventh transistor T11 are both electrically connected to the signal input terminal IN. That is, the first pole of the tenth transistor T10 is electrically connected to the first terminal of the input unit 10, and the first pole of the eleventh transistor T11 is electrically connected to the first terminal of the input unit 10. In embodiments of the present disclosure, the shift register VSR further includes the forward and reverse control unit 60 so that a gate driver circuit with a forward and reverse scanning function is provided, and thus the forward display and the reverse display can be achieved.

Figure 10:
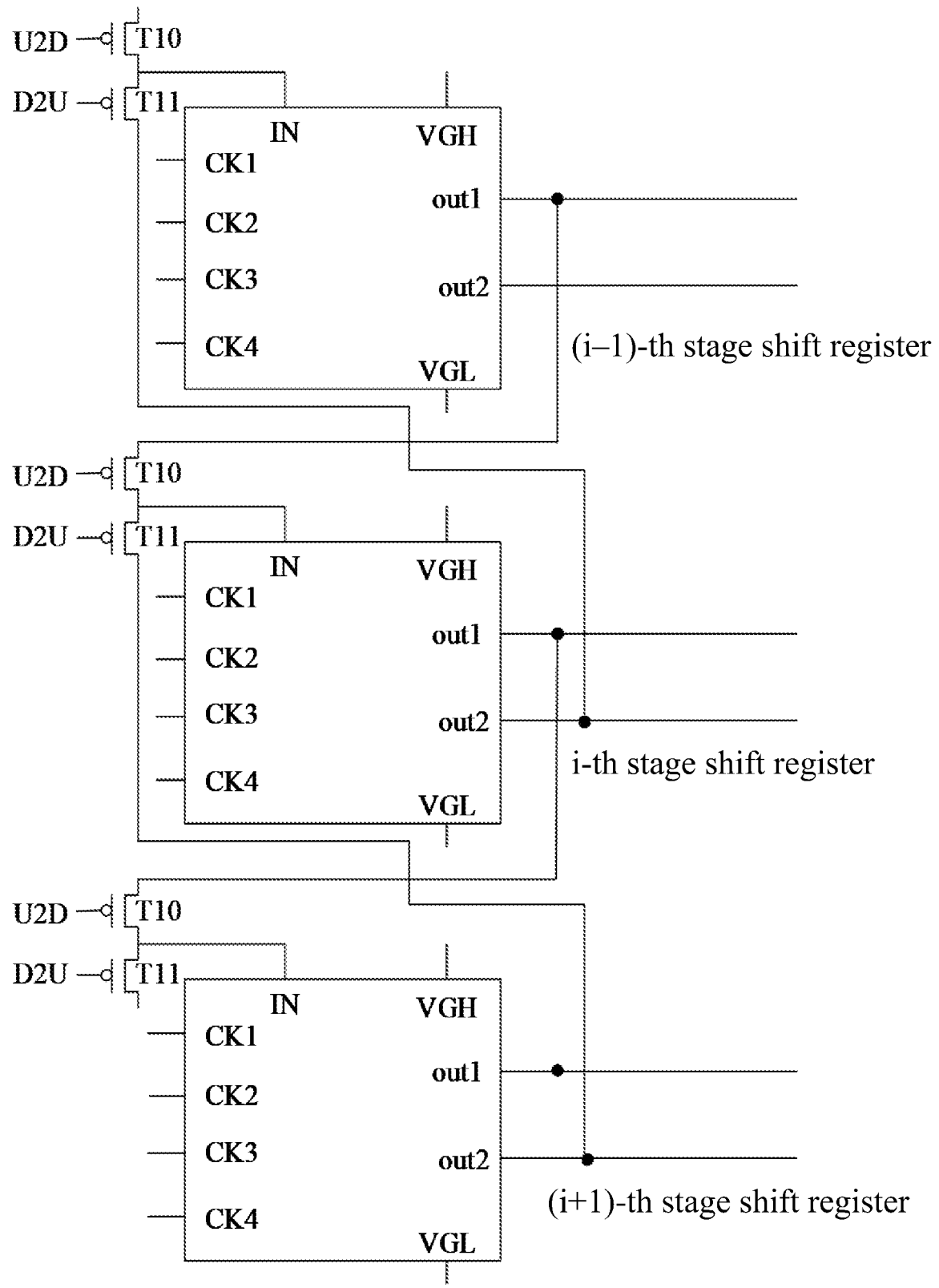
FIG. 10 is a structure diagram of a gate driver circuit according to another embodiment of the present disclosure.

FIG. 10 is a structure diagram of a gate driver circuit according to another embodiment of the present disclosure. Referring to FIG. 10, a second pole of the tenth transistor T10 in the i-th stage shift register is electrically connected to the first output terminal out1 of the (i−1)-th stage shift register. A second pole of the eleventh transistor T11 in the (i−1)-th stage shift register is electrically connected to the second output terminal out2 of the i-th stage shift register. A second pole of the tenth transistor T10 in the (i+1)-th stage shift register is electrically connected to the first output terminal out1 of the i-th stage shift register. A second pole of the eleventh transistor T11 in the i-th stage shift register is electrically connected to the second output terminal out2 of the (i+1)-th stage shift register. i is a positive integer greater than 1.

By way of example, a second pole of the tenth transistor T10 in the second stage shift register is electrically connected to the first output terminal out1 of the first stage shift register, a second pole of the eleventh transistor T11 in the first stage shift register is electrically connected to the second output terminal out2 of the second stage shift register, a second pole of the tenth transistor T10 in the third stage shift register is electrically connected to the first output terminal out1 of the second stage shift register, a second pole of the eleventh transistor T11 in the second stage shift register is electrically connected to the second output terminal out2 of the third stage shift register, and others likewise.

Figure 11:
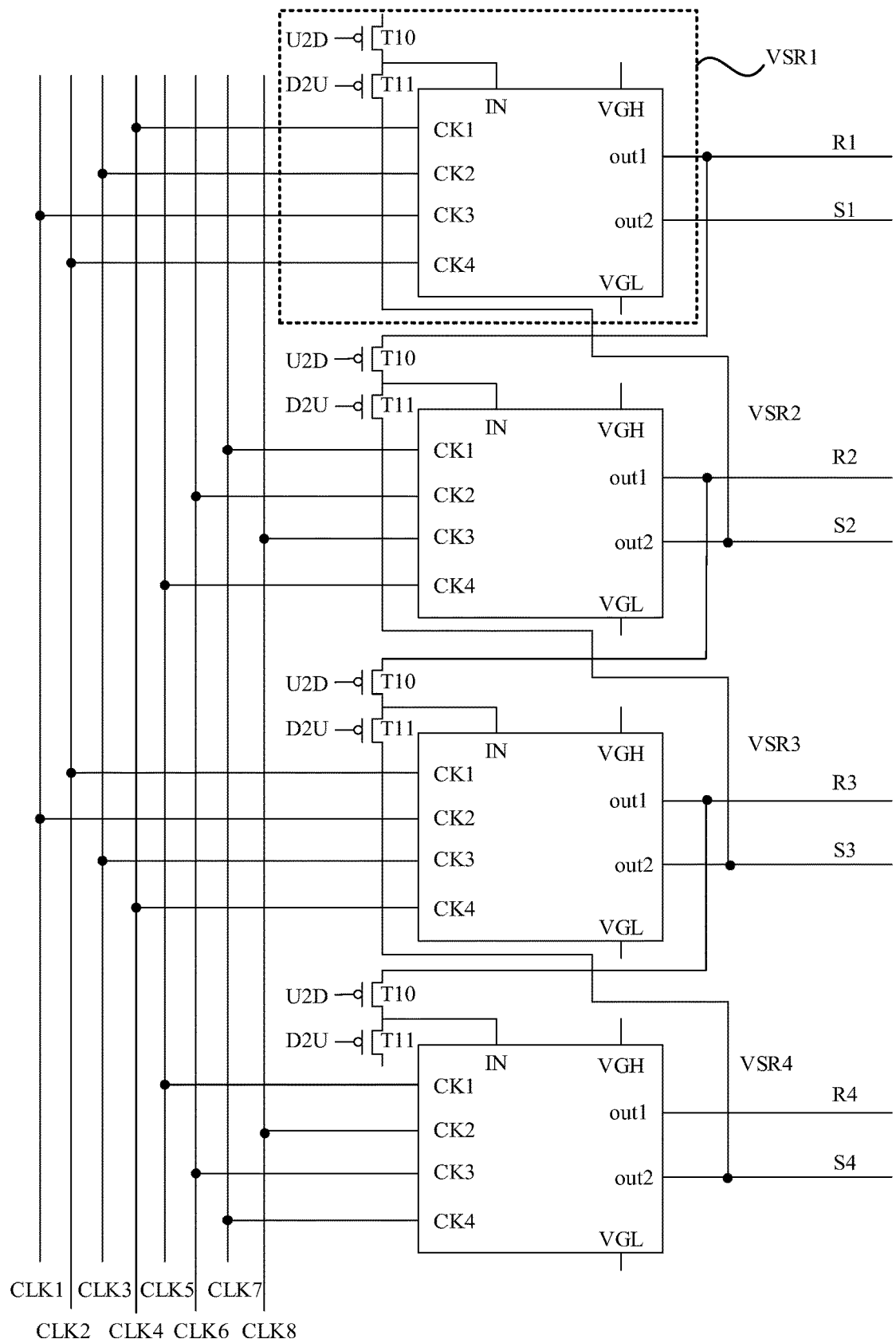
FIG. 11 is a structure diagram of a gate driver circuit according to another embodiment of the present disclosure.

FIG. 11 is a structure diagram of a gate driver circuit according to another embodiment of the present disclosure. Referring to FIGS. 10 and 11, the gate driver circuit includes the first shift register VSR1, the second shift register VSR2, and the third shift register VSR3, and the fourth shift register VSR4 that are sequentially cascaded. Since the first shift register VSR1, the second shift register VSR2, the third shift register VSR3, and the fourth shift register VSR4 are sequentially cascaded, a second pole of the tenth transistor T10 in the second shift register VSR2 is electrically connected to the first output terminal out1 of the first shift register VSR1. A second pole of the eleventh transistor T11 in the first shift register VSR1 is electrically connected to the second output terminal out2 of the second shift register VSR2. A second pole of the tenth transistor T10 in the third shift register VSR3 is electrically connected to the first output terminal out1 of the second shift register VSR2. A second pole of the eleventh transistor T11 in the second shift register VSR2 is electrically connected to the second output terminal out2 of the third shift register VSR3. A second pole of the tenth transistor T10 in the fourth shift register VSR4 is electrically connected to the first output terminal out1 of the third shift register VSR3. A second pole of the eleventh transistor T11 in the third shift register VSR3 is electrically connected to the second output terminal out2 of the fourth shift register VSR4. The multiple clock control lines include a first clock control line CLK1, a second clock control line CLK2, a third clock control line CLK3, a fourth clock control line CLK4, a fifth clock control line CLK5, a sixth clock control line CLK6, a seventh clock control line CLK7, and an eighth clock control line CLK8. The first signal terminal CK1 of the first shift register VSR1 is electrically connected to the fourth clock control line CLK4, the second signal terminal CK2 of the first shift register VSR1 is electrically connected to the third clock control line CLK3, the third signal terminal CK3 of the first shift register VSR1 is electrically connected to the first clock control line CLK1, and the fourth signal terminal CK4 of the first shift register VSR1 is electrically connected to the second clock control line CLK2. The first signal terminal CK1 of the second shift register VSR2 is electrically connected to the seventh clock control line CLK7, the second signal terminal CK2 of the second shift register VSR2 is electrically connected to the sixth clock control line CLK6, the third signal terminal CK3 of the second shift register VSR2 is electrically connected to the eighth clock control line CLK8, and the fourth signal terminal CK4 of the second shift register VSR2 is electrically connected to the fifth clock control line CLK5. The first signal terminal CK1 of the third shift register VSR3 is electrically connected to the second clock control line CLK2, the second signal terminal CK2 of the third shift register VSR3 is electrically connected to the first clock control line CLK1, the third signal terminal CK3 of the third shift register VSR3 is electrically connected to the third clock control line CLK3, and the fourth signal terminal CK4 of the third shift register VSR3 is electrically connected to the fourth clock control line CLK4. The first signal terminal CK1 of the fourth shift register VSR4 is electrically connected to the fifth clock control line CLK5, the second signal terminal CK2 of the fourth shift register VSR4 is electrically connected to the eighth clock control line CLK8, the third signal terminal CK3 of the fourth shift register VSR4 is electrically connected to the sixth clock control line CLK6, and the fourth signal terminal CK4 of the fourth shift register VSR4 is electrically connected to the seventh clock control line CLK7.

By way of example, referring to FIG. 11, the first stage shift register may be the first shift register VSR1, the second stage shift register may be the second shift register VSR2, the third stage shift register may be the third shift register VSR3, and the fourth stage shift register may be the fourth shift register VSR4. By way of example, the fifth stage shift register may be the first shift register VSR1, the sixth stage shift register may be the second shift register VSR2, the seventh stage shift register may be the third shift register VSR3, the eighth stage shift register may be the fourth shift register VSR4, and others likewise. In this manner, a second pole of the tenth transistor T10 in the first shift register VSR1 is electrically connected to the first output terminal out1 of the fourth shift register VSR4. A second pole of the eleventh transistor T11 in the fourth shift register VSR4 is electrically connected to the second output terminal out2 of the first shift register VSR1.

Figure 12:
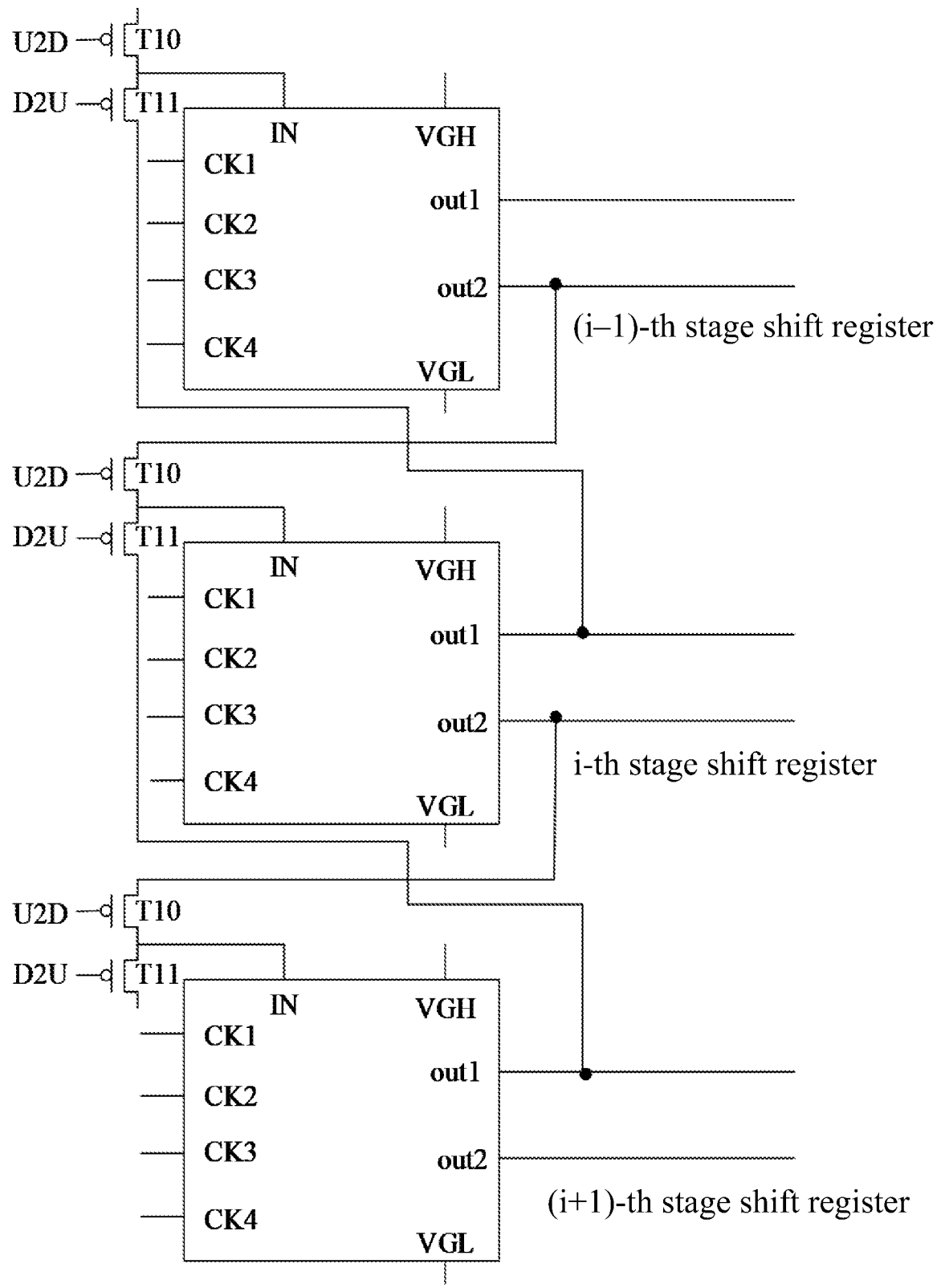
FIG. 12 is a structure diagram of a gate driver circuit according to another embodiment of the present disclosure.

FIG. 12 is a structure diagram of a gate driver circuit according to another embodiment of the present disclosure. Referring to FIG. 12, the second pole of the tenth transistor T10 in the i-th stage shift register is electrically connected to the second output terminal out2 of the (i−1)-th stage shift register, and the second pole of the eleventh transistor T11 in the (i−1)-th stage shift register is electrically connected to the first output terminal out1 of the i-th stage shift register. The second pole of the tenth transistor T10 in the (i+1) stage shift register is electrically connected to the second output terminal out2 of the i-th stage shift register, and the second pole of the eleventh transistor T11 in the i-th stage shift register is electrically connected to the first output terminal out1 of the (i+1)-th stage shift register. i is a positive integer greater than 1.

By way of example, the second pole of the tenth transistor T10 in the second stage shift register is electrically connected to the second output terminal out2 of the first stage shift register, and the second pole of the eleventh transistor T11 in the first stage shift register is electrically connected to the first output terminal out1 of the second stage shift register. The second pole of the tenth transistor T10 in the third stage shift register is electrically connected to the second output terminal out2 of the second stage shift register, and the second pole of the eleventh transistor T11 in the second stage shift register is electrically connected to the first output terminal out1 of the third stage shift register; and others likewise.

Figure 13:
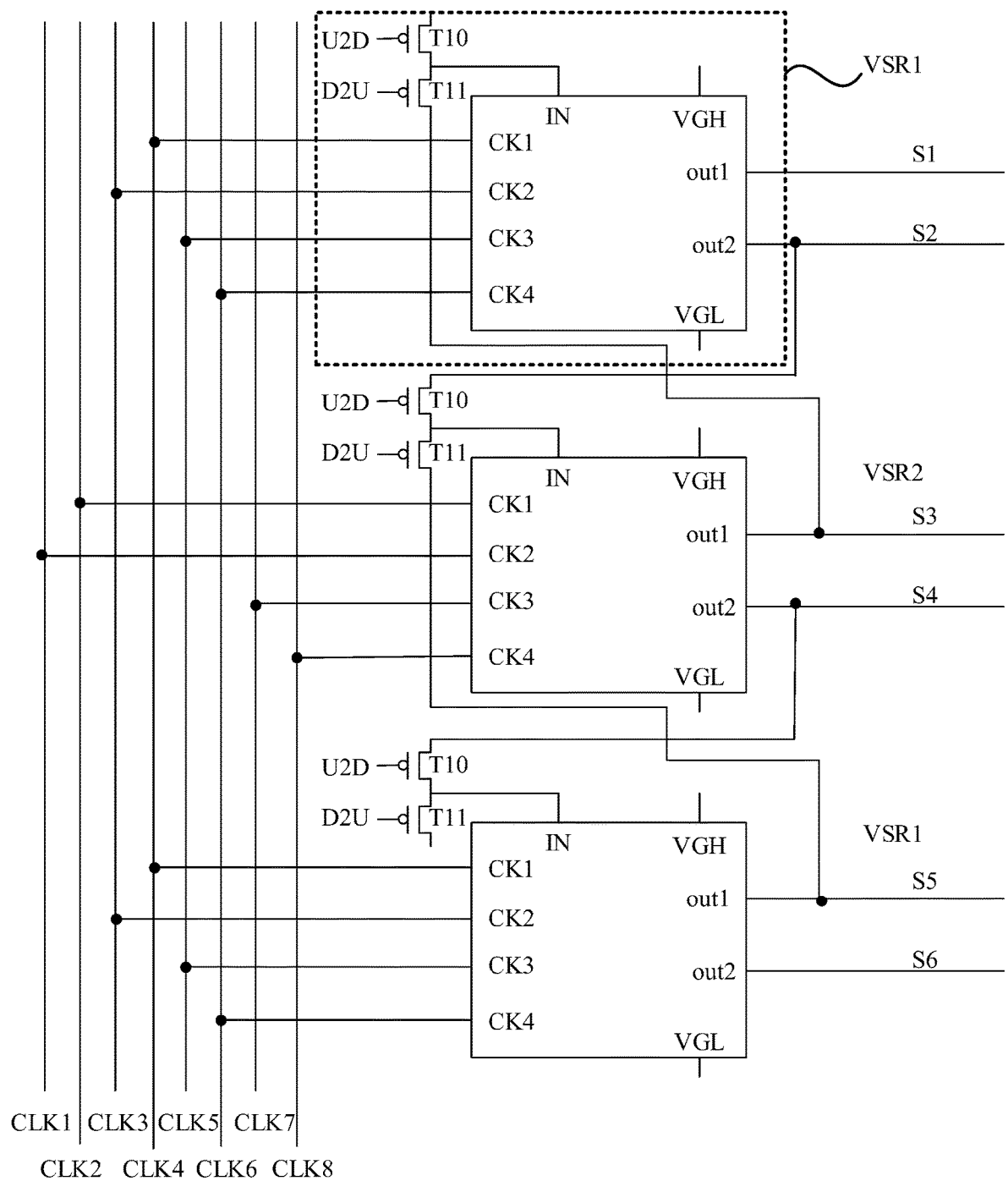
FIG. 13 is a structure diagram of a gate driver circuit according to another embodiment of the present disclosure.

FIG. 13 is a structure diagram of a gate driver circuit according to another embodiment of the present disclosure. Referring to FIGS. 12 and 13, the gate driver circuit includes a first shift register VSR1 and a second shift register VSR2 that are sequentially cascaded. Since the first shift register VSR1 and the second shift register VSR2 are sequentially cascaded, the second pole of the tenth transistor T10 in the second shift register VSR2 is electrically connected to the second output terminal out2 of the first shift register VSR1, and the second pole of the eleventh transistor T11 in the first stage shift register is electrically connected to the first output terminal out1 of the second stage shift register. The multiple clock control lines include a first clock control line CLK1, a second clock control line CLK2, a third clock control line CLK3, a fourth clock control line CLK4, a fifth clock control line CLK5, a sixth clock control line CLK6, a seventh clock control line CLK7, and an eighth clock control line CLK8. The first signal terminal CK1 of the first shift register VSR1 is electrically connected to the fourth clock control line CLK4, the second signal terminal CK2 of the first shift register VSR1 is electrically connected to the third clock control line CLK3, the third signal terminal CK3 of the first shift register VSR1 is electrically connected to the fifth clock control line CLK5, and the fourth signal terminal CK4 of the first shift register VSR1 is electrically connected to the sixth clock control line CLK6. The first signal terminal CK1 of the second shift register VSR2 is electrically connected to the second clock control line CLK2, the second signal terminal CK2 of the second shift register VSR2 is electrically connected to the first clock control line CLK1, the third signal terminal CK3 of the second shift register VSR2 is electrically connected to the seventh clock control line CLK7, and the fourth signal terminal CK4 of the second shift register VSR2 is electrically connected to the eighth clock control line CLK8.

By way of example, referring to FIG. 13, the first stage shift register may be the first shift register VSR1, the second stage shift register may be the second shift register VSR2, and the third stage shift register may be the first shift register VSR1; further, the fourth stage shift register may be the second shift register VSR2; and others likewise. In this manner, the second pole of the tenth transistor T10 in the first shift register VSR1 is electrically connected to the second output terminal out2 of the second shift register VSR2, and the second pole of the eleventh transistor T11 in the second shift register VSR2 is electrically connected to the first output terminal out1 of the first shift register VSR1.

In an embodiment, with continued reference to FIG. 5, the first power supply voltage terminal VGL provides a low level, and the second power supply voltage terminal VGH provides a high level.

In an embodiment, with continued reference to FIG. 5, in the same shift register VSR, the first output terminal out1 and the second output terminal out2 output effective level signals successively. In an embodiment, the first output terminal out1 of a shift register VSR outputs an effective level signal, and then the second output terminal out2 of the same shift register VSR outputs an effective level signal. In another embodiment, the second output terminal out2 of a shift register VSR outputs an effective level signal, and then the first output terminal out1 of the same shift register VSR outputs an effective level signal.

By way of example, with continued reference to FIG. 5, a P-type transistor is used as an example in embodiments of the present disclosure. For example, the first transistor T1, the second transistor T2, the third transistor T3, the fourth transistor T4, the fifth transistor T5, the sixth transistors T6, the seventh transistor T7, the eighth transistor T8, and the ninth transistor T9 each is a P-type transistor. For the P-type transistor, the effective level is a low level, and the ineffective level is a high level, that is, the P-type transistor is turned on by a low level and is cut off by a high level. In other embodiments, the transistors in the gate driver circuit each may be an N-type transistor. In this case, for the N-type transistor, the effective level is a high level, and the ineffective level is a low level.

Figure 14:
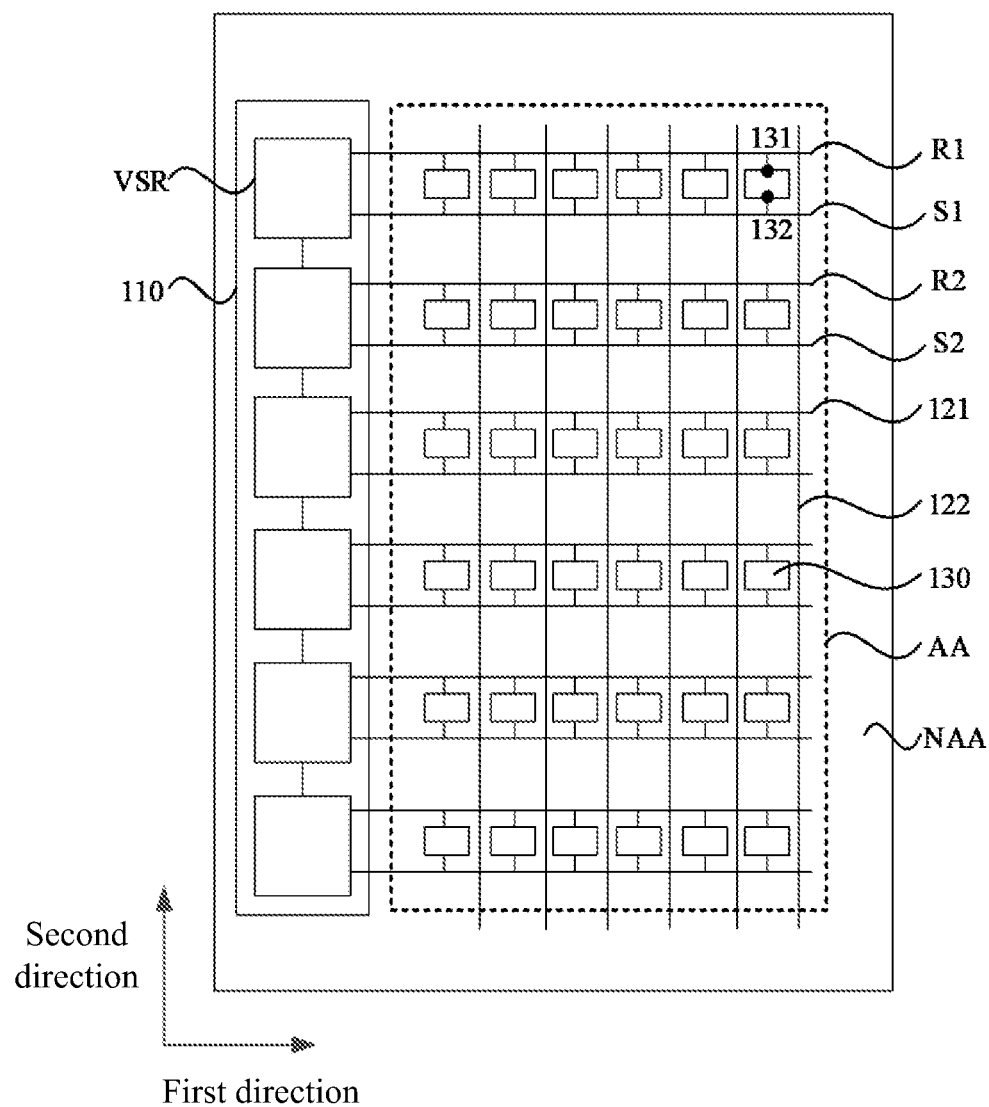
FIG. 14 is a structure diagram of a display panel according to an embodiment of the present disclosure.

FIG. 14 is a structure diagram of a display panel according to an embodiment of the present disclosure. Referring to FIG. 14, the display device includes the gate driver circuit 110 in the preceding embodiments. Since the display panel provided in embodiments of the present disclosure includes the gate driver circuit 110 in the preceding embodiments, one shift register VSR in the gate driver circuit 110 may output two control signals so that the number of shift registers VSR in the gate driver circuit 110 can be reduced, and thus the bezel of the display panel can be reduced.

In an embodiment, referring to FIG. 14, the display panel further includes multiple pixel driver circuits 130 arranged in an array. Each pixel driver circuit 130 includes a first scanning signal terminal 131 and a second scanning signal terminal 132 (the first scanning signal terminal 131 and the second scanning signal terminal 132 are highlighted by dots in FIG. 14). The first output terminal out1 of a j-th stage shift register VSR is electrically connected to the first scanning signal terminal 131 of each of the pixel driver circuits 130 in a j-th row, and the second output terminal out2 of the j-th stage shift register VSR is electrically connected to the second scanning signal terminal 132 of each of the pixel driver circuits 130 in the j-th row. j is a positive integer greater than or equal to 1. In embodiments of the present disclosure, the first output terminal out1 is electrically connected to the first scanning signal terminals 131, and the second output terminal out2 is electrically connected to the second scanning signal terminals 132 so that each shift register VSR may provide control signals for pixel driver circuits 130 in a same row.

By way of example, the first output terminal out1 of the first stage shift register VSR is electrically connected to the first scanning signal terminals 131 of the pixel driver circuits 130 in the first row, and the second output terminal out2 of the first stage shift register VSR is electrically connected to the second scanning signal terminals 132 of the pixel driver circuits 130 in the first row. The first output terminal out1 of the second stage shift register VSR is electrically connected to the first scanning signal terminals 131 of the pixel driver circuits 130 in the second row, and the second output terminal out2 of the second stage shift register VSR is electrically connected to the second scanning signal terminals 132 of the pixel driver circuits 130 in the second row.

By way of example, referring to FIG. 14, the display panel includes a display region AA and a non-display region NAA, the gate driver circuit 110 is located in the non-display region NAA, the pixel driver circuits 130 are located in the display region AA, and multiple pixel driver circuits 130 are arranged in an array along a first direction and a second direction. The display panel further includes multiple scanning lines 121 and multiple data lines 122. The multiple scanning lines 121 extend along the first direction and are arranged along the second direction. The multiple data lines 122 extend along the second direction and are arranged along the first direction. The first output terminal out1 is electrically connected to one scanning line 121, the second output terminal out2 is electrically connected to one scanning line 121, and each shift register VSR is electrically connected to two scanning lines 121.

Figure 15:
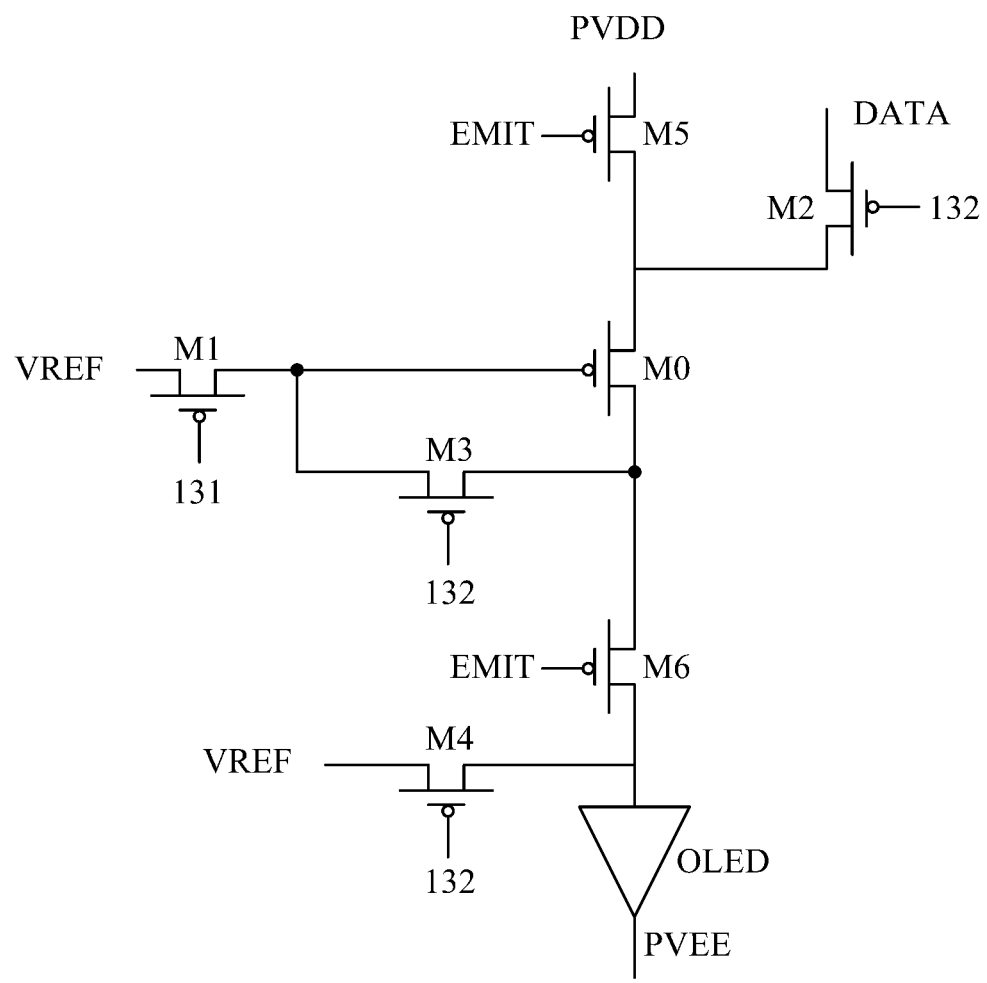
FIG. 15 is a circuit diagram of a pixel driver circuit according to an embodiment of the present disclosure.

FIG. 15 is a circuit diagram of a pixel driver circuit according to an embodiment of the present disclosure. Referring to FIGS. 14 and 15, the pixel driver circuit 130 includes a first switching tube M1, a second switching tube M2, a third switching tube M3, a fourth switching tube M4, a fifth switching tube M5, a sixth switching tube M6, and a drive transistor M0. A gate of the first switching tube M1 is electrically connected to the first scanning signal terminal 131, a first pole of the first switching tube M1 is connected to a reference voltage terminal VREF, and a second pole of the first switching tube M1 is electrically connected to a gate of the drive transistor M0. A gate of the second switching tube M2 is electrically connected to the second scanning signal terminal 132, a first pole of the second switching tube M2 is electrically connected to a data terminal DATA, and a second pole of the second switching tube M2 is electrically connected to a first pole of the drive transistor M0. A gate of the third switching tube M3 is electrically connected to the second scanning signal terminal 132, a first pole of the third switching tube M3 is electrically connected to the gate of the drive transistor M0, and a second pole of the third switching tube M3 is electrically connected to a second pole of the drive transistor M0. A gate of the fourth switching tube M4 is electrically connected to the second scanning signal terminal 132, a first pole of the fourth switching tube M4 is electrically connected to the reference voltage terminal VREF, and a second pole of the fourth switching tube M4 is electrically connected to an anode of a light-emitting device OLED. A gate of the fifth switching tube M5 is electrically connected to a light-emitting control terminal EMIT, a first pole of the fifth switching tube M5 is electrically connected to a first power supply terminal PVDD, and a second pole of the fifth switching tube M5 is electrically connected to the first pole of the drive transistor M0. A gate of the sixth switching tube M6 is electrically connected to the light-emitting control terminal EMIT, a first pole of the sixth switching tube M6 is electrically connected to the second pole of the drive transistor M0, and a second pole of the sixth switching tube M6 is electrically connected to an anode of the light-emitting device OLED. A cathode of the light-emitting device OLED is electrically connected to a second power supply terminal PVEE. By way of example, the first scanning signal terminal 131 is configured to perform initialization control on the pixel driver circuit, and the second scanning signal terminal 132 is configured to perform compensation control on the pixel driver circuit. The data terminal DATA is electrically connected to the data line 122, the first power supply terminal PVDD is electrically connected to the second power supply voltage terminal VGH, and the second power supply terminal PVEE is electrically connected to the first power supply voltage terminal VGL. In embodiments of the present disclosure, the light-emitting device OLED is an organic light-emitting device, and the display panel is an organic light-emitting display panel. In other embodiments, the pixel driver circuit 130 may further be configured to drive a liquid crystal display panel, a quantum dot display panel, a micro light-emitting diode display panel, and the like.

Figure 16:
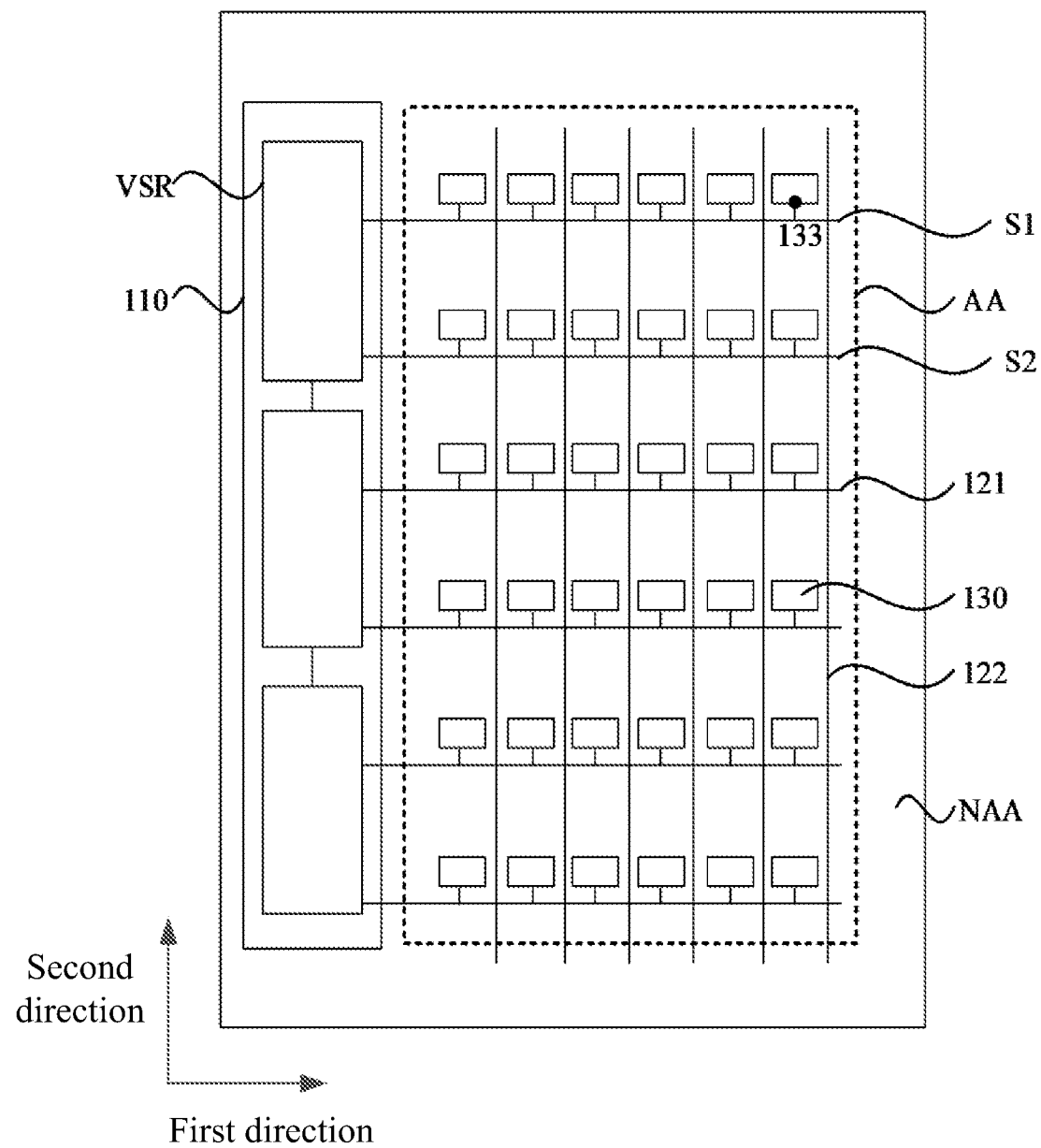
FIG. 16 is a structure diagram of another display panel according to an embodiment of the present disclosure.

FIG. 16 is a structure diagram of a display panel according to another embodiment of the present disclosure. Referring to FIG. 16, the display panel further includes multiple pixel driver circuits 130 arranged in an array (a scanning signal terminal 133 is highlighted by a dot in FIG. 16). The pixel driver circuit 130 includes a scanning signal terminal 133. The first output terminal out1 of the j-th stage shift register VSR is electrically connected to scanning signal terminals 133 of the pixel driver circuits 130 in the (2j−1)-th row, and the second output terminal out2 of the j-th stage shift register VSR is electrically connected to scanning signal terminals 133 of the pixel driver circuits 130 in the 2j-th row. j is a positive integer greater than or equal to 1. In embodiments of the present disclosure, the first output terminal out1 and the second output terminal out2 are electrically connected to two rows of scanning signal terminals 133, respectively so that each shift register VSR may provide control signals for two rows of pixel driver circuits 130.

By way of example, the first output terminal out1 of the first stage shift register VSR is electrically connected to the scanning signal terminals 133 of the pixel driver circuits 130 in the first row, and the second output terminal out2 of the first stage shift register VSR is electrically connected to the scanning signal terminals 133 of the pixel driver circuits 130 in the second row. The first output terminal out1 of the second stage shift register VSR is electrically connected to the scanning signal terminals 133 of the pixel driver circuits 130 in the third row, and the second output terminal out2 of the second stage shift register VSR is electrically connected to the scanning signal terminals 133 of the pixel driver circuits 130 in the fourth row; and other likewise. The pixel driver circuit 130 in embodiments of the present disclosure may be, for example, 2T1C, 7T1C, or other pixel driver circuits known in the art, which will not be repeated herein.

Figure 17:
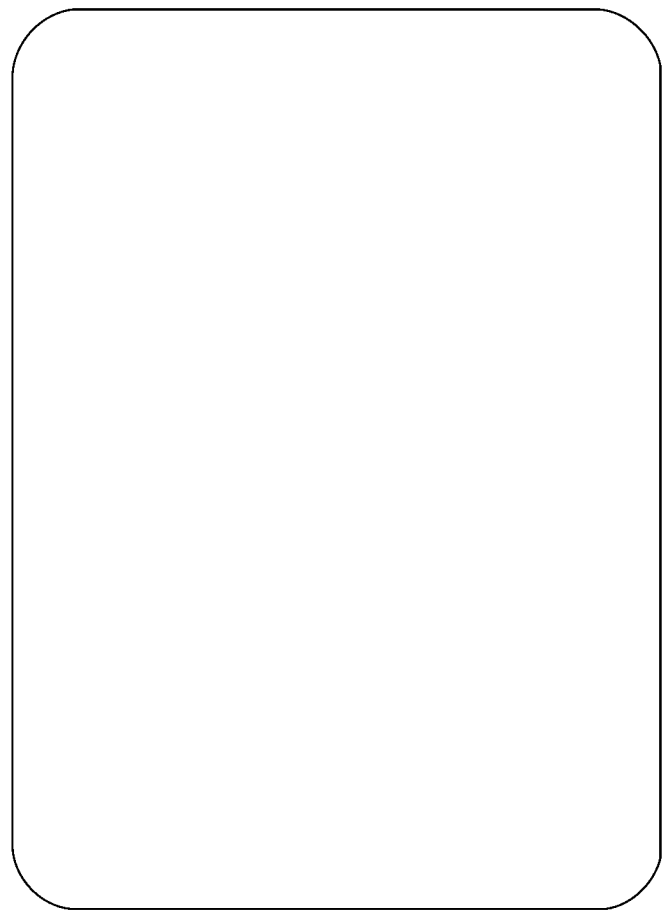
FIG. 17 is a structure diagram of a display device according to an embodiment of the present disclosure.

Embodiments of the present disclosure further provide a display device. FIG. 17 is a structure diagram of a display device according to an embodiment of the present disclosure. Referring to FIG. 17, the display device includes any display panel provided in embodiments of the present disclosure. The display device may specifically be a mobile phone, a tablet computer, an in-vehicle display device, a smart wearable device, and the like.

Figure 18:
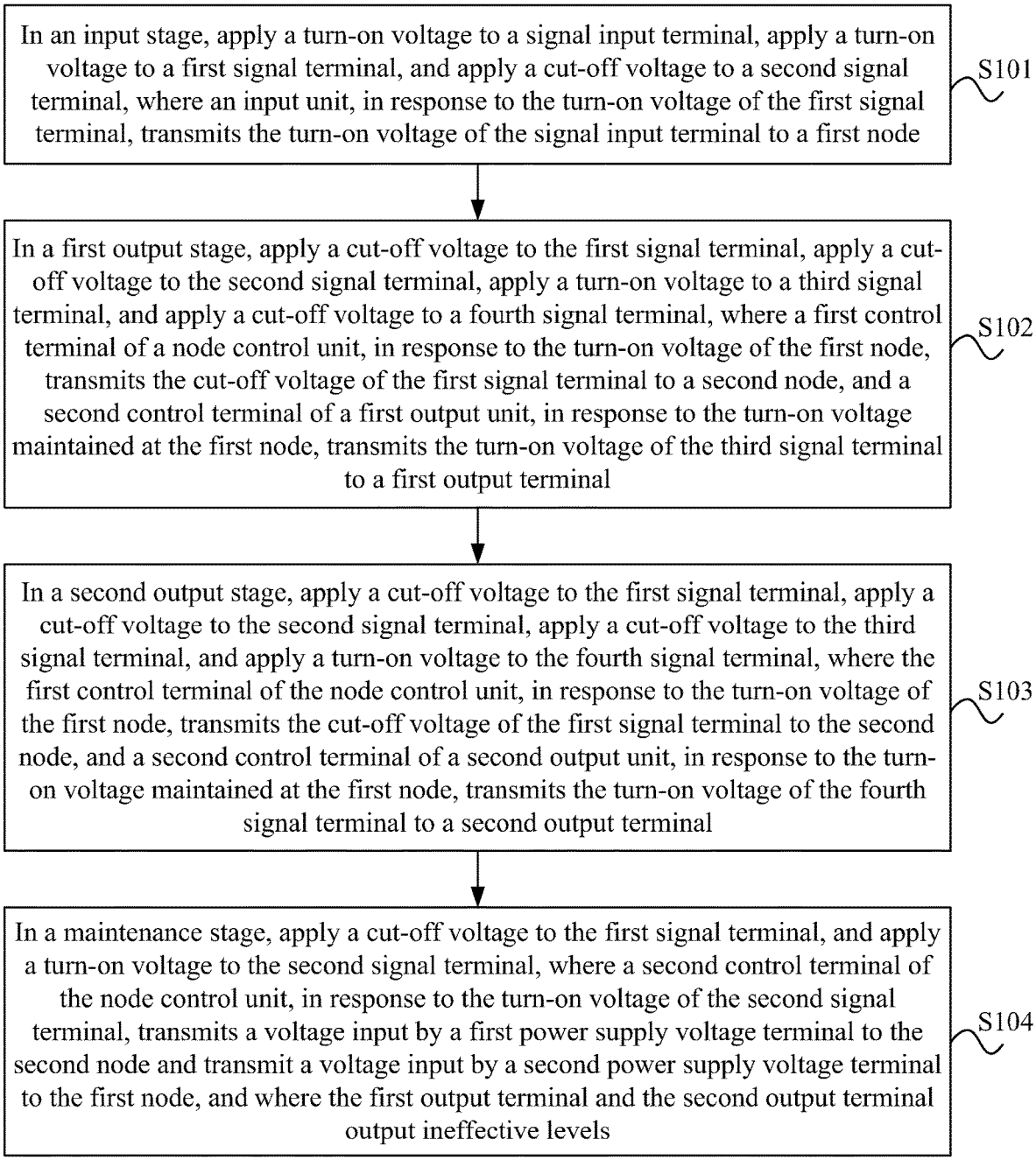
FIG. 18 is a flowchart of a driving method of a gate driver circuit according to an embodiment of the present disclosure.
Figure 19:
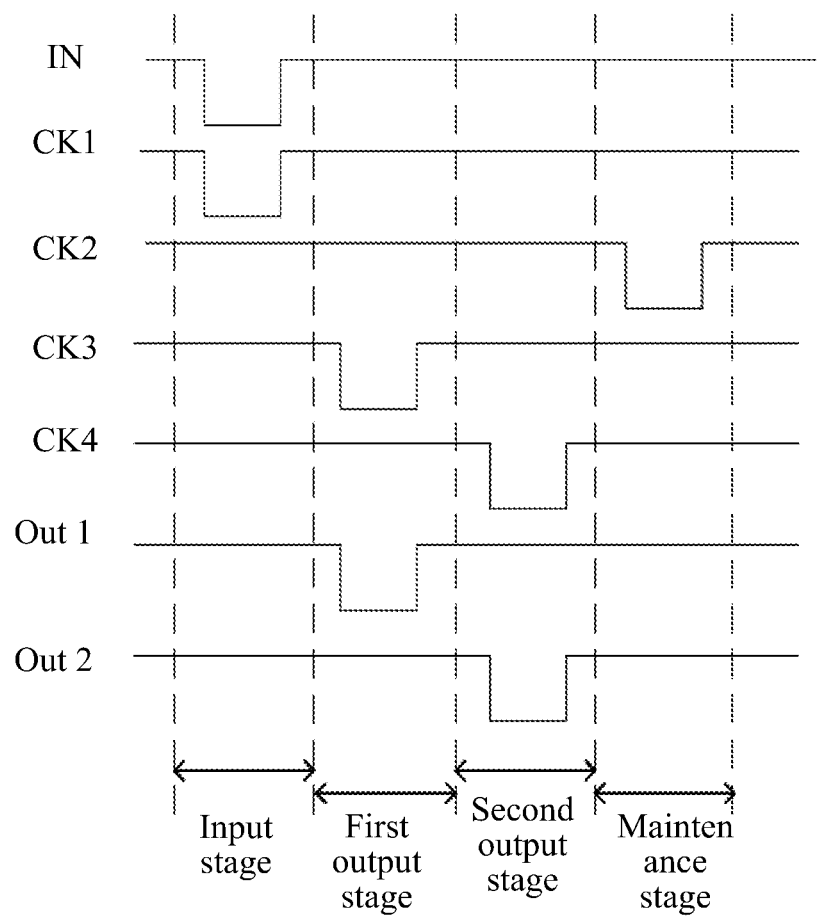
FIG. 19 is a driving timing sequence diagram of a gate driver circuit according to an embodiment of the present disclosure.
Figure 20:
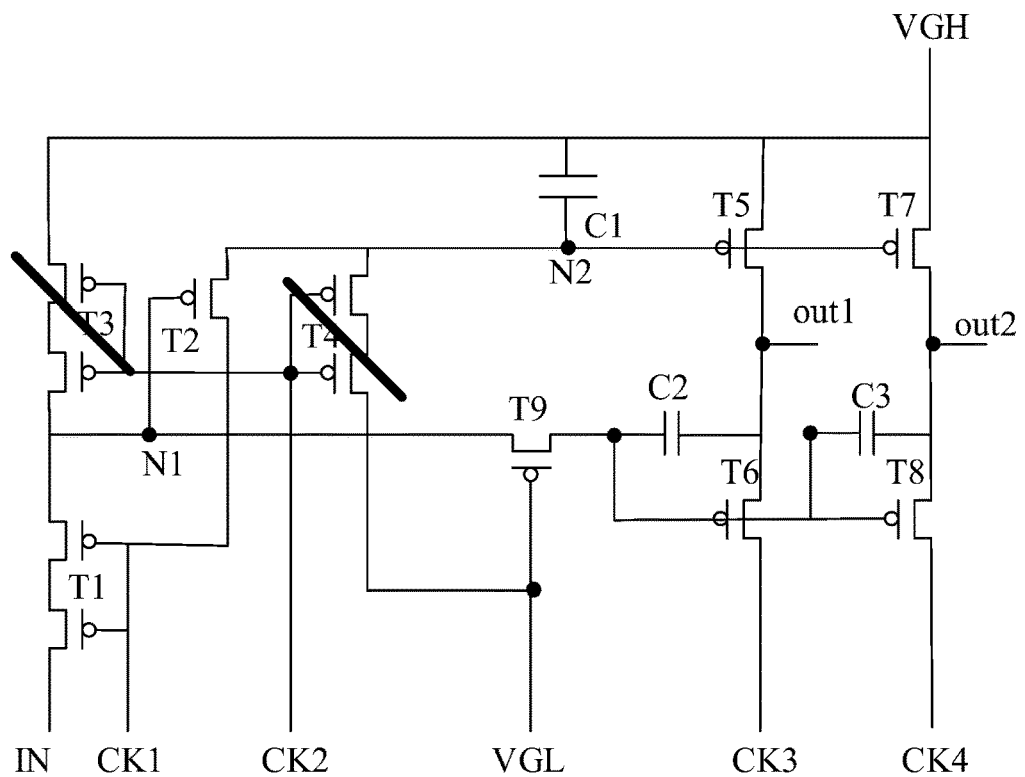
FIG. 20 is a diagram of a gate driver circuit in an input stage.
Figure 21:
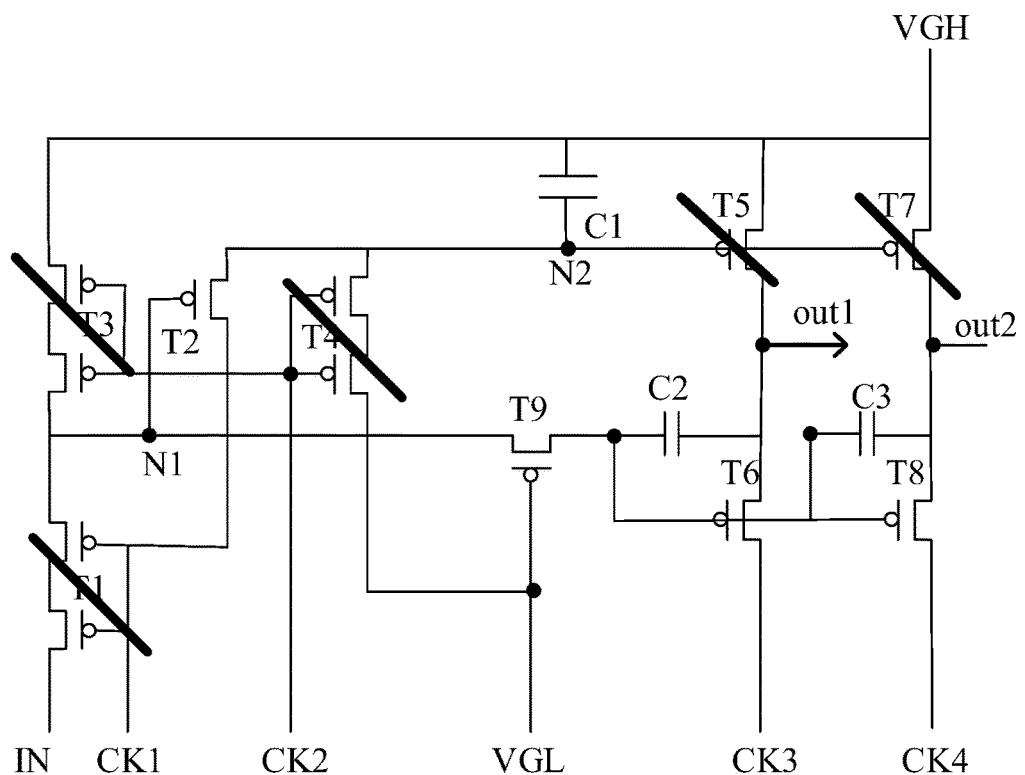
FIG. 21 is a diagram of a gate driver circuit in a first output stage.
Figure 22:
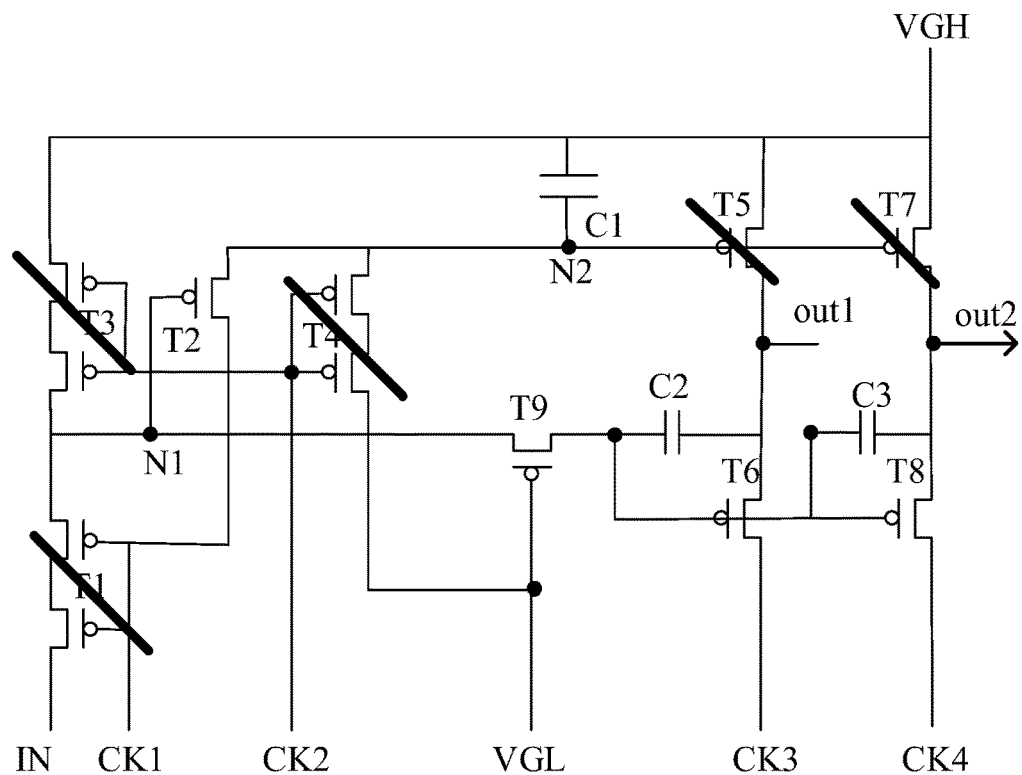
FIG. 22 is a diagram of a gate driver circuit in a second output stage.
Figure 23:
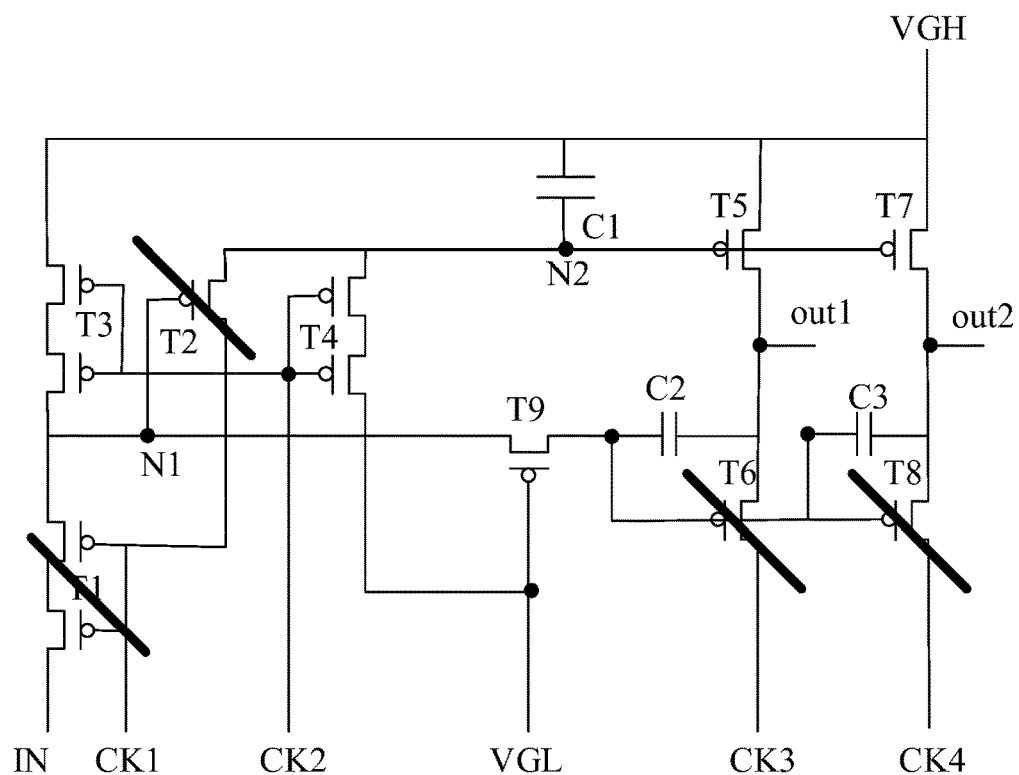
FIG. 23 is a diagram of a gate driver circuit in a maintenance stage.

FIG. 18 is a flowchart of a driving method of a gate driver circuit according to an embodiment of the present disclosure, FIG. 19 is a driving timing sequence diagram of a gate driver circuit according to an embodiment of the present disclosure, FIG. 20 is a diagram of a gate driver circuit in an input stage, FIG. 21 is a diagram of a gate driver circuit in a first output stage, FIG. 22 is a diagram of a gate driver circuit in a second output stage, and FIG. 23 is a diagram of a gate driver circuit in a maintenance stage. Referring to FIGS. 18 to 23, the driving method of a gate driver circuit includes the steps described below.

In S101, in an input stage, a turn-on voltage is applied to a signal input terminal IN, a turn-on voltage is applied to a first signal terminal CK1, and a cut-off voltage is applied to a second signal terminal CK2; an input unit 10, in response to the turn-on voltage of the first signal terminal CK1, transmits the turn-on voltage of the signal input terminal IN to a first node N1.

By way of example, referring to FIGS. 19 and 20, in the input stage, a low level is applied to the first signal terminal CK1 so that a first transistor T1 is turned on. A low level is applied to the signal input terminal IN, and the low level of the signal input terminal IN is transmitted to the first node N1 so that the first node N1 is at a low level. The first node N1 is connected to a gate of a second transistor T2, the second transistor T2 is turned on, and the low level of the first signal terminal CK1 is transmitted to a second node N2. The second node N2 is connected to a gate of a fifth transistor T5 and a gate of a seventh transistor T7, the fifth transistor T5 and the seventh transistor T7 are turned on, a high level of a second power supply voltage terminal VGH is transmitted to a first output terminal out1 through the fifth transistor T5, and a high level of the second power supply voltage terminal VGH is transmitted to a second output terminal out2 through the seventh transistor T7. A high level is applied to the second signal terminal CK2 so that a third transistor T3 and a fourth transistor T4 are cut off.

In S102, in a first output stage, a cut-off voltage is applied to the first signal terminal CK1, a cut-off voltage is applied to the second signal terminal CK2, a turn-on voltage is applied to a third signal terminal CK3, and a cut-off voltage is applied to a fourth signal terminal CK4; a first control terminal of a node control unit 20, in response to the turn-on voltage of the first node N1, transmits the cut-off voltage of the first signal terminal CK1 to the second node N2, and a second control terminal of a first output unit 40, in response to the turn-on voltage maintained of the first node N1, transmits the turn-on voltage of the third signal terminal CK3 to the first output terminal out1.

By way of example, referring to FIGS. 19 and 21, in the first output stage, a high level is applied to the first signal terminal CK1 so that the first transistor T1 is cut off. The first node N1 maintains the low level of the input stage so that the low level of the first node N1 turns on the second transistor T2. The high level applied to the first signal terminal CK1 is transmitted to the second node N2 through the second transistor T2, and the high level of the second node N2 cuts off the fifth transistor T5 and the seventh transistor T7. A high level is applied to the second signal terminal CK2 so that the third transistor T3 and the fourth transistor T4 are cut off. The low level of the first power supply voltage terminal VGL always turns on a ninth transistor T9. The low level of the first node N1 turns on a sixth transistor T6 and an eighth transistor T8. A low level is applied to the third signal terminal CK3 so that the low level of the third signal terminal CK3 is transmitted to the first output terminal out1 through the sixth transistor T6, and the first output terminal out1 outputs a low level signal, that is, an effective level. A high level is applied to the fourth signal terminal CK4 so that the high level of the fourth signal terminal CK4 is transmitted to the second output terminal out2 through the eighth transistor T8, and the second output terminal out2 outputs a high level signal, that is, an ineffective level.

In S103, in a second output stage, a cut-off voltage is applied to the first signal terminal CK1, a cut-off voltage is applied to the second signal terminal CK2, a cut-off voltage is applied to the third signal terminal CK3, and a turn-on voltage is applied to the fourth signal terminal CK4; the first control terminal of the node control unit 20, in response to the turn-on voltage of the first node N1, transmits the cut-off voltage of the first signal terminal CK1 to the second node N2, and a second control terminal of a second output unit 50, in response to the turn-on voltage maintained of the first node N1, transmits the turn-on voltage of the fourth signal terminal CK4 to the second output terminal out2.

By way of example, referring to FIGS. 19 and 22, in the second output stage, a high level is applied to the first signal terminal CK1 so that the first transistor T1 is cut off. The first node N1 maintains the low level of the input stage so that the low level of the first node N1 turns on the second transistor T2. The high level applied to the first signal terminal CK1 is transmitted to the second node N2 through the second transistor T2, and the high level of the second node N2 cuts off the fifth transistor T5 and the seventh transistor T7. A high level is applied to the second signal terminal CK2 so that the third transistor T3 and the fourth transistor T4 are cut off. The low level of the first power supply voltage terminal VGL always turns on the ninth transistor T9. The low level of the first node N1 turns on the sixth transistor T6 and the eighth transistor T8. A high level is applied to the third signal terminal CK3 so that the high level of the third signal terminal CK3 is transmitted to the first output terminal out1 through the sixth transistor T6, and the first output terminal out1 outputs a high level signal, that is, an ineffective level.

A low level is applied to the fourth signal terminal CK4 so that the low level of the fourth signal terminal CK4 is transmitted to the second output terminal out2 through the eighth transistor T8, and the second output terminal out2 outputs a low level signal, that is, an effective level.

In S104, in a maintenance stage, a cut-off voltage is applied to the first signal terminal CK1, and a turn-on voltage is applied to the second signal terminal CK2; a second control terminal of the node control unit 20, in response to the turn-on voltage of the second signal terminal CK2, transmits a voltage input by the first power supply voltage terminal VGL to the second node N2 and transmits a voltage input by the second power supply voltage terminal VGH to the first node N1; the first output terminal out1 and the second output terminal out2 output ineffective levels.

By way of example, referring to FIGS. 19 and 22, in the maintenance stage, a high level is applied to the first signal terminal CK1 so that the first transistor T1 is cut off. A low level is applied to the second signal terminal CK2, and the low level of the second signal terminal CK2 controls the third transistor T3 and the fourth transistor T4 to be turned on so that the high level of the second power supply voltage terminal VGH is transmitted to the first node N1. The low level of the first power supply voltage terminal VGL always turns on the ninth transistor T9. The high level of the first node N1 cuts off the sixth transistor T6 and the eighth transistor T8. Since the low level of the second signal terminal CK2 turns on the fourth transistor T4, the low level of the first power supply voltage terminal VGL is transmitted to the second node N2, the low level of the second node N2 turns on the fifth transistor T5 and the seventh transistor T7, the high level of the second power supply voltage terminal VGH is transmitted to the first output terminal out1 through the fifth transistor T5, and the high level of the second power supply voltage terminal VGH is transmitted to the second output terminal out2 through the seventh transistor T7.

Embodiments of the present disclosure provide a driving method of a gate driver circuit. The driving method of a gate driver circuit is used to drive the gate driver circuit in the preceding embodiments. In the input stage, the turn-on voltage is transmitted to the first node N1 through the input unit 10. In the first output stage, the voltage of the second node N2 is controlled by the node control unit 20, and the first output unit 40, in response to the voltage of the first node N1 and the voltage of the second node N2, transmits the turn-on voltage of the third signal terminal CK3 to the first output terminal out1. In the second output stage, the voltage of the second node N2 is controlled by the node control unit 20, and the second output unit 50, in response to the voltage of the first node N1 and the voltage of the second node N2, transmits the turn-on voltage of the fourth signal terminal CK4 to the second output terminal out2. Since the first output terminal out1 and the second output terminal out2 of the gate driver circuit may respectively output control signals, one shift register VSR may output two control signals so that the number of shift registers VSR in the gate driver circuit can be reduced, and thus the bezel of the display panel and the display device can be reduced.

The preceding driving method is a driving method of one shift register in the gate driver circuit. Generally, the gate driver circuit includes multiple cascaded shift registers, and for any shift register in the gate driver circuit, the preceding driving method may be adopted. Embodiments of the present disclosure further introduce the driving method of the multiple shift registers cascaded in the gate driver circuit.

Figure 24:
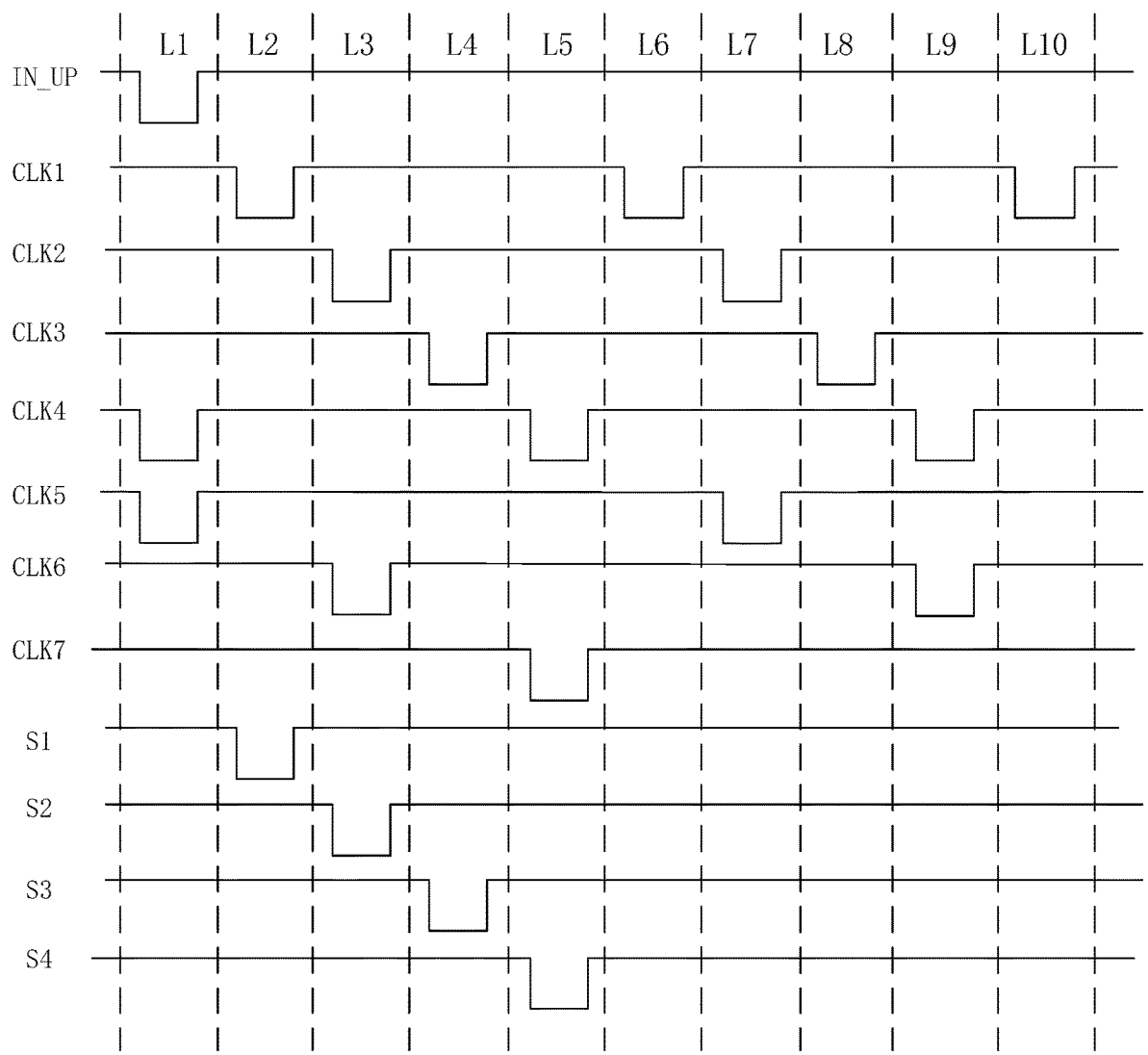
FIG. 24 is a driving timing sequence diagram of a gate driver circuit according to another embodiment of the present disclosure.

FIG. 24 is a driving timing sequence diagram of a gate driver circuit according to another embodiment of the present disclosure. The driving timing sequence shown in FIG. 24 is used to drive the gate driver circuit shown in FIG. 7. Referring to FIGS. 7 and 24, the driving method of a gate driver circuit includes the steps described below.

In a first step: in a first period L1, a turn-on voltage is applied to the signal input terminal IN, a cut-off voltage is applied to the first clock control line CLK1, the second clock control line CLK2, the third clock control line CLK3, the sixth clock control line CLK6, and the seventh clock control line CLK7, and a turn-on voltage is applied to the fourth clock control line CLK4 and the fifth clock control line CLK5.

By way of example, referring to FIGS. 7 and 24, in the first period L1, a turn-on voltage is applied to the signal input terminal IN (denoted as IN_UP) of the first stage shift register VSR.

By way of example, referring to FIGS. 5, 7, and 24, the first shift register VSR1 is used as an example. In the first period L1, a low level is applied to the fifth clock control line CLK5, that is, a low level is applied to the first signal terminal CK1 so that the first transistor T1 is turned on. A low level is applied to the signal input terminal IN (denoted as IN_UP) of the first stage shift register VSR, and the low level of the signal input terminal IN is transmitted to the first node N1 so that the first node N1 is at a low level. The first node N1 turns on the second transistor T2, and the low level of the first signal terminal CK1 is transmitted to the second node N2. The second node N2 turns on the fifth transistor T5 and the seventh transistor T7, the high level of the second power supply voltage terminal VGH is transmitted to the first output terminal out1 through the fifth transistor T5, and the high level of the second power supply voltage terminal VGH is transmitted to the second output terminal out2 through the seventh transistor T7. A high level is applied to the seventh clock control line CLK7, that is, a high level is applied to the second signal terminal CK2 so that the third transistor T3 and the fourth transistor T4 are cut off. The first period L1 is an input stage of the first shift register VSR1.

In a second step: in a second period L2, a cut-off voltage is applied to the signal input terminal IN, a turn-on voltage is applied to the first clock control line CLK1, and a cut-off voltage is applied to the second clock control line CLK2, the third clock control line CLK3, the fourth clock control line CLK4, the fifth clock control line CLK5, the sixth clock control line CLK6, and the seventh clock control line CLK7.

By way of example, referring to FIGS. 5, 7, and 24, the first shift register VSR1 is used as an example. In the second period L2, a high level is applied to the fifth clock control line CLK5, that is, a high level is applied to the first signal terminal CK1 so that the first transistor T1 is cut off. The first node N1 maintains the low level of the first period L1, and the second transistor T2 is turned on. The high level applied to the first signal terminal CK1 is transmitted to the second node N2 through the second transistor T2, and the fifth transistor T5 and the seventh transistor T7 are cut off. A high level is applied to the seventh clock control line CLK7, that is, a high level is applied to the second signal terminal CK2 so that the third transistor T3 and the fourth transistor T4 are cut off. The low level of the first power supply voltage terminal VGL constantly turns on the ninth transistor T9. The low level of the first node N1 turns on the sixth transistor T6 and the eighth transistor T8. A low level is applied to the first clock control line CLK1, that is, a low level is applied to the third signal terminal CK3 so that the low level of the third signal terminal CK3 is transmitted to the first output terminal out1 through the sixth transistor T6, and the first output terminal out1 outputs a low level signal. A high level is applied to the second clock control line CLK2, that is, a high level is applied to the fourth signal terminal CK4 so that the high level of the fourth signal terminal CK4 is transmitted to the second output terminal out2 through the eighth transistor T8, and the second output terminal out2 outputs a high level signal. The second period L2 is a first output stage of the first shift register VSR1.

In a third step: in a third period L3, a cut-off voltage is applied to the signal input terminal IN, a turn-on voltage is applied to the second clock control line CLK2 and the sixth clock control line CLK6, and a cut-off voltage is applied to the first clock control line CLK1, the third clock control line CLK3, the fourth clock control line CLK4, the fifth clock control line CLK5, and the seventh clock control line CLK7.

By way of example, referring to FIGS. 5, 7, and 24, the first shift register VSR1 is used as an example. In the third period L3, a high level is applied to the fifth clock control line CLK5, that is, a high level is applied to the first signal terminal CK1 so that the first transistor T1 is cut off. The first node N1 maintains the low level of the first period L1, and the second transistor T2 is turned on. The high level applied to the first signal terminal CK1 is transmitted to the second node N2 through the second transistor T2, and the fifth transistor T5 and the seventh transistor T7 are cut off. A high level is applied to the seventh clock control line CLK7, that is, a high level is applied to the second signal terminal CK2 so that the third transistor T3 and the fourth transistor T4 are cut off. The low level of the first power supply voltage terminal VGL constantly turns on the ninth transistor T9. The low level of the first node N1 turns on the sixth transistor T6 and the eighth transistor T8. A high level is applied to the first clock control line CLK1, that is, a high level is applied to the third signal terminal CK3 so that the high level of the third signal terminal CK3 is transmitted to the first output terminal out1 through the sixth transistor T6, and the first output terminal out1 outputs a high level signal. A low level is applied to the second clock control line CLK2, that is, a low level is applied to the fourth signal terminal CK4 so that the low level of the fourth signal terminal CK4 is transmitted to the second output terminal out2 through the eighth transistor T8, and the second output terminal out2 outputs a low level signal. The third period L3 is a second output stage of the first shift register VSR1.

In a fourth step: in a fourth period L4, a cut-off voltage is applied to the signal input terminal IN, a turn-on voltage is applied to the third clock control line CLK3, and a cut-off voltage is applied to the first clock control line CLK1, the second clock control line CLK2, the fourth clock control line CLK4, the fifth clock control line CLK5, the sixth clock control line CLK6, and the seventh clock control line CLK7.

In a fifth step: in a fifth period L5, a cut-off voltage is applied to the signal input terminal IN, a turn-on voltage is applied to both the fourth clock control line CLK4 and the seventh clock control line CLK7, and a cut-off voltage is applied to the first clock control line CLK1, the second clock control line CLK2, the third clock control line CLK3, the fifth clock control line CLK5, and the sixth clock control line CLK6.

By way of example, referring to FIGS. 5, 7, and 24, the first shift register VSR1 is used as an example. In the fifth period L5, a high level is applied to the fifth clock control line CLK5, that is, a high level is applied to the first signal terminal CK1 so that the first transistor T1 is cut off. A low level is applied to the seventh clock control line CLK7, that is, a low level is applied to the second signal terminal CK2, and the low level of the second signal terminal CK2 controls the third transistor T3 and the fourth transistor T4 to be turned on so that the high level of the second power supply voltage terminal VGH is transmitted to the first node N1. The low level of the first power supply voltage terminal VGL always turns on the ninth transistor T9. The high level of the first node N1 cuts off the sixth transistor T6 and the eighth transistor T8. Since the low level of the second signal terminal CK2 turns on the fourth transistor T4, the low level of the first power supply voltage terminal VGL is transmitted to the second node N2, the low level of the second node N2 turns on the fifth transistor T5 and the seventh transistor T7, the high level of the second power supply voltage terminal VGH is transmitted to the first output terminal out1 through the fifth transistor T5, and the high level of the second power supply voltage terminal VGH is transmitted to the second output terminal out2 through the seventh transistor T7. The fifth period L5 is a maintenance stage of the first shift register VSR1.

In an embodiment, referring to FIG. 24, the driving method of a gate driver circuit may further include the steps described below.

In a sixth period L6, a cut-off voltage is applied to the signal input terminal IN, a cut-off voltage is applied to the second clock control line CLK2, the third clock control line CLK3, the fourth clock control line CLK4, the fifth clock control line CLK5, the sixth clock control line CLK6, and the seventh clock control line CLK7, and a turn-on voltage is applied to the first clock control line CLK1.

In a seventh period L7, a cut-off voltage is applied to the signal input terminal IN, a cut-off voltage is applied to the first clock control line CLK1, the third clock control line CLK3, the fourth clock control line CLK4, the sixth clock control line CLK6, and the seventh clock control line CLK7, and a turn-on voltage is applied to the second clock control line CLK2 and the fifth clock control line CLK5.

In an eighth period L8, a cut-off voltage is applied to the signal input terminal IN, a cut-off voltage is applied to the first clock control line CLK1, the second clock control line CLK2, the fourth clock control line CLK4, the fifth clock control line CLK5, the sixth clock control line CLK6, and the seventh clock control line CLK7, and a turn-on voltage is applied to the third clock control line CLK3.

In a ninth period L9, a cut-off voltage is applied to the signal input terminal IN, a cut-off voltage is applied to the first clock control line CLK1, the second clock control line CLK2, the third clock control line CLK3, the fifth clock control line CLK5, and the seventh clock control line CLK7, and a turn-on voltage is applied to the fourth clock control line CLK4 and the sixth clock control line CLK6.

In a tenth period L10, a cut-off voltage is applied to the signal input terminal IN, a cut-off voltage is applied to the second clock control line CLK2, the third clock control line CLK3, the fourth clock control line CLK4, the fifth clock control line CLK5, the sixth clock control line CLK6, and the seventh clock control line CLK7, and a turn-on voltage is applied to the first clock control line CLK1.

Referring to FIGS. 5, 7, and 24, the second shift register VSR2 is used as an example. In the third period L3, a low level is applied to the sixth clock control line CLK6, that is, a low level is applied to the first signal terminal CK1 so that the first transistor T1 is turned on. The signal input terminal IN of the second shift register VSR2 is electrically connected to the second output terminal out2 of the first shift register VSR1, a low level is applied to the signal input terminal IN of the second shift register VSR2, and the low level of the signal input terminal IN is transmitted to the first node N1 so that the first node N1 is at a low level. The first node N1 turns on the second transistor T2, and the low level of the first signal terminal CK1 is transmitted to the second node N2. The second node N2 turns on the fifth transistor T5 and the seventh transistor T7, the high level of the second power supply voltage terminal VGH is transmitted to the first output terminal out1 through the fifth transistor T5, and the high level of the second power supply voltage terminal VGH is transmitted to the second output terminal out2 through the seventh transistor T7. A high level is applied to the fifth clock control line CLK5, that is, a high level is applied to the second signal terminal CK2 so that the third transistor T3 and the fourth transistor T4 are cut off. The third period L3 is an input stage of the second shift register VSR2. In the fourth period L4, a high level is applied to the sixth clock control line CLK6, that is, a high level is applied to the first signal terminal CK1 so that the first transistor T1 is cut off. The first node N1 maintains the low level of the first period L1, and the second transistor T2 is turned on. The high level applied to the first signal terminal CK1 is transmitted to the second node N2 through the second transistor T2, and the fifth transistor T5 and the seventh transistor T7 are cut off. A high level is applied to the fifth clock control line CLK5, that is, a high level is applied to the second signal terminal CK2 so that the third transistor T3 and the fourth transistor T4 are cut off. The low level of the first power supply voltage terminal VGL always turns on the ninth transistor T9. The low level of the first node N1 turns on the sixth transistor T6 and the eighth transistor T8. A low level is applied to the third clock control line CLK3, that is, a low level is applied to the third signal terminal CK3 so that the low level of the third signal terminal CK3 is transmitted to the first output terminal out1 through the sixth transistor T6, and the first output terminal out1 outputs a low level signal. A high level is applied to the fourth clock control line CLK4, that is, a high level is applied to the fourth signal terminal CK4 so that the high level of the fourth signal terminal CK4 is transmitted to the second output terminal out2 through the eighth transistor T8, and the second output terminal out2 outputs a high level signal. The fourth period L4 is a first output stage of the second shift register VSR2. In the fifth period L5, a high level is applied to the sixth clock control line CLK6, that is, a high level is applied to the first signal terminal CK1 so that the first transistor T1 is cut off. The first node N1 maintains the low level of the first period L1, and the second transistor T2 is turned on. The high level applied to the first signal terminal CK1 is transmitted to the second node N2 through the second transistor T2, and the fifth transistor T5 and the seventh transistor T7 are cut off A high level is applied to the fifth clock control line CLK5, that is, a high level is applied to the second signal terminal CK2 so that the third transistor T3 and the fourth transistor T4 are cut off. The low level of the first power supply voltage terminal VGL always turns on the ninth transistor T9. The low level of the first node N1 turns on the sixth transistor T6 and the eighth transistor T8. A high level is applied to the third clock control line CLK3, that is, a high level is applied to the third signal terminal CK3 so that the high level of the third signal terminal CK3 is transmitted to the first output terminal out1 through the sixth transistor T6, and the first output terminal out1 outputs a high level signal. A low level is applied to the fourth clock control line CLK4, that is, a low level is applied to the fourth signal terminal CK4 so that the low level of the fourth signal terminal CK4 is transmitted to the second output terminal out2 through the eighth transistor T8, and the second output terminal out2 outputs a low level signal. The fifth period L5 is a second output stage of the second shift register VSR2. In the seventh period L7, a high level is applied to the sixth clock control line CLK6, that is, a high level is applied to the first signal terminal CK1 so that the first transistor T1 is cut off. A low level is applied to the fifth clock control line CLK5, that is, a low level is applied to the second signal terminal CK2, and the low level of the second signal terminal CK2 controls the third transistor T3 and the fourth transistor T4 to be turned on so that the high level of the second power supply voltage terminal VGH is transmitted to the first node N1. The low level of the first power supply voltage terminal VGL always turns on the ninth transistor T9. The high level of the first node N1 cuts off the sixth transistor T6 and the eighth transistor T8. Since the low level of the second signal terminal CK2 turns on the fourth transistor T4, the low level of the first power supply voltage terminal VGL is transmitted to the second node N2, the low level of the second node N2 turns on the fifth transistor T5 and the seventh transistor T7, the high level of the second power supply voltage terminal VGH is transmitted to the first output terminal out1 through the fifth transistor T5, and the high level of the second power supply voltage terminal VGH is transmitted to the second output terminal out2 through the seventh transistor T7. The seventh period L7 is a maintenance stage of the second shift register VSR2.

Further, referring to FIGS. 5, 7, and 24, a driving process of the third shift register VSR3 is similar to the driving process of the second shift register VSR2, which will not be repeated herein. The fifth period L5 is an input stage of the third shift register VSR3. The sixth period L6 is a first output stage of the third shift register VSR3. The seventh period L7 is a second output stage of the third shift register VSR3. The ninth period L9 is a maintenance stage of the third shift register VSR3.

By way of example, referring to FIGS. 7, 16, and 24, the first stage shift register VSR may be the first shift register VSR1, the second stage shift register VSR may be the second shift register VSR2, and the third stage shift register VSR may be the third shift register VSR3. The first output terminal out1 of the first stage shift register VSR is electrically connected to a first scanning line S1, and the second output terminal out2 of the first stage shift register VSR is electrically connected to a second scanning line S2. The first output terminal out1 of the second stage shift register VSR is electrically connected to a third scanning line S3, and the second output terminal out2 of the second stage shift register VSR is electrically connected to a fourth scanning line S4. The first output terminal out1 of the third stage shift register VSR is electrically connected to a fifth scanning line S5, and the second output terminal out2 of the third stage shift register VSR is electrically connected to a sixth scanning line S6. The gate driver circuit applies effective levels to the first scanning line S1, the second scanning line S2, the third scanning line S3, the fourth scanning line S4, the fifth scanning line S5, and the sixth scanning line S6 sequentially.

Figure 25:
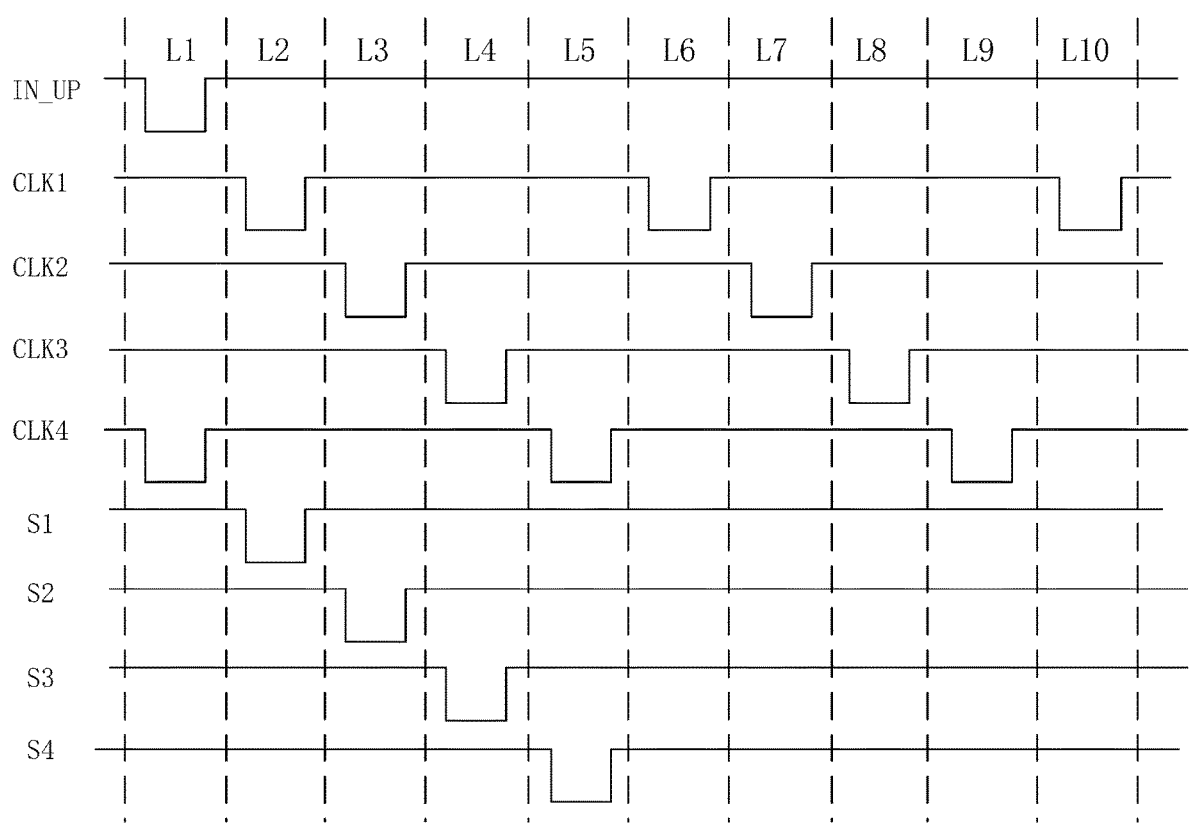
FIG. 25 is a driving timing sequence diagram of a gate driver circuit according to another embodiment of the present disclosure.

FIG. 25 is a driving timing sequence diagram of a gate driver circuit according to another embodiment of the present disclosure. The driving timing sequence shown in FIG. 25 is used to drive the gate driver circuit shown in FIG. 8. Referring to FIGS. 8 and 25, the driving method of a gate driver circuit includes the steps described below.

In a first step: in a first period L1, a turn-on voltage is applied to the signal input terminal IN, a cut-off voltage is applied to the first clock control line CLK1, the second clock control line CLK2, and the third clock control line CLK3, and a turn-on voltage is applied to the fourth clock control line CLK4.

By way of example, referring to FIGS. 5, 8, and 25, the first shift register VSR1 is used as an example. In the first period L1, a low level is applied to the fourth clock control line CLK4, that is, a low level is applied to the first signal terminal CK1 so that the first transistor T1 is turned on. A low level is applied to the signal input terminal IN (denoted as IN_UP) of the first stage shift register VSR, and the low level of the signal input terminal IN is transmitted to the first node N1 so that the first node N1 is at a low level. The first node N1 turns on the second transistor T2, and the low level of the first signal terminal CK1 is transmitted to the second node N2. The second node N2 turns on the fifth transistor T5 and the seventh transistor T7, the high level of the second power supply voltage terminal VGH is transmitted to the first output terminal out1 through the fifth transistor T5, and the high level of the second power supply voltage terminal VGH is transmitted to the second output terminal out2 through the seventh transistor T7. A high level is applied to the third clock control line CLK3, that is, a high level is applied to the second signal terminal CK2 so that the third transistor T3 and the fourth transistor T4 are cut off. The first period L1 is an input stage of the first shift register VSR1.

In a second step: in a second period L2, a cut-off voltage is applied to the signal input terminal IN, a turn-on voltage is applied to the first clock control line CLK1, and a cut-off voltage is applied to the second clock control line CLK2, the third clock control line CLK3, and the fourth clock control line CLK4.

By way of example, referring to FIGS. 5, 8, and 25, the first shift register VSR1 is used as an example. In the second period L2, a high level is applied to the fourth clock control line CLK4, that is, a high level is applied to the first signal terminal CK1 so that the first transistor T1 is cut off. The first node N1 maintains the low level of the first period L1, and the second transistor T2 is turned on. The high level applied to the first signal terminal CK1 is transmitted to the second node N2 through the second transistor T2, and the fifth transistor T5 and the seventh transistor T7 are cut off. A high level is applied to the third clock control line CLK3, that is, a high level is applied to the second signal terminal CK2 so that the third transistor T3 and the fourth transistor T4 are cut off. The low level of the first power supply voltage terminal VGL always turns on the ninth transistor T9. The low level of the first node N1 turns on the sixth transistor T6 and the eighth transistor T8. A low level is applied to the first clock control line CLK1, that is, a low level is applied to the third signal terminal CK3 so that the low level of the third signal terminal CK3 is transmitted to the first output terminal out1 through the sixth transistor T6, and the first output terminal out1 outputs a low level signal. A high level is applied to the second clock control line CLK2, that is, a high level is applied to the fourth signal terminal CK4 so that the high level of the fourth signal terminal CK4 is transmitted to the second output terminal out2 through the eighth transistor T8, and the second output terminal out2 outputs a high level signal. The second period L2 is a first output stage of the first shift register VSR1.

In a third step: in a third period L3, a cut-off voltage is applied to the signal input terminal IN, a turn-on voltage is applied to the second clock control line CLK2, and a cut-off voltage is applied to the first clock control line CLK1, the third clock control line CLK3, and the fourth clock control line CLK4.

By way of example, referring to FIGS. 5, 8, and 25, the first shift register VSR1 is used as an example. In the third period L3, a high level is applied to the fourth clock control line CLK4, that is, a high level is applied to the first signal terminal CK1 so that the first transistor T1 is cut off. The first node N1 maintains the low level of the first period L1, and the second transistor T2 is turned on. The high level applied to the first signal terminal CK1 is transmitted to the second node N2 through the second transistor T2, and the fifth transistor T5 and the seventh transistor T7 are cut off. A high level is applied to the third clock control line CLK3, that is, a high level is applied to the second signal terminal CK2 so that the third transistor T3 and the fourth transistor T4 are cut off. The low level of the first power supply voltage terminal VGL always turns on the ninth transistor T9. The low level of the first node N1 turns on the sixth transistor T6 and the eighth transistor T8. A high level is applied to the first clock control line CLK1, that is, a high level is applied to the third signal terminal CK3 so that the high level of the third signal terminal CK3 is transmitted to the first output terminal out1 through the sixth transistor T6, and the first output terminal out1 outputs a high level signal. A low level is applied to the second clock control line CLK2, that is, a low level is applied to the fourth signal terminal CK4 so that the low level of the fourth signal terminal CK4 is transmitted to the second output terminal out2 through the eighth transistor T8, and the second output terminal out2 outputs a low level signal. The third period L3 is a second output stage of the first shift register VSR1.

In a fourth step: in a fourth period L4, a cut-off voltage is applied to the signal input terminal IN, a turn-on voltage is applied to the third clock control line CLK3, and a cut-off voltage is applied to the first clock control line CLK1, the second clock control line CLK2, and the fourth clock control line CLK4.

By way of example, referring to FIGS. 5, 8, and 25, the first shift register VSR1 is used as an example. In the fourth period L4, a high level is applied to the fourth clock control line CLK4, that is, a high level is applied to the first signal terminal CK1 so that the first transistor T1 is cut off A low level is applied to the third clock control line CLK3, that is, a low level is applied to the second signal terminal CK2, and the low level of the second signal terminal CK2 controls the third transistor T3 and the fourth transistor T4 to be turned on so that the high level of the second power supply voltage terminal VGH is transmitted to the first node N1. The low level of the first power supply voltage terminal VGL always turns on the ninth transistor T9. The high level of the first node N1 cuts off the sixth transistor T6 and the eighth transistor T8. Since the low level of the second signal terminal CK2 turns on the fourth transistor T4, the low level of the first power supply voltage terminal VGL is transmitted to the second node N2, the low level of the second node N2 turns on the fifth transistor T5 and the seventh transistor T7, the high level of the second power supply voltage terminal VGH is transmitted to the first output terminal out1 through the fifth transistor T5, and the high level of the second power supply voltage terminal VGH is transmitted to the second output terminal out2 through the seventh transistor T7. The fifth period L4 is a maintenance stage of the first shift register VSR1.

In a fifth step: in a fifth period L5, a cut-off voltage is applied to the signal input terminal IN, a turn-on voltage is applied to the fourth clock control line CLK4, and a cut-off voltage is applied to all the first clock control line CLK1, the second clock control line CLK2, and the third clock control line CLK3.

In an embodiment, referring to FIG. 25, the driving method of a gate driver circuit may further include the steps described below.

In a sixth period L6, a cut-off voltage is applied to the signal input terminal IN, a turn-on voltage is applied to the first clock control line CLK1, and a cut-off voltage is applied to all the second clock control line CLK2, the third clock control line CLK3, and the fourth clock control line CLK4.

In a seventh period L7, a cut-off voltage is applied to the signal input terminal IN, a turn-on voltage is applied to the second clock control line CLK2, and a cut-off voltage is applied to the first clock control line CLK1, the third clock control line CLK3, and the fourth clock control line CLK4.

In an eighth period L8, a cut-off voltage is applied to the signal input terminal IN, a turn-on voltage is applied to the third clock control line CLK3, and a cut-off voltage is applied to the first clock control line CLK1, the second clock control line CLK2, and the fourth clock control line CLK4.

In a ninth period L9, a cut-off voltage is applied to the signal input terminal IN, a turn-on voltage is applied to the fourth clock control line CLK4, and a cut-off voltage is applied to the first clock control line CLK1, the second clock control line CLK2, and the third clock control line CLK3.

In a tenth period L10, a cut-off voltage is applied to the signal input terminal IN, a turn-on voltage is applied to the first clock control line CLK1, and a cut-off voltage is applied to the second clock control line CLK2, the third clock control line CLK3, and the fourth clock control line CLK4.

By way of example, referring to FIGS. 8, 16, and 25, the first stage shift register VSR may be the first shift register VSR1, the second stage shift register VSR may be the second shift register VSR2, and the third stage shift register VSR may be the first shift register VSR1. The first output terminal out1 of the first stage shift register VSR is electrically connected to a first scanning line S1, the second output terminal out2 of the first stage shift register VSR is electrically connected to a second scanning line S2. The first output terminal out1 of the second stage shift register VSR is electrically connected to a third scanning line S3, the second output terminal out2 of the second stage shift register VSR is electrically connected to a fourth scanning line S4. The first output terminal out1 of the third stage shift register VSR is electrically connected to a fifth scanning line S5, and the second output terminal out2 of the third stage shift register VSR is electrically connected to a sixth scanning line S6. The gate driver circuit applies effective levels to the first scanning line S1, the second scanning line S2, the third scanning line S3, the fourth scanning line S4, the fifth scanning line S5, and the sixth scanning line S6 sequentially.

Figure 26:
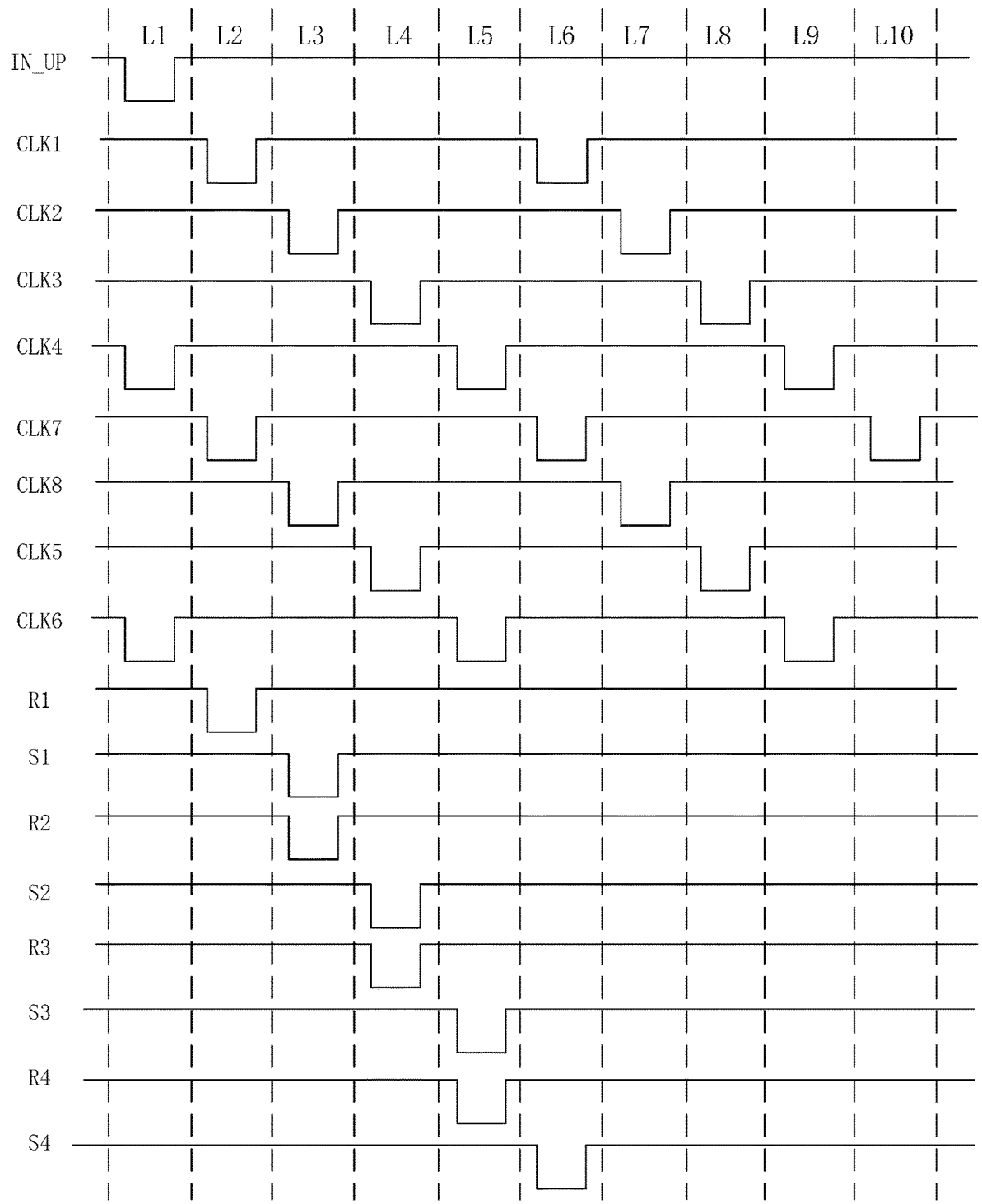
FIG. 26 is a driving timing sequence diagram of a gate driver circuit according to another embodiment of the present disclosure.

FIG. 26 is a driving timing sequence diagram of a gate driver circuit according to another embodiment of the present disclosure. The driving timing sequence shown in FIG. 26 is used to drive the gate driver circuit shown in FIG. 11 in a forward direction (that is, forward scanning). In the case of forward scanning, a turn-on voltage, such as a low level, is applied to the first forward and reverse signal terminal U2D, and a tenth transistor T10 is turned on; a cut-off voltage, such as a high level, is applied to the second forward and reverse signal terminal D2U, and an eleventh transistor T11 is cut off. Referring to FIGS. 11 and 26, the driving method of a gate driver circuit includes the steps described below.

In a first step: in a first period L1, a turn-on voltage is applied to a second pole of the tenth transistor T10 in the first shift register VSR1, a cut-off voltage is applied to the first clock control line CLK1, the second clock control line CLK2, the third clock control line CLK3, the fifth clock control line CLK5, the seventh clock control line CLK7, and the eighth clock control line CLK8, and a turn-on voltage is applied to the fourth clock control line CLK4 and the sixth clock control line CLK6.

In a second step: in a second period L2, a cut-off voltage is applied to the second pole of the tenth transistor T10 in the first shift register VSR1, a cut-off voltage is applied to the second clock control line CLK2, the third clock control line CLK3, the fourth clock control line CLK4, the fifth clock control line CLK5, the sixth clock control line CLK6, and the eighth clock control line CLK8, and a turn-on voltage is applied to the first clock control line CLK1 and the seventh clock control line CLK7.

In a third step: in a third period L3, a cut-off voltage is applied to the second pole of the tenth transistor T10 in the first shift register VSR1, a cut-off voltage is applied to the first clock control line CLK1, the third clock control line CLK3, the fourth clock control line CLK4, the fifth clock control line CLK5, the sixth clock control line CLK6, and the seventh clock control line CLK7, and a turn-on voltage is applied to the second clock control line CLK2 and the eighth clock control line CLK8.

In a fourth step: in a fourth period L4, a cut-off voltage is applied to the second pole of the tenth transistor T10 in the first shift register VSR1, a cut-off voltage is applied to the first clock control line CLK1, the second clock control line CLK2, the fourth clock control line CLK4, the sixth clock control line CLK6, the seventh clock control line CLK7, and the eighth clock control line CLK8, and a turn-on voltage is applied to the third clock control line CLK3 and the fifth clock control line CLK5.

In an embodiment, referring to FIG. 26, the driving method of a gate driver circuit may further include the steps described below.

In a fifth period L5, a cut-off voltage is applied to the second pole of the tenth transistor T10 in the first shift register VSR1, a cut-off voltage is applied to the first clock control line CLK1, the second clock control line CLK2, the third clock control line CLK3, the fifth clock control line CLK5, the seventh clock control line CLK7, and the eighth clock control line CLK8, and a turn-on voltage is applied to the fourth clock control line CLK4 and the sixth clock control line CLK6.

In a sixth period L6, a cut-off voltage is applied to the second pole of the tenth transistor T10 in the first shift register VSR1, a cut-off voltage is applied to the second clock control line CLK2, the third clock control line CLK3, the fourth clock control line CLK4, the fifth clock control line CLK5, the sixth clock control line CLK6, and the eighth clock control line CLK8, and a turn-on voltage is applied to the first clock control line CLK1 and the seventh clock control line CLK7.

In a seventh period L7, a cut-off voltage is applied to the second pole of the tenth transistor T10 in the first shift register VSR1, a cut-off voltage is applied to the first clock control line CLK1, the third clock control line CLK3, the fourth clock control line CLK4, the fifth clock control line CLK5, the sixth clock control line CLK6, and the seventh clock control line CLK7, and a turn-on voltage is applied to the second clock control line CLK2 and the eighth clock control line CLK8.

In an eighth period L8, a cut-off voltage is applied to the second pole of the tenth transistor T10 in the first shift register VSR1, a cut-off voltage is applied to the first clock control line CLK1, the second clock control line CLK2, the fourth clock control line CLK4, the sixth clock control line CLK6, the seventh clock control line CLK7, and the eighth clock control line CLK8, and a turn-on voltage is applied to the third clock control line CLK3 and the fifth clock control line CLK5.

In a ninth period L9, a cut-off voltage is applied to the second pole of the tenth transistor T10 in the first shift register VSR1, a cut-off voltage is applied to the first clock control line CLK1, the second clock control line CLK2, the third clock control line CLK3, the fifth clock control line CLK5, the seventh clock control line CLK7, and the eighth clock control line CLK8, and a turn-on voltage is applied to the fourth clock control line CLK4 and the sixth clock control line CLK6.

In a tenth period L10, a cut-off voltage is applied to the second pole of the tenth transistor T10 in the first shift register VSR1, a cut-off voltage is applied to the first clock control line CLK1, the second clock control line CLK2, the third clock control line CLK3, the fourth clock control line CLK4, the fifth clock control line CLK5, the sixth clock control line CLK6, and the eighth clock control line CLK8, and a turn-on voltage is applied to the seventh clock control line CLK7.

By way of example, referring to FIGS. 11, 14, and 26, the first stage shift register VSR may be the first shift register VSR1, the second stage shift register VSR may be the second shift register VSR2, the third stage shift register VSR may be the third shift register VSR3, and the fourth stage shift register VSR may be the fourth shift register VSR4. The first output terminal out1 of the first stage shift register VSR is electrically connected to a first control scanning line R1, the second output terminal out2 of the first stage shift register VSR is electrically connected to a first scanning line S1, the first output terminal out1 of the second stage shift register VSR is electrically connected to a second control scanning line R2, the second output terminal out2 of the second stage shift register VSR is electrically connected to a second scanning line S2, the first output terminal out1 of the third stage shift register VSR is electrically connected to a third control scanning line R3, the second output terminal out2 of the third stage shift register VSR is electrically connected to a third scanning line S3, the first output terminal out1 of the fourth stage shift register VSR is electrically connected to a fourth control scanning line R4, and the second output terminal out2 of the fourth stage shift register VSR is electrically connected to a fourth scanning line S4. The scanning lines 121 include the first control scanning line R1, the first scanning line S1, the second control scanning line R2, the second scanning line S2, the third control scanning line R3, the third scanning line S3, the fourth control scanning line R4, and the fourth scanning line S4. The first control scanning line R1 is electrically connected to the first scanning signal terminal 131, and the first scanning line S1 is electrically connected to the second scanning signal terminal 132. The gate driver circuit sequentially applies effective levels to the first scanning line S1, the second scanning line S2, the third scanning line S3, and the fourth scanning line S4, and the gate driver circuit sequentially applies effective levels to the first control scanning line R1, the second control scanning line R2, the third control scanning line R3, and the fourth control scanning line R4. The first scanning line S1 and the second control scanning line R2 overlap, the second scanning line S2 and the third control scanning line R3 overlap, and others likewise.

Figure 27:
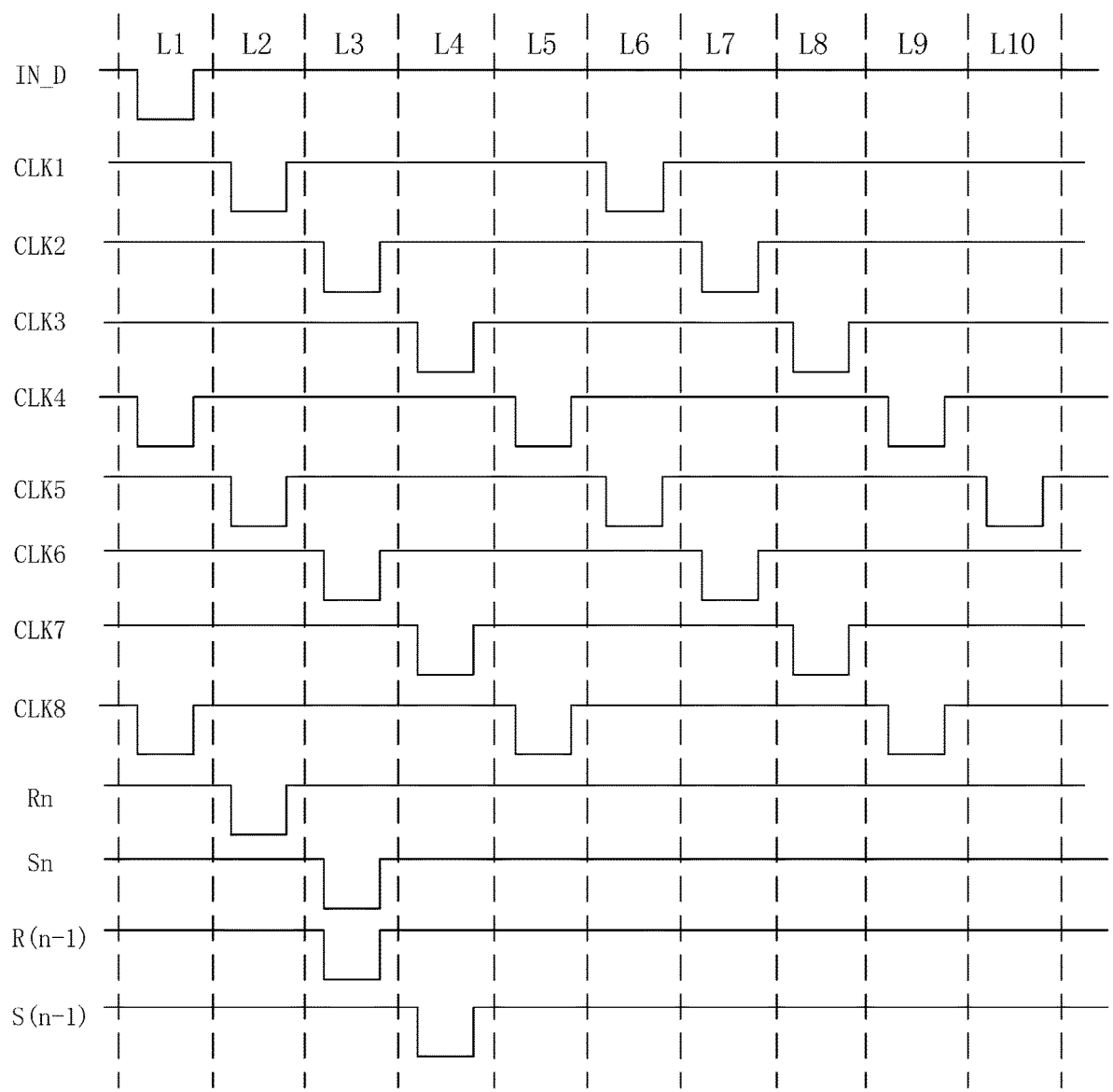
FIG. 27 is a driving timing sequence diagram of a gate driver circuit according to another embodiment of the present disclosure.

FIG. 27 is a driving timing sequence diagram of a gate driver circuit according to another embodiment of the present disclosure. The driving timing sequence shown in FIG. 27 is used to drive the gate driver circuit shown in FIG. 11 in a reverse direction (that is, reverse scanning). In the case of reverse scanning, a cut-off voltage, such as a high level, is applied to the first forward and reverse signal terminal U2D, and the tenth transistor T10 is cut off; a turn-on voltage, such as a low level, is applied to the second forward and reverse signal terminal D2U, and the eleventh transistor T11 is turned on. Referring to FIGS. 11 and 27, the driving method of a gate driver circuit includes the steps described below.

In a first step: in a first period L1, a turn-on voltage is applied to a second pole of the eleventh transistor T11 in the last stage shift register VSR, a cut-off voltage is applied to the first clock control line CLK1, the second clock control line CLK2, the third clock control line CLK3, the fifth clock control line CLK5, the sixth clock control line CLK6, and the seventh clock control line CLK7, and a turn-on voltage is applied to the fourth clock control line CLK4 and the eighth clock control line CLK8.

Referring to FIGS. 11 and 27, in the first period L1, a turn-on voltage is applied to the second pole of the eleventh transistor T11 in the n-th stage shift register VSR, and the n-th stage shift register VSR is the last stage shift register VSR. A turn-on voltage is applied to the signal input terminal IN (denoted as IN_D) of the n-th stage shift register VSR.

In a second step: in a second period L2, a cut-off voltage is applied to the second pole of the eleventh transistor T11 in the last stage shift register VSR, a cut-off voltage is applied to the second clock control line CLK2, the third clock control line CLK3, the fourth clock control line CLK4, the sixth clock control line CLK6, the seventh clock control line CLK7, and the eighth clock control line CLK8, and a turn-on voltage is applied to the first clock control line CLK1 and the fifth clock control line CLK5.

In a third step: in a third period L3, a cut-off voltage is applied to the second pole of the eleventh transistor T11 in the last stage shift register VSR, a cut-off voltage is applied to the first clock control line CLK1, the third clock control line CLK3, the fourth clock control line CLK4, the fifth clock control line CLK5, the seventh clock control line CLK7, and the eighth clock control line CLK8, and a turn-on voltage is applied to the second clock control line CLK2 and the sixth clock control line CLK6.

In a fourth step: in a fourth period L4, a cut-off voltage is applied to the second pole of the eleventh transistor T11 in the last stage shift register VSR, a cut-off voltage is applied to the first clock control line CLK1, the second clock control line CLK2, the fourth clock control line CLK4, the fifth clock control line CLK5, the sixth clock control line CLK6, and the eighth clock control line CLK8, and a turn-on voltage is applied to the third clock control line CLK3 and the seventh clock control line CLK7.

It is to be noted that, based on the preceding disclosed principles and FIG. 27, those skilled in the art can understand and get that the driving method of a gate driver circuit may also include the driving processes of the fifth period L5, the driving processes of the sixth period L6, the driving processes of the seventh period L7, the driving processes of the eighth period L8, the driving processes of the ninth period L9, and the driving processes of the tenth period L10. Therefore, the driving processes of the fifth period L5 to the tenth period L10 will not be repeated herein.

By way of example, referring to FIGS. 11, 14, and 27, the first output terminal out1 of the n-th stage shift register VSR is electrically connected to the n-th control scanning line Rn, the second output terminal out2 of the n-th stage shift register VSR is electrically connected to the n-th scanning line Sn, the first output terminal out1 of the (n−1)-th stage shift register VSR is electrically connected to the (n−1)-th control scanning line R(n−1), and the second output terminal out2 of the (n−1)-th stage shift register VSR is electrically connected to the (n−1)-th scanning line S(n−1). The gate driver circuit sequentially applies effective levels to the n-th scanning line Sn and the (n−1)-th scanning line S(n−1). The gate driver circuit sequentially applies effective levels to the n-th control scanning line Rn and the (n−1)-th control scanning line R(n−1). The n-th scanning line Sn and the (n−1)-th control scanning line R(n−1) overlap, and others likewise.

Figure 28:
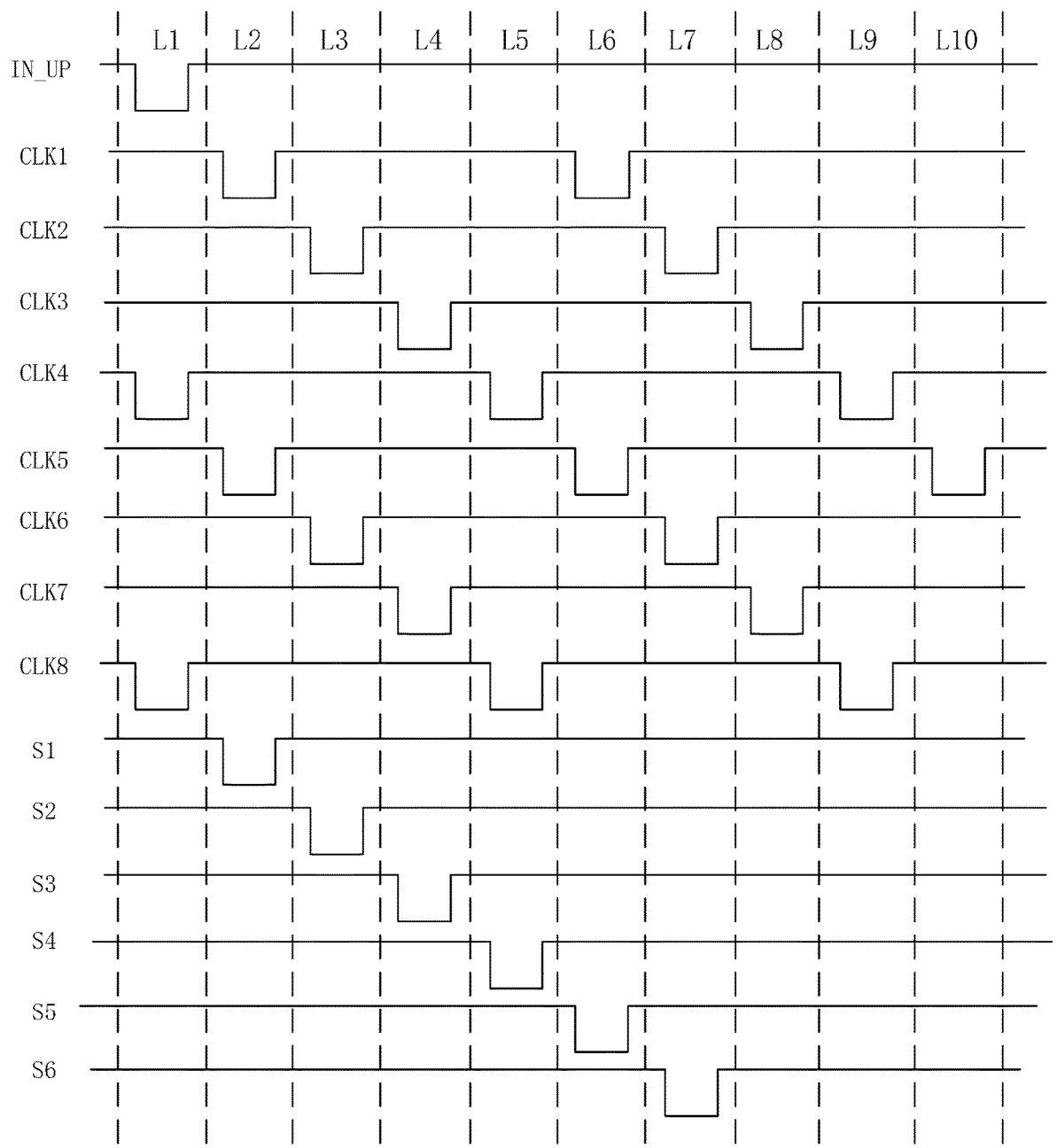
FIG. 28 is a driving timing sequence diagram of a gate driver circuit according to another embodiment of the present disclosure.

FIG. 28 is a driving timing sequence diagram of a gate driver circuit according to another embodiment of the present disclosure. The driving timing sequence shown in FIG. 28 is used to drive the gate driver circuit shown in FIG. 13 in the forward direction (that is, forward scanning) In the case of forward scanning, a turn-on voltage, such as a low level, is applied to the first forward and reverse signal terminal U2D, and the tenth transistor T10 is turned on; a cut-off voltage, such as a high level, is applied to the second forward and reverse signal terminal D2U, and the eleventh transistor T11 is cut off Referring to FIGS. 13 and 28, the driving method of a gate driver circuit includes the steps described below.

In a first step: in a first period L1, a turn-on voltage is applied to the second pole of the tenth transistor T10 in the first shift register VSR1, a cut-off voltage is applied to the first clock control line CLK1, the second clock control line CLK2, the third clock control line CLK3, the fifth clock control line CLK5, the sixth clock control line CLK6, and the seventh clock control line CLK7, and a turn-on voltage is applied to the fourth clock control line CLK4 and the eighth clock control line CLK8.

In a second step: in a second period L2, a cut-off voltage is applied to the second pole of the tenth transistor T10 in the first shift register VSR1, a cut-off voltage is applied to the second clock control line CLK2, the third clock control line CLK3, the fourth clock control line CLK4, the sixth clock control line CLK6, the seventh clock control line CLK7, and the eighth clock control line CLK8, and a turn-on voltage is applied to the first clock control line CLK1 and the fifth clock control line CLK5.

In a third period L3, a cut-off voltage is applied to the second pole of the tenth transistor T10 in the first shift register VSR1, a cut-off voltage is applied to the first clock control line CLK1, the third clock control line CLK3, the fourth clock control line CLK4, the fifth clock control line CLK5, the seventh clock control line CLK7, and the eighth clock control line CLK8, and a turn-on voltage is applied to the second clock control line CLK2 and the sixth clock control line CLK6.

In a fourth step: in a fourth period L4, a cut-off voltage is applied to the second pole of the tenth transistor T10 in the first shift register VSR1, a cut-off voltage is applied to the first clock control line CLK1, the second clock control line CLK2, the fourth clock control line CLK4, the fifth clock control line CLK5, the sixth clock control line CLK6, and the eighth clock control line CLK8, and a turn-on voltage is applied to the third clock control line CLK3 and the seventh clock control line CLK7.

It is to be noted that, based on the preceding disclosed principles and FIG. 28, those skilled in the art can understand and get that the driving method of a gate driver circuit may also include the driving processes of the fifth period L5, the driving processes of the sixth period L6, the driving processes of the seventh period L7, the driving processes of the eighth period L8, the driving processes of the ninth period L9, and the driving processes of the tenth period L10. Therefore, the driving processes of the fifth period L5 to the tenth period L10 will not be repeated herein.

Figure 29:
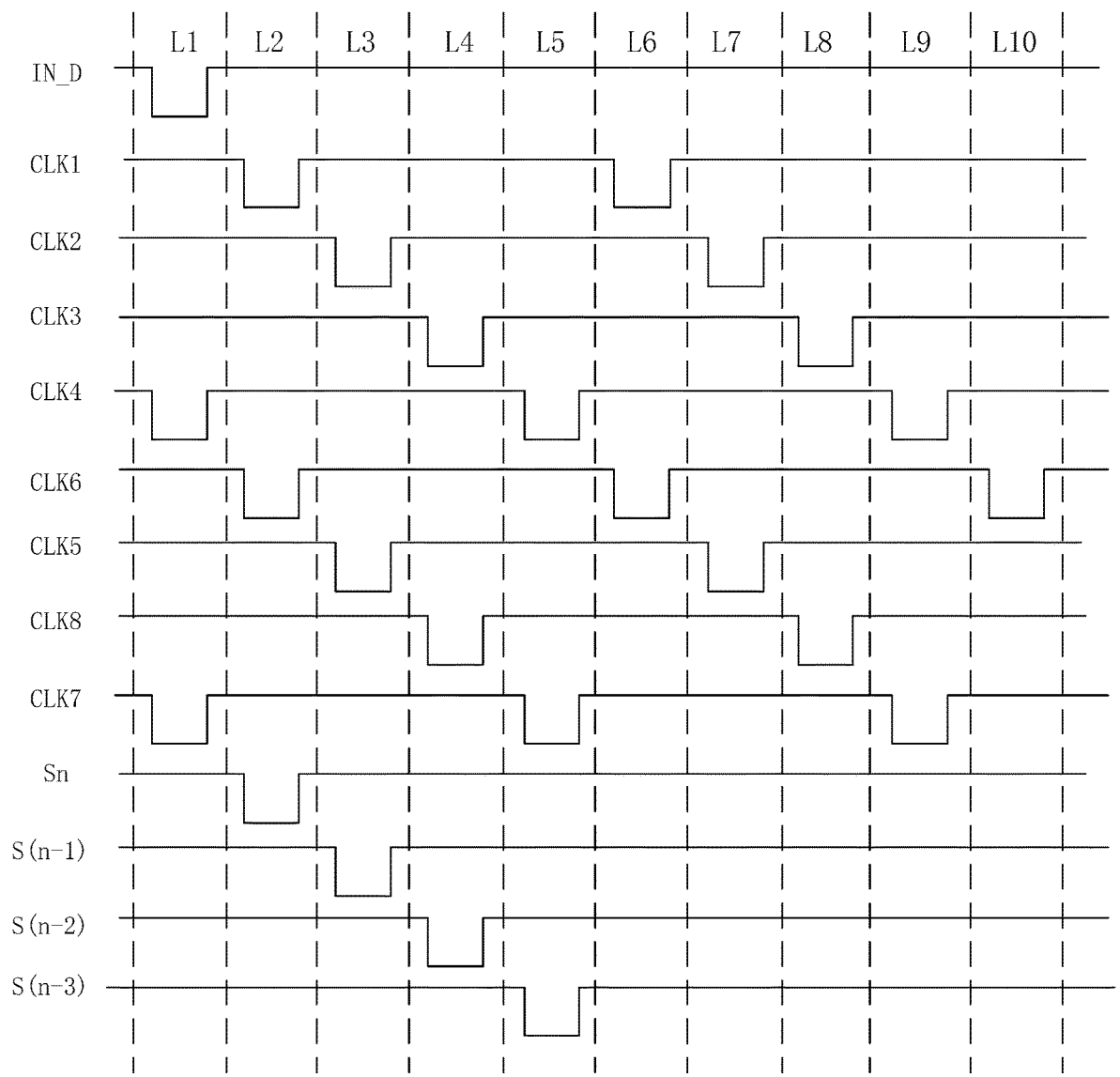
FIG. 29 is a driving timing sequence diagram of a gate driver circuit according to another embodiment of the present disclosure.

FIG. 29 is a driving timing sequence diagram of a gate driver circuit according to another embodiment of the present disclosure. The driving timing sequence shown in FIG. 29 is configured to drive the gate driver circuit shown in FIG. 13 in the reverse direction (that is, reverse scanning) In the case of reverse scanning, a cut-off voltage, such as a high level, is applied to the first forward and reverse signal terminal U2D, and the tenth transistor T10 is cut off; a turn-on voltage, such as a low level, is applied to the second forward and reverse signal terminal D2U, and the eleventh transistor T11 is turned on. Referring to FIGS. 13 and 29, the driving method of a gate driver circuit includes the steps described below.

In a first step: in a first period L1, a turn-on voltage is applied to the second pole of the eleventh transistor T11 in the last stage shift register VSR, a cut-off voltage is applied to the first clock control line CLK1, the second clock control line CLK2, the third clock control line CLK3, the fifth clock control line CLK5, the sixth clock control line CLK6, and the eighth clock control line CLK8, and a turn-on voltage is applied to the fourth clock control line CLK4 and the seventh clock control line CLK7.

In a second step: in a second period L2, a turn-on voltage is applied to the second pole of the eleventh transistor T11 in the last stage shift register VSR, a cut-off voltage is applied to the second clock control line CLK2, the third clock control line CLK3, the fourth clock control line CLK4, the fifth clock control line CLK5, the seventh clock control line CLK7, and the eighth clock control line CLK8, and a turn-on voltage is applied to the first clock control line CLK1 and the sixth clock control line CLK6.

In a third step: in a third period L3, a turn-on voltage is applied to the second pole of the eleventh transistor T11 in the last stage shift register VSR, a cut-off voltage is applied to the first clock control line CLK1, the third clock control line CLK3, the fourth clock control line CLK4, the sixth clock control line CLK6, the seventh clock control line CLK7, and the eighth clock control line CLK8, and a turn-on voltage is applied to the second clock control line CLK2 and the fifth clock control line CLK5.

In a fourth step: in a fourth period L4, a turn-on voltage is applied to the second pole of the eleventh transistor T11 in the last stage shift register VSR, a cut-off voltage is applied to the first clock control line CLK1, the second clock control line CLK2, the fourth clock control line CLK4, the fifth clock control line CLK5, the sixth clock control line CLK6, and the seventh clock control line CLK7, and a turn-on voltage is applied to the third clock control line CLK3 and the eighth clock control line CLK8.

It is to be noted that, based on the preceding disclosed principles and FIG. 29, those skilled in the art can understand and get that the driving method of a gate driver circuit may also include the driving processes of the fifth period L5, the driving processes of the sixth period L6, the driving processes of the seventh period L7, the driving processes of the eighth period L8, the driving processes of the ninth period L9, and the driving processes of the tenth period L10. Therefore, the driving processes of the fifth period L5 to the tenth period L10 will not be repeated herein.

By way of example, referring to FIGS. 13, 16 and 29, the first output terminal out1 of the n-th stage shift register VSR is electrically connected to the n-th scanning line Sn, the second output terminal out2 of the n-th stage shift register VSR is electrically connected to the (n−1)-th scanning line S(n−1), the first output terminal out1 of the (n−1)-th stage shift register VSR is electrically connected to the (n−2)-th scanning line S(n−2), and the second output terminal out2 of the (n−1)-th stage shift register VSR is electrically connected to the (n−3)-th scanning line S(n−3). The gate driver circuit sequentially applies effective levels to the n-th scanning line Sn, the (n−1)-th scanning line S(n−1), the (n−2)-th scanning line S(n−2), the (n−3)-th scanning line S(n−3), and others likewise, until the first scanning line S1. n is a positive integer greater than 3.

It is to be noted that the preceding are only preferred embodiments of the present disclosure and the technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure has been described in detail via the preceding embodiments, the present disclosure is not limited to the preceding embodiments and may include more equivalent embodiments without departing from the inventive concept of the present disclosure. The scope of the present disclosure is determined by the scope of the appended claims.

What is claimed is:

1. A gate driver circuit, comprising a plurality of cascaded shift registers, wherein each of the plurality of cascaded shift registers comprises an input unit, a node control unit, a first output unit, and a second output unit, wherein a first terminal of the input unit is electrically connected to a signal input terminal, a control terminal of the input unit is electrically connected to a first signal terminal, a second terminal of the input unit is electrically connected to a first node, and the input unit is configured to control a voltage of the first node according to a voltage of the first signal terminal and a voltage of the signal input terminal;

a first terminal of the node control unit is electrically connected to the first node, a second terminal of the node control unit is electrically connected to the first signal terminal, a third terminal of the node control unit is electrically connected to a first power supply voltage terminal, a fourth terminal of the node control unit is electrically connected to a second power supply voltage terminal, a first control terminal of the node control unit is electrically connected to the first node, a second control terminal of the node control unit is electrically connected to a second signal terminal, a fifth terminal of the node control unit is electrically connected to a second node, and the node control unit is configured to control a voltage of the second node according to the voltage of the first node, the voltage of the first signal terminal, a voltage of the first power supply voltage terminal, a voltage of the second power supply voltage terminal, and a voltage of the second signal terminal;

a first terminal of the first output unit is electrically connected to the second power supply voltage terminal, a second terminal of the first output unit is electrically connected to a third signal terminal, a third terminal of the first output unit is electrically connected to a first output terminal, a first control terminal of the first output unit is electrically connected to the second node, a second control terminal of the first output unit is electrically connected to the first node, and the first output unit is configured to control a voltage of the first output terminal according to the voltage of the second power supply voltage terminal, a voltage of the third signal terminal, the voltage of the first node, and the voltage of the second node; and a first terminal of the second output unit is electrically connected to the second power supply voltage terminal, a second terminal of the second output unit is electrically connected to a fourth signal terminal, a third terminal of the second output unit is electrically connected to a second output terminal, a first control terminal of the second output unit is electrically connected to the second node, a second control terminal of the second output unit is electrically connected to the first node, and the second output unit is configured to control a voltage of the second output terminal according to the voltage of the second power supply voltage terminal, a voltage of the fourth signal terminal, the voltage of the first node, and the voltage of the second node.

2. The gate driver circuit of claim 1, wherein the input unit comprises a first transistor, a gate of the first transistor is electrically connected to the first signal terminal, a first pole of the first transistor is electrically connected to the signal input terminal, and a second pole of the first transistor is electrically connected to the first node;

wherein the node control unit comprises a second transistor, a third transistor, and a fourth transistor, a gate of the second transistor is electrically connected to the first node, a first pole of the second transistor is electrically connected to the first signal terminal, and a second pole of the second transistor is electrically connected to the second node;

a gate of the third transistor is electrically connected to the second signal terminal, a first pole of the third transistor is electrically connected to the first node, and a second pole of the third transistor is electrically connected to the second power supply voltage terminal; and a gate of the fourth transistor is electrically connected to the second signal terminal, a first pole of the fourth transistor is electrically connected to the first power supply voltage terminal, and a second pole of the fourth transistor is electrically connected to the second node; and wherein each of the plurality of cascaded shift registers further comprises a first capacitor, wherein a first electrode plate of the first capacitor is electrically connected to the second power supply voltage terminal, and a second electrode plate of the first capacitor is electrically connected to the second node.

3. The gate driver circuit of claim 1, wherein the gate driver circuit further comprises a ninth transistor, wherein a gate of the ninth transistor is electrically connected to the first power supply voltage terminal, a first pole of the ninth transistor is electrically connected to the first node, and a second pole of the ninth transistor is electrically connected to the second control terminal of the first output unit and the second control terminal of the second output unit.

4. The gate driver circuit of claim 1, wherein the first power supply voltage terminal provides a low level, and the second power supply voltage terminal provides a high level; and wherein in a same one of the plurality of cascaded shift registers, the first output terminal and the second output terminal output effective level signals successively.

5. The gate driver circuit of claim 1, wherein the first output unit comprises a fifth transistor and a sixth transistor, wherein a gate of the fifth transistor is electrically connected to the second node, a first pole of the fifth transistor is electrically connected to the second power supply voltage terminal, and a second pole of the fifth transistor is electrically connected to the first output terminal; a gate of the sixth transistor is electrically connected to the first node, a first pole of the sixth transistor is electrically connected to the first output terminal, and a second pole of the sixth transistor is electrically connected to the third signal terminal; and the second output unit comprises a seventh transistor and an eighth transistor, wherein a gate of the seventh transistor is electrically connected to the second node, a first pole of the seventh transistor is electrically connected to the second power supply voltage terminal, and a second pole of the seventh transistor is electrically connected to the second output terminal; a gate of the eighth transistor is electrically connected to the first node, a first pole of the eighth transistor is electrically connected to the second output terminal, and a second pole of the eighth transistor is electrically connected to the fourth signal terminal.

6. The gate driver circuit of claim 5, wherein the first output unit further comprises a second capacitor, wherein a first electrode plate of the second capacitor is electrically connected to the first node, and a second electrode plate of the second capacitor is electrically connected to the first output terminal; and the second output unit further comprises a third capacitor, wherein a first electrode plate of the third capacitor is electrically connected to the first node, and a second electrode plate of the third capacitor is electrically connected to the second output terminal.

7. A driving method of the gate driver circuit of claim 1, comprising:

in an input stage, applying a turn-on voltage to a signal input terminal, applying a turn-on voltage to a first signal terminal, and applying a cut-off voltage to a second signal terminal, wherein the input unit, in response to the turn-on voltage of the first signal terminal, transmits the turn-on voltage of the signal input terminal to a first node;

in a first output stage, applying a cut-off voltage to the first signal terminal, applying a cut-off voltage to the second signal terminal, applying a turn-on voltage to a third signal terminal, and applying a cut-off voltage to a fourth signal terminal, wherein the first control terminal of the node control unit, in response to the turn-on voltage of the first node, transmits the cut-off voltage of the first signal terminal to a second node, and a second control terminal of a first output unit, in response to the turn-on voltage maintained of the first node, transmits the turn-on voltage of the third signal terminal to a first output terminal;

in a second output stage, applying a cut-off voltage to the first signal terminal, applying a cut-off voltage to the second signal terminal, applying a cut-off voltage to the third signal terminal, and applying a turn-on voltage to the fourth signal terminal, wherein the first control terminal of the node control unit, in response to the turn-on voltage of the first node, transmits the cut-off voltage of the first signal terminal to the second node, and the second control terminal of the second output unit, in response to the turn-on voltage maintained of the first node, transmits the turn-on voltage of the fourth signal terminal to the second output terminal; and in a maintenance stage, applying a cut-off voltage to the first signal terminal, and applying a turn-on voltage to the second signal terminal, wherein the second control terminal of the node control unit, in response to the turn-on voltage of the second signal terminal, transmits a voltage input by a first power supply voltage terminal to the second node and transmits a voltage input by a second power supply voltage terminal to the first node, wherein the first output terminal and the second output terminal output ineffective levels.

8. The driving method of claim 7, wherein the gate driver circuit comprises a first shift register, a second shift register, and a third shift register that are sequentially cascaded and further comprises a first clock control line, a second clock control line, a third clock control line, a fourth clock control line, a fifth clock control line, a sixth clock control line, and a seventh clock control line, wherein a first signal terminal of the first shift register is electrically connected to the fifth clock control line, a second signal terminal of the first shift register is electrically connected to the seventh clock control line, a third signal terminal of the first shift register is electrically connected to the first clock control line, and a fourth signal terminal of the first shift register is electrically connected to the second clock control line; a first signal terminal of the second shift register is electrically connected to the sixth clock control line, a second signal terminal of the second shift register is electrically connected to the fifth clock control line, a third signal terminal of the second shift register is electrically connected to the third clock control line, and a fourth signal terminal of the second shift register is electrically connected to the fourth clock control line; a first signal terminal of the third shift register is electrically connected to the seventh clock control line, a second signal terminal of the third shift register is electrically connected to the sixth clock control line, a third signal terminal of the third shift register is electrically connected to the first clock control line, and a fourth signal terminal of the third shift register is electrically connected to the second clock control line; and wherein the driving method comprises:

in a first period, applying a turn-on voltage to the signal input terminal, applying a cut-off voltage to the first clock control line, the second clock control line, the third clock control line, the sixth clock control line, and the seventh clock control line, and applying a turn-on voltages to the fourth clock control line and the fifth clock control line;

in a second period, applying a cut-off voltage to the signal input terminal, applying a turn-on voltage to the first clock control line, and applying a cut-off voltage to the second clock control line, the third clock control line, the fourth clock control line, the fifth clock control line, the sixth clock control line, and the seventh clock control line;

in a third period, applying a cut-off voltage to the signal input terminal, applying a turn-on voltage to the second clock control line and the sixth clock control line, and applying a cut-off voltage to the first clock control line, the third clock control line, the fourth clock control line, the fifth clock control line, and the seventh clock control line;

in a fourth period, applying a cut-off voltage to the signal input terminal, applying a turn-on voltage to the third clock control line, and applying a cut-off voltage to the first clock control line, the second clock control line, the fourth clock control line, the fifth clock control line, the sixth clock control line, and the seventh clock control line; and in a fifth period, applying a cut-off voltage to the signal input terminal, applying a turn-on voltage to the fourth clock control line and the seventh clock control line, and applying a cut-off voltage to the first clock control line, the second clock control line, the third clock control line, the fifth clock control line, and the sixth clock control line.

9. The driving method of claim 7, wherein the gate driver circuit comprises a first shift register and a second shift register that are sequentially cascaded and further comprises a first clock control line, a second clock control line, a third clock control line, and a fourth clock control line, wherein a first signal terminal of the first shift register is electrically connected to the fourth clock control line, a second signal terminal of the first shift register is electrically connected to the third clock control line, a third signal terminal of the first shift register is electrically connected to the first clock control line, and a fourth signal terminal of the first shift register is electrically connected to the second clock control line; a first signal terminal of the second shift register is electrically connected to the second clock control line, a second signal terminal of the second shift register is electrically connected to the first clock control line, a third signal terminal of the second shift register is electrically connected to the third clock control line, and a fourth signal terminal of the second shift register is electrically connected to the fourth clock control line; and wherein the driving method comprises:
in a first period, applying a turn-on voltage to the signal input terminal, applying a cut-off voltage to the first clock control line, the second clock control line, and the third clock control line, and applying a turn-on voltage to the fourth clock control line;
in a second period, applying a cut-off voltage to the signal input terminal, applying a turn-on voltage to the first clock control line, and applying a cut-off voltage to the second clock control line, the third clock control line, and the fourth clock control line;
in a third period, applying a cut-off voltage to the signal input terminal, applying a turn-on voltage to the second clock control line, and applying a cut-off voltage to the first clock control line, the third clock control line, and the fourth clock control line;
in a fourth period, applying a cut-off voltage to the signal input terminal, applying a turn-on voltage to the third clock control line, and applying a cut-off voltage to the first clock control line, the second clock control line, and the fourth clock control line; and
in a fifth period, applying a cut-off voltage to the signal input terminal, applying a turn-on voltage to the fourth clock control line, and applying a cut-off voltage to the first clock control line, the second clock control line, and the third clock control line.

10. The driving method of claim 7, wherein a shift register further comprises a forward and reverse control unit, and the forward and reverse control unit comprises a tenth transistor and an eleventh transistor, wherein a gate of the tenth transistor is electrically connected to a first forward and reverse signal terminal, a gate of the eleventh transistor is electrically connected to a second forward and reverse signal terminal, and a first pole of the tenth transistor and a first pole of the eleventh transistor are both electrically connected to a signal input terminal of the shift register;

a second pole of the tenth transistor in an i-th stage shift register is electrically connected to a first output terminal of an (i−1)-th stage shift register; and a second pole of the eleventh transistor in the (i−1)-th stage shift register is electrically connected to a second output terminal of the i-th stage shift register, wherein i is a positive integer greater than 1;

the gate driver circuit comprises a first shift register, a second shift register, a third shift register, and a fourth shift register that are sequentially cascaded and further comprises a first clock control line, a second clock control line, a third clock control line, a fourth clock control line, a fifth clock control line, a sixth clock control line, a seventh clock control line, and an eighth clock control line, wherein a first signal terminal of the first shift register is electrically connected to the fourth clock control line, a second signal terminal of the first shift register is electrically connected to the third clock control line, a third signal terminal of the first shift register is electrically connected to the first clock control line, and a fourth signal terminal of the first shift register is electrically connected to the second clock control line; a first signal terminal of the second shift register is electrically connected to the seventh clock control line, a second signal terminal of the second shift register is electrically connected to the sixth clock control line, a third signal terminal of the second shift register is electrically connected to the eighth clock control line, and a fourth signal terminal of the second shift register is electrically connected to the fifth clock control line; a first signal terminal of the third shift register is electrically connected to the second clock control line, a second signal terminal of the third shift register is electrically connected to the first clock control line, a third signal terminal of the third shift register is electrically connected to the third clock control line, and a fourth signal terminal of the third shift register is electrically connected to the fourth clock control line; a first signal terminal of the fourth shift register is electrically connected to the fifth clock control line, a second signal terminal of the fourth shift register is electrically connected to the eighth clock control line, a third signal terminal of the fourth shift register is electrically connected to the sixth clock control line, and a fourth signal terminal of the fourth shift register is electrically connected to the seventh clock control line; and wherein the driving method comprises:
in a case of forward scanning,
in a first period, applying a turn-on voltage to a second pole of the tenth transistor in the first shift register, applying a cut-off voltage to the first clock control line, the second clock control line, the third clock control line, the fifth clock control line, the seventh clock control line, and the eighth clock control line, and applying a turn-on voltage to the fourth clock control line and the sixth clock control line;
in a second period, applying a cut-off voltage to the second pole of the tenth transistor in the first shift register, applying a cut-off voltage to the second clock control line, the third clock control line, the fourth clock control line, the fifth clock control line, the sixth clock control line, and the eighth clock control line, and applying a turn-on voltage to the first clock control line and the seventh clock control line;
in a third period, applying a cut-off voltage to the second pole of the tenth transistor in the first shift register, applying a cut-off voltage to the first clock control line, the third clock control line, the fourth clock control line, the fifth clock control line, the sixth clock control line, and the seventh clock control line, and applying a turn-on voltage to the second clock control line and the eighth clock control line; and in a fourth period, applying a cut-off voltage to the second pole of the tenth transistor in the first shift register, applying a cut-off voltage to the first clock control line, the second clock control line, the fourth clock control line, the sixth clock control line, the seventh clock control line, and the eighth clock control line, and applying a turn-on voltage to the third clock control line and the fifth clock control line; and in a case of reverse scanning, in a first period, applying a turn-on voltage to a second pole of the eleventh transistor in a last stage shift register, applying a cut-off voltage to the first clock control line, the second clock control line, the third clock control line, the fifth clock control line, the sixth clock control line, and the seventh clock control line, and applying a turn-on voltage to the fourth clock control line and the eighth clock control line;

in a second period, applying a cut-off voltage to the second pole of the eleventh transistor in the last stage shift register, applying a cut-off voltage to the second clock control line, the third clock control line, the fourth clock control line, the sixth clock control line, the seventh clock control line, and the eighth clock control line, and applying a turn-on voltage to the first clock control line and the fifth clock control line;

in a third period, applying a cut-off voltage to the second pole of the eleventh transistor in the last stage shift register, applying a cut-off voltage to the first clock control line, the third clock control line, the fourth clock control line, the fifth clock control line, the seventh clock control line, and the eighth clock control line, and applying a turn-on voltage to the second clock control line and the sixth clock control line; and in a fourth period, applying a cut-off voltage to the second pole of the eleventh transistor in the last stage shift register, applying a cut-off voltage to the first clock control line, the second clock control line, the fourth clock control line, the fifth clock control line, the sixth clock control line, and the eighth clock control line, and applying a turn-on voltage to the third clock control line and the seventh clock control line.

11. The driving method of claim 7, wherein a shift register further comprises a forward and reverse control unit, and the forward and reverse control unit comprises a tenth transistor and an eleventh transistor, wherein a gate of the tenth transistor is electrically connected to a first forward and reverse signal terminal, a gate of the eleventh transistor is electrically connected to a second forward and reverse signal terminal, and a first pole of the tenth transistor and a first pole of the eleventh transistor are both electrically connected to a signal input terminal of the shift register;

a second pole of the tenth transistor in an i-th stage shift register is electrically connected to a second output terminal of an (i−1)-th stage shift register; and a second pole of the eleventh transistor in the (i−1)-th stage shift register is electrically connected to a first output terminal of the i-th stage shift register, wherein i is a positive integer greater than 1;

the gate driver circuit comprises a first shift register and a second shift register that are sequentially cascaded and further comprises a first clock control line, a second clock control line, a third clock control line, a fourth clock control line, a fifth clock control line, a sixth clock control line, a seventh clock control line, and an eighth clock control line, wherein a first signal terminal of the first shift register is electrically connected to the fourth clock control line, a second signal terminal of the first shift register is electrically connected to the third clock control line, a third signal terminal of the first shift register is electrically connected to the fifth clock control line, and a fourth signal terminal of the first shift register is electrically connected to the sixth clock control line; and a first signal terminal of the second shift register is electrically connected to the second clock control line, a second signal terminal of the second shift register is electrically connected to the first clock control line, a third signal terminal of the second shift register is electrically connected to the seventh clock control line, and a fourth signal terminal of the second shift register is electrically connected to the eighth clock control line; and wherein in a case of forward scanning, in a first period, applying a turn-on voltage to a second pole of the tenth transistor in the first shift register, applying a cut-off voltage to the first clock control line, the second clock control line, the third clock control line, the fifth clock control line, the sixth clock control line, and the seventh clock control line, and applying a turn-on voltage to the fourth clock control line and the eighth clock control line;

in a second period, applying a cut-off voltage to the second pole of the tenth transistor in the first shift register, applying a cut-off voltage to the second clock control line, the third clock control line, the fourth clock control line, the sixth clock control line, the seventh clock control line, and the eighth clock control line, and applying a turn-on voltage to the first clock control line and the fifth clock control line;

in a third period, applying a cut-off voltage to the second pole of the tenth transistor in the first shift register, applying a cut-off voltage to the first clock control line, the third clock control line, the fourth clock control line, the fifth clock control line, the seventh clock control line, and the eighth clock control line, and applying a turn-on voltage to the second clock control line and the sixth clock control line; and in a fourth period, applying a cut-off voltage to the second pole of the tenth transistor in the first shift register, applying a cut-off voltage to the first clock control line, the second clock control line, the fourth clock control line, the fifth clock control line, the sixth clock control line, and the eighth clock control line, and applying a turn-on voltage to the third clock control line and the seventh clock control line; and wherein in a case of reverse scanning, in a first period, applying a turn-on voltage to a second pole of the eleventh transistor in a last stage shift register, applying a cut-off voltage to the first clock control line, the second clock control line, the third clock control line, the fifth clock control line, the sixth clock control line, and the eighth clock control line, and applying a turn-on voltage to the fourth clock control line and the seventh clock control line;

in a second period, applying a turn-on voltage to the second pole of the eleventh transistor in the last stage shift register, applying a cut-off voltage to the second clock control line, the third clock control line, the fourth clock control line, the fifth clock control line, the seventh clock control line, and the eighth clock control line, and applying a turn-on voltage to the first clock control line and the sixth clock control line;

in a third period, applying a turn-on voltage to the second pole of the eleventh transistor in the last stage shift register, applying a cut-off voltage to the first clock control line, the third clock control line, the fourth clock control line, the sixth clock control line, the seventh clock control line, and the eighth clock control line, and applying a turn-on voltage to the second clock control line and the fifth clock control line; and in a fourth period, applying a turn-on voltage to the second pole of the eleventh transistor in the last stage shift register, applying a cut-off voltage to the first clock control line, the second clock control line, the fourth clock control line, the fifth clock control line, the sixth clock control line, and the seventh clock control line, and applying a turn-on voltage to the third clock control line and the eighth clock control line.

12. The gate driver circuit of claim 1, further comprising a plurality of clock control lines, wherein the first signal terminal, the second signal terminal, the third signal terminal, and the fourth signal terminal of each of the plurality of cascaded shift registers are electrically connected to four of the plurality of clock control lines, respectively; and wherein a signal input terminal of an i-th stage shift register is electrically connected to a second output terminal of an (i−1)-th stage shift register, and i is a positive integer greater than 1.

13. The gate driver circuit of claim 12, comprising a first shift register, a second shift register, and a third shift register that are sequentially cascaded, wherein the plurality of clock control lines comprise a first clock control line, a second clock control line, a third clock control line, a fourth clock control line, a fifth clock control line, a sixth clock control line, and a seventh clock control line, wherein a first signal terminal of the first shift register is electrically connected to the fifth clock control line, a second signal terminal of the first shift register is electrically connected to the seventh clock control line, a third signal terminal of the first shift register is electrically connected to the first clock control line, and a fourth signal terminal of the first shift register is electrically connected to the second clock control line;

a first signal terminal of the second shift register is electrically connected to the sixth clock control line, a second signal terminal of the second shift register is electrically connected to the fifth clock control line, a third signal terminal of the second shift register is electrically connected to the third clock control line, and a fourth signal terminal of the second shift register is electrically connected to the fourth clock control line; and a first signal terminal of the third shift register is electrically connected to the seventh clock control line, a second signal terminal of the third shift register is electrically connected to the sixth clock control line, a third signal terminal of the third shift register is electrically connected to the first clock control line, and a fourth signal terminal of the third shift register is electrically connected to the second clock control line.

14. The gate driver circuit of claim 12, comprising a first shift register and a second shift register that are sequentially cascaded, wherein the plurality of clock control lines comprise a first clock control line, a second clock control line, a third clock control line, and a fourth clock control line, wherein a first signal terminal of the first shift register is electrically connected to the fourth clock control line, a second signal terminal of the first shift register is electrically connected to the third clock control line, a third signal terminal of the first shift register is electrically connected to the first clock control line, and a fourth signal terminal of the first shift register is electrically connected to the second clock control line; and a first signal terminal of the second shift register is electrically connected to the second clock control line, a second signal terminal of the second shift register is electrically connected to the first clock control line, a third signal terminal of the second shift register is electrically connected to the third clock control line, and a fourth signal terminal of the second shift register is electrically connected to the fourth clock control line.

15. The gate driver circuit of claim 12, wherein each of the plurality of cascaded shift registers further comprises a forward and reverse control unit, and the forward and reverse control unit comprises a tenth transistor and an eleventh transistor, wherein a gate of the tenth transistor is electrically connected to a first forward and reverse signal terminal, a gate of the eleventh transistor is electrically connected to a second forward and reverse signal terminal, and a first pole of the tenth transistor and a first pole of the eleventh transistor are both electrically connected to the signal input terminal;

wherein a second pole of the tenth transistor in an i-th stage shift register is electrically connected to a first output terminal of an (i−1)-th stage shift register; and a second pole of the eleventh transistor in the (i−1)-th stage shift register is electrically connected to a second output terminal of the i-th stage shift register, wherein i is a positive integer greater than 1.

16. The gate driver circuit of claim 15, comprising a first shift register, a second shift register, a third shift register, and a fourth shift register that are sequentially cascaded, wherein the plurality of clock control lines comprise a first clock control line, a second clock control line, a third clock control line, a fourth clock control line, a fifth clock control line, a sixth clock control line, a seventh clock control line, and an eighth clock control line, wherein a first signal terminal of the first shift register is electrically connected to the fourth clock control line, a second signal terminal of the first shift register is electrically connected to the third clock control line, a third signal terminal of the first shift register is electrically connected to the first clock control line, and a fourth signal terminal of the first shift register is electrically connected to the second clock control line;

a first signal terminal of the second shift register is electrically connected to the seventh clock control line, a second signal terminal of the second shift register is electrically connected to the sixth clock control line, a third signal terminal of the second shift register is electrically connected to the eighth clock control line, and a fourth signal terminal of the second shift register is electrically connected to the fifth clock control line;

a first signal terminal of the third shift register is electrically connected to the second clock control line, a second signal terminal of the third shift register is electrically connected to the first clock control line, a third signal terminal of the third shift register is electrically connected to the third clock control line, and a fourth signal terminal of the third shift register is electrically connected to the fourth clock control line; and a first signal terminal of the fourth shift register is electrically connected to the fifth clock control line, a second signal terminal of the fourth shift register is electrically connected to the eighth clock control line, a third signal terminal of the fourth shift register is electrically connected to the sixth clock control line, and a fourth signal terminal of the fourth shift register is electrically connected to the seventh clock control line.

17. The gate driver circuit of claim 15, wherein a second pole of the tenth transistor in an i-th stage shift register is electrically connected to a second output terminal of an (i−1)-th stage shift register; and a second pole of the eleventh transistor in the (i−1)-th stage shift register is electrically connected to a first output terminal of the i-th stage shift register, wherein i is a positive integer greater than 1.

18. The gate driver circuit of claim 17, comprising a first shift register and a second shift register that are sequentially cascaded, wherein the plurality of clock control lines comprise a first clock control line, a second clock control line, a third clock control line, a fourth clock control line, a fifth clock control line, a sixth clock control line, a seventh clock control line, and an eighth clock control line, and wherein a first signal terminal of the first shift register is electrically connected to the fourth clock control line, a second signal terminal of the first shift register is electrically connected to the third clock control line, a third signal terminal of the first shift register is electrically connected to the fifth clock control line, and a fourth signal terminal of the first shift register is electrically connected to the sixth clock control line; and a first signal terminal of the second shift register is electrically connected to the second clock control line, a second signal terminal of the second shift register is electrically connected to the first clock control line, a third signal terminal of the second shift register is electrically connected to the seventh clock control line, and a fourth signal terminal of the second shift register is electrically connected to the eighth clock control line.

19. A display panel, comprising a gate driver circuit, and the gate driver circuit comprising a plurality of cascaded shift registers, wherein each of the plurality of cascaded shift registers comprises an input unit, a node control unit, a first output unit, and a second output unit, wherein a first terminal of the input unit is electrically connected to a signal input terminal, a control terminal of the input unit is electrically connected to a first signal terminal, a second terminal of the input unit is electrically connected to a first node, and the input unit is configured to control a voltage of the first node according to a voltage of the first signal terminal and a voltage of the signal input terminal;

a first terminal of the node control unit is electrically connected to the first node, a second terminal of the node control unit is electrically connected to the first signal terminal, a third terminal of the node control unit is electrically connected to a first power supply voltage terminal, a fourth terminal of the node control unit is electrically connected to a second power supply voltage terminal, a first control terminal of the node control unit is electrically connected to the first node, a second control terminal of the node control unit is electrically connected to a second signal terminal, a fifth terminal of the node control unit is electrically connected to a second node, and the node control unit is configured to control a voltage of the second node according to the voltage of the first node, the voltage of the first signal terminal, a voltage of the first power supply voltage terminal, a voltage of the second power supply voltage terminal, and a voltage of the second signal terminal;

a first terminal of the first output unit is electrically connected to the second power supply voltage terminal, a second terminal of the first output unit is electrically connected to a third signal terminal, a third terminal of the first output unit is electrically connected to a first output terminal, a first control terminal of the first output unit is electrically connected to the second node, a second control terminal of the first output unit is electrically connected to the first node, and the first output unit is configured to control a voltage of the first output terminal according to the voltage of the second power supply voltage terminal, a voltage of the third signal terminal, the voltage of the first node, and the voltage of the second node; and a first terminal of the second output unit is electrically connected to the second power supply voltage terminal, a second terminal of the second output unit is electrically connected to a fourth signal terminal, a third terminal of the second output unit is electrically connected to a second output terminal, a first control terminal of the second output unit is electrically connected to the second node, a second control terminal of the second output unit is electrically connected to the first node, and the second output unit is configured to control a voltage of the second output terminal according to the voltage of the second power supply voltage terminal, a voltage of the fourth signal terminal, the voltage of the first node, and the voltage of the second node;

wherein the display panel further comprising a plurality of pixel driver circuits arranged in an array, and wherein each of the plurality of pixel driver circuits comprises a first scanning signal terminal and a second scanning signal terminal, and wherein a first output terminal of a j-th stage shift register is electrically connected to first scanning signal terminals of the plurality of pixel driver circuits in a j-th row, and a second output terminal of the j-th stage shift register is electrically connected to the second scanning signal terminal of each of the plurality of pixel driver circuits in the j-th row, and j is a positive integer greater than or equal to 1; or, wherein each of the plurality of pixel driver circuits comprises a scanning signal terminal, wherein a first output terminal of a j-th stage shift register is electrically connected to the scanning signal terminal of each of the plurality of pixel driver circuits in a (2j−1)-th row, and a second output terminal of the j-th stage shift register is electrically connected to the scanning signal terminal of each of the plurality of pixel driver circuits in a 2j-th row, and j is a positive integer greater than or equal to 1.

20. A display device, comprising the display panel of claim 19.

* * * * *